US006446092B1

(12) United States Patent
Sutter

(10) Patent No.: US 6,446,092 B1
(45) Date of Patent: Sep. 3, 2002

(54) INDEPENDENT DISTRIBUTED DATABASE SYSTEM

(75) Inventor: Herbert P. Sutter, Oakville (CA)

(73) Assignee: PeerDirect Company, Halifax (CA)

( * ) Notice: Subject to any disclaimer, the term of this patent is extended or adjusted under 35 U.S.C. 154(b) by 0 days.

(21) Appl. No.: 09/270,199

(22) Filed: Mar. 15, 1999

Related U.S. Application Data

(63) Continuation-in-part of application No. 08/742,024, filed on Nov. 1, 1996, now Pat. No. 5,924,094.

(51) Int. Cl.[7] .............................................. G06F 17/30

(52) U.S. Cl. ...................................................... 707/203

(58) Field of Search .............................. 707/9, 10, 200, 707/201, 202, 203; 712/29; 714/736; 709/248, 232

(56) References Cited

U.S. PATENT DOCUMENTS

| 5,386,585 A | * | 1/1995 | Traylor ........................ 712/29 |
| 5,608,874 A | | 3/1997 | Ogawa et al. ............... 709/203 |
| 5,649,185 A | | 7/1997 | Antognini et al. ............. 707/9 |
| 5,664,189 A | | 9/1997 | Wilcox et al. ............... 707/205 |
| 5,678,041 A | | 10/1997 | Baker et al. .................... 707/9 |
| 5,682,537 A | | 10/1997 | Davies et al. ............... 710/200 |
| 5,687,363 A | | 11/1997 | Oulid-Aissa et al. ......... 707/4 |
| 5,721,909 A | | 2/1998 | Oulid-Aissa et al. ......... 707/10 |
| 5,862,327 A | | 1/1999 | Kwang et al. ............... 709/203 |
| 5,870,765 A | | 2/1999 | Bauer et al. ................. 707/203 |
| 5,873,096 A | | 2/1999 | Lim et al. .................... 707/201 |
| 5,937,414 A | * | 8/1999 | Souder et al. ............... 707/203 |

FOREIGN PATENT DOCUMENTS

| EP | 0458623 A2 | 11/1991 | ........... G06F/15/40 |
| EP | 0714066 A2 | 5/1996 | ........... G06F/12/08 |
| WO | WO 98/20430 | 5/1998 | ........... G06F/17/30 |

OTHER PUBLICATIONS

"The dangers of replication and a solution", Jim Gray et al, Sigmod Record, Sigmod, New York, NY, U.S.A., vol. 25, No. 2, Jun 4., 1996, pp. 173–182, XP–002146555.

"Updated Loosely–Coupled SQL/DS Databases", IBM Technical Disclosure Bulletin vol. 33, No. 6B, Nov. 1, 1990, pp. 395–396.

Bouguettaya, A. Et Al: "Co–Database Approach to Database Interoperability", IEICE Transactions on Information and Systems, vol. E78–D, No. 11, Nov. 1, 1995, p.g. 1388–1395.

McHugh, J. Et Al: "Multilevel Security Issues in Distributed Database Management Systems", Computers & Security International Journal Devoted to the Study of Technical & Financial Aspects of Computer Security, vol. 7, No. 4, Aug. 1, 1988, pp. 387–396.

Yu, P.S. Et Al: "Dynamic Transaction Routing in Distributed Database Systems", IEEE Transactions on Software Engineering, New York, NY, US, vol. 14, No. 9, Sep. 1988, pp. 1307–1318.

(List continued on next page.)

Primary Examiner—Diane D. Mizrahi
(74) Attorney, Agent, or Firm—Ridout & Maybee LLP

(57) ABSTRACT

An independent distributed database system comprising a plurality of sites wherein all users at all sites work off-line with local data. All application transactions are against the local database only, and every site stores "all and only" the data it needs. On-line transactions occur only in the background, including a periodical "synch" between sites that transmits any changes to data of interest to that site. If the background operations are interrupted or the network is temporarily unavailable, the user does not see new changes made at other sites until the data link is available again, but is otherwise unaffected. It is a feature that no site acts as a "server" for any other site. Some sites may store more data or have more users than others, but all sites are logically peers.

57 Claims, 12 Drawing Sheets

OTHER PUBLICATIONS

"An Introduction to Database Systems"—Date, Addison–Wesley 1995, pp. 593–627.

"Distributed Databases, Cooperative Processing, & Networking"—Shaku Atre, McGraw–Hill, 1992, pp. 56–62.

"Distributed Database Systems" Bell & Grimson, Addison–Wesley 1992, pp. Prefix VIII–X.

"Managing Distributed Databases"—Burleson, Wiley 1994, p. 106.

* cited by examiner

NON-ROOTED ACTIVITY PART EXAMPLE
ARROWHEADS DENOTE THE "MANY" END OF A RELATIONSHIP

DESIGN-TIME TABLES
ARROWHEADS DENOTE THE "MANY" END OF A RELATIONSHIP

DSECLOGON

SOLID ARROWS DENOTE TYPICAL IMPLEMENTATION AS FUNCTION CALLS. DASHED ARROWS DENOTE TYPICAL IMPLEMENTATION AS ASYNCHRONOUS MESSAGES. ALL MESSAGES ARE PART OF SECURE CONVERSATIONS; SESSION KEY AGREEMENT PROTOCOLS ARE OMITTED FOR CLARITY.

INDEPENDENT DISTRIBUTED DATABASE SYSTEM

This application is a continuation-in-part of patent application Ser. No. 08/742,024, which was filed Nov. 1, 1996 now U.S. Pat. No. 5,924,094.

FIELD OF THE INVENTION

The present invention relates to distributed databases, and more particularly to an independent distributed relational database system operating over a local area network (LAN) or a wide area network (WAN).

BACKGROUND OF THE INVENTION

Databases comprise one of the most widely used applications found in computing today. A database is a collection of related information about a subject organized in a useful manner that provides a base for procedures such as retrieving information, drawing conclusions and making decisions. A distributed database is a variation in which information is distributed or spread over a number of sites which are connected through a communication network.

A key problem in current database design is providing equal database access to all users whether they are local or remote. For example, to provide equal access to sales agents with their portable computers, to executives working from home, to work groups at satellite offices, to business partners, and to suppliers, presents a challenge to existing database design. Advantageously, each user should be able to use and change selected information from their computer, with the same performance and functionality that they would enjoy at a workstation located at head office with the server.

While the prior art includes numerous database management systems, none of the existing systems provide "completely equal access". Known systems which allow off-site users to work with in-office information systems require the remote users to access an office LAN or central database server through expensive, slow, and often insecure dial-up lines, WAN links, and remote-access products. The major problems associated with the prior art approaches can be classified under Performance, Scalability, Reliability, Availability, Autonomy, and Security.

Performance. The remote user experiences inferior performance because the user is forced to access data at a remote location using slow modem, or WAN, connections. Furthermore, the actual data is retransmitted every time it is accessed, thereby requiring fast and/or expensive connections in order to achieve acceptable performance.

Scalability. The central server must be able to support all local and remote users. As users are added, the central server eventually becomes the bottleneck. Known systems are typically limited to about 1000 concurrent users.

Reliability. The central server must be regularly backed up. If a problem occurs, work done since the last backup is lost and all the dependent users must re-enter their recent work. Connection faults are also a common problem for remote users of known systems. When there is a connection fault, the user is interrupted until the connection is re-established.

From the foregoing, it will be appreciated that reliance on a central site or service is undesirable because that site could become a bottleneck as well as a point of failure.

Availability. In known systems, all remote users depend on a central server. If the central server is down, then all users are down and cannot work with the database until the server recovers. Windows of acceptable down time are measured in seconds or minutes and servers are typically required to deliver better than 98% availability during working hours.

Autonomy. The remote users are partly or fully dependent on the server. Remote users will not always have an on-line data connection, e.g. modem or WAN, but, a remote user can only work with the database when on-line and connected. For example, sales agents on the road, or executives in airplanes, cannot use the database without very slow, expensive and unreliable cellular or satellite datalinks to keep them on-line to the central server.

Security. Remote access links in conventional systems are often not encrypted. Even when the links are protected, the organization loses control of any data sent to the remote machine. The remote user, who may not be an employee, but a supplier or customer, can use the information however they want.

Currently there are two main approaches to sharing relational databases: traditional distributed databases, and traditional replication systems.

Traditional distributed databases distribute the servers only, so that each site stores some subset (none, all, or some) of the rows and columns in each table. Clients access the distributed database by connecting normally to their local server. When a client makes a request which involves data stored at other servers, the network handles the request appropriately and returns the expected result so that to the client it appears as though the request was handled locally. Multi-site integrity is controlled through complex two-phase commit and equivalent protocols.

The main problem with this approach is that a database transaction must be performed on-line and involve every server which stores information involved in the transaction. This is costly in performance, since the speed of network connections between distributed servers affects the speed of the client's transaction. It is also fragile, since all involved servers must be available for the transaction to succeed. If any server(s) are not available, then the client receives either an incomplete result or the client's transaction fails completely which results are both undesirable.

With respect to replication, traditional replication systems replicate data primarily between servers but may also be used to replicate data to client machines. The main problems with known replication systems are that they are not peer systems, are complex to administer and maintain, and have integrity problems because of replication granularity. They are not peer systems because they distinguish between "master" and "replica" databases and cannot support fully equal operation at all sites, local and remote. They are complex to administer and maintain because distribution rules are typically configured using row and column selection for every table at every site. For example, a simple change operation (e.g. "Site 3 now needs Customer #531's information") typically requires extensive and error-prone changes to row and column selections in multiple database tables for that site.

Further, existing replication systems have integrity problems because they typically use record-level or field-level replication granularity. Consider a Customer table with fields Address, City, State, ZipCode, PaymentTerms, and CreditRating. With record-level granularity, the fields of an entire record are replicated together, which gives false collisions that are tedious for administrators to review; for example, changing a customer's Address at one site and the CreditRating at another will result in a collision even though the two fields are unrelated (i.e., the person changing the Address knows that the customer moved, while the person changing the CreditRating knows that the customer failed to pay promptly). With field-level granularity, each field in a record is replicated separately, which solves the false collisions of record-level replication but causes integrity problems by not reporting collisions when two related fields are changed at different sites; for example, changing a customer's Address at one site and the ZipCode at another should result in a collision (i.e., the person changing the Address because he knows that the customer has moved must also know enough to change the ZipCode).

The IDDB database according to the present invention overcomes the disadvantages associated with the prior art. The present invention provides a database architecture in which all users at all sites work off-line with local data, that is, all application transactions are against the local database only, and every site locally stores "all and only" the data it needs. This means that application transactions are not network-dependent and therefore do not suffer speed or availability problems when the network or remote sites are down or loaded. The on-line transactions only occur in the background, including a periodic synchronization between sites that transmit any changes to data that is of interest to the site. If the background operations are interrupted or the network is temporarily unavailable, the user does not see new changes made at other sites until the datalink is again established, but otherwise the user remains unaffected. According to the present invention, no site acts as a "server" for any other site, however, some sites may store more data or have more users than others, but all sites are logically peers.

Another problem with prior art systems concerns propagation mechanisms. While the prior art includes numerous propagation mechanisms, the existing systems suffer a number of drawbacks.

Firstly, known transaction-log-based systems are limited to databases which maintain and publish transaction logs. Some databases do not allow access to their transaction logs, and some do not have transaction logs at all.

Secondly, the known systems are generally limited to hub-and-spoke topologies and/or unidirectional update transmission. It will be appreciate that such systems are not scalable. As such these systems are not capable of supporting peer-to-peer and other non-hub-and-spoke topologies, nor can they support update-anywhere operation where updates may occur at any site.

Thirdly, the known systems are typically limited to capturing the transactions originally used by the application making the updates. This technique traditionally either requires inserting special middleware between the application and the database to capture the transactions as they occur, which would require changes to all applications manipulating the database including interactive queries and updates, or else requires reading the transaction log as above. As a result, this technique is not useful if the application(s) do not use transactions.

Fourthly, known systems do not have the capability to add transactions when updates made at a site whose database does not support transactions are propagated to a site whose database does support transactions. It will be appreciated that this becomes a safety issue when data is moved from a low-integrity database into a high-integrity database.

Accordingly, there also remains a need for a transaction update mechanism which is not limited to any particular relational database product and which does not require transaction logs. Such a transaction update mechanism should not be limited any topology and should support update-anywhere processing. Such a transaction update mechanism should also be capable of propagating data within transactions even if the application did not utilize transactions. Furthermore, such a transaction mechanism should be capable of propagating data within transactions even if the database where the update originally occurred does not support transactions.

BRIEF SUMMARY OF THE INVENTION

The present invention provides an architecture for an independent distributed database or IDDB. In the IDDB, all sites, i.e. nodes, are peers and no site acts as a server for another. This means that unlike conventional database replication systems, the distributed database according to the present invention does not distinguish between "master" and "slave" sites, or "primary" and "secondary" sites, or "service" and "replica" sites. With the IDDB, any subset of sites continue to operate normally without the need for a master site.

Each site stores "all and only" the data it needs. It is a feature of the present invention that users work off-line with local data, and all application transactions are against the local database. Sites sharing the same data synchronize their changes periodically in the background and changes made at one site become visible to all the other interested sites. It is a feature of the IDDB that there are no on-line or distributed application transactions because all application transactions are local. There are network transactions for performing replication and housekeeping functions, but they operate in the background and are not visible to the application, or the user.

In respect of the shortcomings associated with the prior art architectures as described above, the database architecture according to the present invention provides a significant improvement in these areas.

Performance. According to the invention, all users utilize local databases to which they have high-speed (i.e. network or same machine) access. There is no dependency on remote datalinks for any part of normal operation. According to another aspect, the background sync transactions are faster because only changed data is transmitted, and then only once to each affected site. This feature greatly reduces the bandwidth requirements and thereby allows the use of slow (and inexpensive) modem links for most business applications.

Scalability. According to the present invention, there is no central server requirement. Thus, no site acts as a server for any other site and as a result no site becomes a bottleneck to user expansion (as commonly experienced with the central server architecture of known systems). As a result, the communications load and hardware requirements at each site are independent of the size of the network. For example, if a sales agent using his notebook is working with 200 customers, the communications load is defined by the changes made to those 200 customers and the local database will store only those 200 customers. If next year there are ten times as many sales agents, then each sales agent will still be storing about 200 customers in their local, i.e. notebook, computer, and the agent is still working with his 200 customers and the communications and local database loads for the agent remain unchanged regardless of the total size of the network or the total number of sites and users. The IDDB according to the present invention runs an application as easily at 10 sites as it does at 10,000.

Reliability. It is feature of the present invention that redundancy is built into the network, thereby reducing or eliminating the need for backups. If a site is destroyed, the IDDB application is reinstalled with a blank database and connected to the network. Once re-attached to the network, the application receives an initial download and recovers all of its information from the other sites connected in the network to achieve normal operation. The only data that would be lost are the changes made at the site since the last sync operation, however, no users at the other sites are affected or need to re-enter data. The IDDB provides full reliability because no site depends on another site for its operation.

Availability. According to the invention, if one site is down, no other site is affected because no site depends on another and all work at a site is done off-line by default. If all other sites in the network are down for a week or a month, and users at the remaining sites continue working, the users will eventually notice that their changes are not being seen by anyone else and that no one else's changes are appearing to them. As a result, windows of acceptable down time can be measured in days or weeks, not seconds or minutes as in prior art systems. According to this aspect of the invention, the IDDB provides improved availability primarily because it always fully replicates all data.

Autonomy. According to the present invention, the sites are fully independent of each other and also independent of the communications link. For example, sales agents who are on the road, and executives who are travelling in airplanes, can continue working as usual regardless of whether they are currently connected to a modem or a network link. It is a feature of the IDDB that all data needed for an application(s) is actually stored at each local site. This means that users on the IDDB are able to work with data without knowing exactly where else, i.e. at other sites in the network, the data is also stored.

Furthermore, the IDDB exhibits fragmentation independence, that is, sites in the IDDB operate as though the database is not fragmented at all, because for each site its local copy of a table is the whole table. Each site, however, will by definition have some fragment of the database, defined by the information its users need.

Security. It is a feature of the IDDB database according to the present invention that all communication links are encrypted. All data stored locally, even on an untrusted machine run by a potentially untrusted user, is secured so that it can be accessed only through a legitimate application running on the system.

According to another aspect of the invention, the IDDB features a network architecture which comprises one or more application networks. An application network is defined as the set of all sites running a given IDDB application. The application network is a virtual network running on top of a physical network connection. It is a feature of the invention that a given site may run several different IDDB applications at the same time.

The network architecture preferably comprises a network structure that allows all sites to communicate efficiently and effectively. In particular, the network structure preferably has the capability to distinguish between stable sites and transient sites in order to minimize dependencies on transient sites. A stable site is defined as a site which features high availability and forms a long-term component of the application network, for example a site or node located within the organization that owns or operates the application. A transient site, on the other hand, comprises a site which is either intermittently available or a short-term participant in the application network, for example a computer belonging to a mobile user or users outside of the parent organization.

The network structure according to the present invention also features fault detection and repair mechanisms, including automatic network reconfiguration.

The network structure also comprises suitable sub-networks for each activity group. An activity group is defined as the group of sites presently collaborating on a given activity, i.e. storing a copy of that activity's data (or some sub-set thereof). Preferably, the network structure provides the capability to manage dependencies on transient sites which are participating and provides effective automatic error recovery and reconfiguration.

The independent database according to the present invention also features the capability to replicate updates, so that any change made in an activity at a site becomes visible to all sites belonging to the activity group in that application network. According to this aspect of the invention, updates are propagated. To do this efficiently, two sites must be able to agree on the "age" of each piece of data in the database, so that newer versions correctly update older ones without introducing unnecessary updates when both sites already have the same version of the data. Accordingly, the present invention includes mechanisms to allow fragment age agreement and accommodation of relative clock drift between sites, and the means for providing consistent local time stamping when there are several, and possibly inconsistent, local clocks at the same site.

Based on the activity as the unit of collaboration, the replication rules according to the present invention feature ease of implementation and administration. A simple change (e.g., "Site 3 now needs Customer #531's information") requires a simple command only ("attach to Customer #531"), and the IDDBMS automatically includes all related information in related tables. Using the fragment as the unit of replication, fields with a common update responsibility are replicated as a unit; changes to unrelated fields (e.g., Address and CreditRating) never result in false collisions requiring tedious administration, and changes to related fields (e.g., Address and ZipCode) are always correctly identified as collisions.

The IDDB according to the present invention also features a novel independent distributed database management system (IDDBMS). According to this aspect of the invention, a database comprises a collection of activities that can be collaborated on by various users at various sites and services that users and sites can selectively use. The IDDBMS according to the present invention provides a mechanism whereby a site, working off-line from all others, can create a new record and therefore a new key. The new keys are generated off-line in such a manner that the generated key is guaranteed to be unique across the entire database. In addition, the IDDBMS includes means for correctly handling record deletion and record modification across the entire database.

In another aspect, the database management system (IDDBMS) according to the present invention includes means for replicating modified data. The means for replicating modified data comprises a fine-grained replication process based on record fragments. A record fragment according to the present invention is a piece of an individual record, and comprises a subset of columns in a record.

In another aspect, the IDDBMS according to the present invention includes means for determining whether a fragment has been damaged and means for recovering a damaged fragment.

In yet another aspect, the IDDBMS according to the present invention includes means for securing the information transmitted across the application networks. Since each site may be part of several application networks (i.e. if the user has installed multiple IDDB applications), the security of each application must be isolated so that each application provider can separately handle the user's permissions, password change requirements, and other security details for the application regardless of the user's access privileges to other applications running at the same site. In particular, a user having privileges in one application must not have the capability to use this authority to gain greater access to the database of another application. According to this aspect of the invention, the IDDBMS includes means for ensuring that the application's database can be read and written only through a legitimate application program and by legitimate users. In particular, the IDDBMS prevents a user from bypassing the application and inspecting or changing the physical contents of the local database file.

Another feature of the IDDBMS according to the present invention is the elimination of the need for distributed query processing. In a traditional distributed database, query optimization is critical for the performance of the system. In the present invention, query processing is simplified because transactions do not depend on the availability of other sites in the system, i.e. all database transactions are local. Furthermore, the need for a distributed transaction manager is also eliminated.

In yet another aspect, the IDDB according to the present invention provides a means for operating inherently incompatible commercially available Database Management Systems (DBMS). According to this aspect of the invention, the IDDB utilizes a DBMS-independent channel, for example, ODBC (Open Database Connectivity), for accessing the database product, and the IDDB separates the distribution and security controls from the physical database. This feature allows existing database management systems (DBMS's), such as, ORACLE™, INGRES™, SYBASE™, PARADOX™ and ACCESS™ products, to be used together transparently at different sites on the same application network in the IDDB.

In a first aspect, the present invention provides a distributed relational database system for a computer network, said system comprising: a plurality of sites; each of said sites including processing means for storing and retrieving information locally and independent of said other sites, and wherein each of said sites is the logical peer of said other sites; said sites having means for connecting to said network and communicating with other sites connected to the network; and said processing means including means for transferring selected information stored locally by connecting to said network and transferring said selected information to other sites connected to the network.

In a second aspect, there is provided a security structure for a distributed relational database system having a plurality of sites connected to a computer network and having means for communicating over the computer network, said security structure comprising: (a) a trusted root, an organization certification authority, and an application certification authority; (b) said trusted root having means for generating license certificates for validating said organization certification authority; (c) said organization certification authority having means for generating license certificates for validating said application authority; and (d) said application certification authority having means for generating license certificates for selected sites wherein said selected sites belong to an application network and said selected sites use said license certificates for validating each other.

In a third aspect, the present invention provides a method for determining a reference time between sites belonging to a distributed relational database system and being coupled by a computer network, said sites having local processing means and time generators, said method comprising the steps of: (a) sending a first message from an initiator site to a receiver site at a start time; (b) determining an arrival time when said first message is received at said receiver site; (c) said receiver site sending a second message to said initiator site in response to receipt of said first message; (d) determining a reply time when said second message is received at said initiator site; (e) said initiator site determining a reference time from the midpoint of the interval between said start and reply times, and said receiver site using said arrival time as its reference time.

In another aspect, the present invention provides a method for determining a reference time between sites in a distributed relational database system, the sites being coupled by a computer network and having local processing means and clocks, said method comprising the steps of: (a) sending a first message from an initiator site to a receiver site at a time t1; (b) said receiver site determining a time t2 when said first message is received; (c) said receiver site sending a second message at time t3 to said initiator site in response to receipt of said first message; (d) said initiator site determining a time t4 when said second message is received; (e) after said second message is received, said initiator site sending a third message at time t5 to said receiver site; (f) said receiver site determining a time t6 when said third message is received; (g) said initiator site determining a first time value by calculating a midpoint for the interval between said time t1 and said time t4, and generating a first time difference by comparing said first time value with said time t2 when said first message was received by said receiver site; (h) said receiver site determining a second time value by calculating a midpoint for the interval between said time t3 and said time t6, and said receiver site generating a second time difference by comparing said second time value with said time t4 when said second message was received by said initiator site; (i) averaging said first and second time differences to produce an average time difference, wherein said initiator site uses a reference time relative to its local clock, and said receiver site uses said average time difference to calculate a corresponding reference time relative to its local clock.

In yet a further aspect, the present invention provides for a distributed relational database system comprising sites coupled by a computer network and the sites having local processing means and clocks, a method for checking the clocks at the sites, said method comprising the steps of: (a) identifying a designated time keeper site from among said sites; (b) determining a time difference value between the clock of said designated time keeper site and the clock at the other site; (c) generating a time-stamp at said other site by off-setting the time of the local clock at said other site with said time difference value.

According to another aspect, the present invention provides a mechanism for specifying transactions that should be used during replication operations i.e. "replication transactions". The transaction mechanism for replication according to this aspect of the present invention includes the following features.

The transaction mechanism operates automatically and transparently. The transaction mechanism does not require any form of runtime intervention by users, database administrators (DBAs), programmers, or other user intervention.

The transaction mechanism is not tied to transaction logs. It will be appreciated that this feature is particularly advantageous since transaction logs are not always available as some vendors' databases do not publish their log formats/APIs and other databases do not have logs at all.

The transaction mechanism supports all ACID, i.e. Atomicity, Consistency, Isolation, Durability, requirements. These requirements are preserved in the transactions to the extent supported by the underlying database.

The transaction mechanism supports all typical transaction requirements. This includes the transaction requirements typical of the highest-integrity systems, such as banking and market trading systems.

The transaction mechanism preserves peer-to-peer and update-anywhere operation. The transaction mechanism is not limited to hub-and-spoke or master-site or source-target operation. The transaction mechanism supports a true peer environment wherein updates may originate at any site.

The transaction mechanism provides "better-than-native" integrity and improves atomicity, consistency, isolation, and/or durability in most situations.

BRIEF DESCRIPTION OF THE DRAWINGS

Reference will now be made, by way of example, to the accompanying drawings which show preferred embodiments of the present invention, and in which.

DETAILED DESCRIPTION OF THE PREFERRED EMBODIMENTS

The present invention provides an Independent Distributed Database system and a relational database management system which will also be referred to as an IDDB and IDDBMS, respectively, in the following description.

According to the invention, all sites in the IDDB, i.e. nodes, are peers and no site acts as a server for another. Each site stores "all and only" the data it needs. It is a feature of the present invention that users always work off-line with local data, and all application transactions are against a local database. Sites sharing the same data synchronize their changes periodically in the background and changes made at one site become visible to all the other interested sites. It is a feature of the IDDB database that there are no on-line or distributed application transactions, as all application transactions are local. There are network transactions, but they operate fully in the background and are not visible to the application, i.e. the user.

Figure 1:
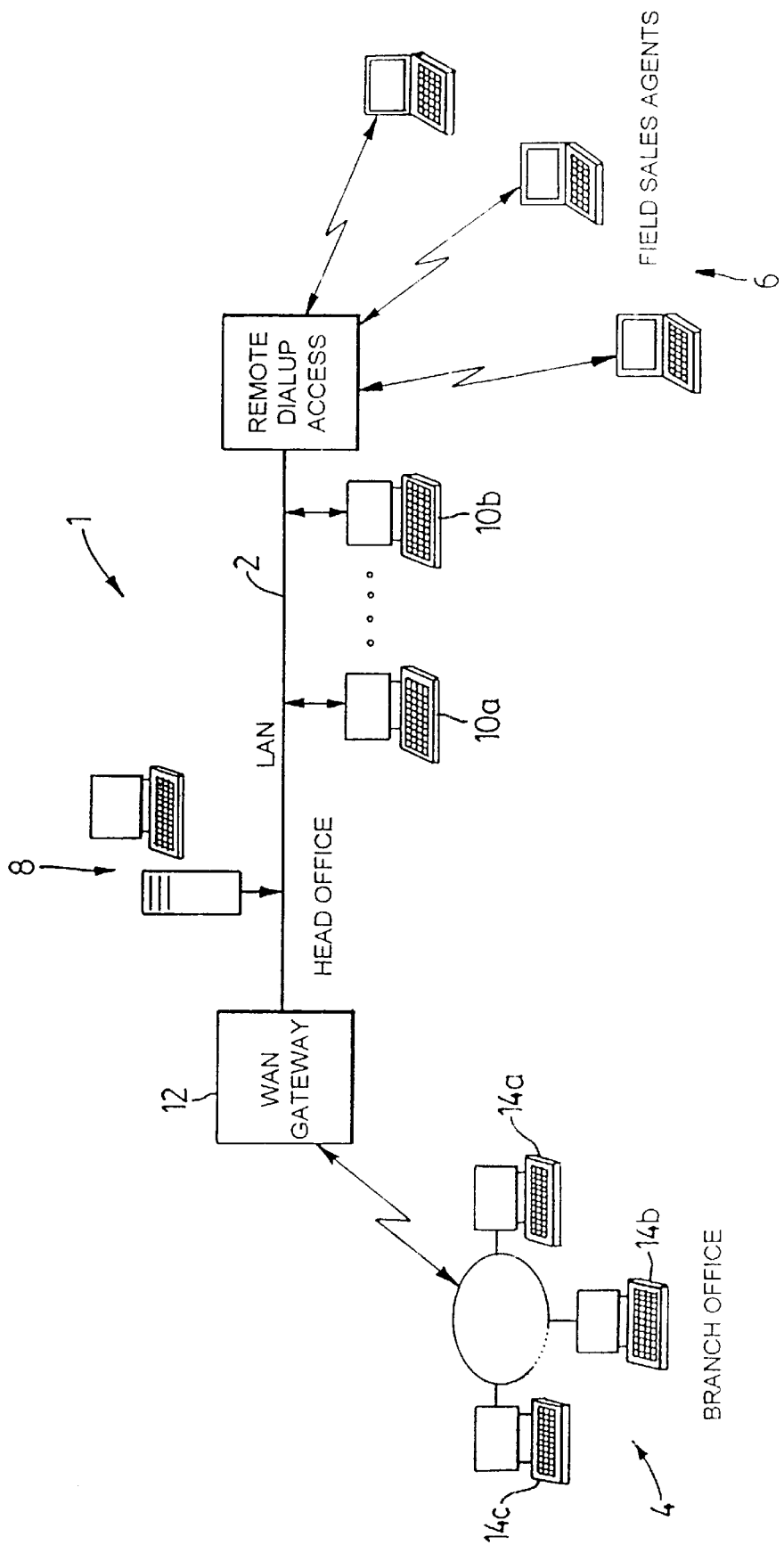
FIG. 1 shows in diagrammatic form a network topology for an independent distributed database (IDDB) according to the present invention.

Reference is first made to FIG. 1, which shows in diagrammatic form an Independent Distributed Database or IDDB indicated generally by reference 1. The IDDB 1 comprises an application running as a virtual network which is defined by sites running a given IDDB application on a physical communication network. As shown in FIG. 1, the IDDB application 1 comprises a Local Area Network or LAN 2, a Wide Area Network or WAN 4, and a number of remote computers 6. The LAN 2 comprises a server 8 and workstations 10, indicated individually as 10a, ... 10n. The LAN 2 is coupled to the WAN 4 through a gateway 12, and the WAN 4 comprises workstations 14, shown individually as 14a, 14b, 14c. The IDDB application network 1 also includes a series of workstations 6a, 6b, 6c which access the LAN 2 through dial-up access, for example, a modem connection. Each computer or workstation corresponds to a site in the IDDB application network 1.

From FIG. 1, it will be understood that the IDDB 1 is formed from the set of sites (e.g. server 8, workstations 10, 14 and remote or mobile computers 6) which run a given IDDB application. In this sense, the IDDB application network 1 is a virtual network which runs on a physical communication transport, i.e. LAN, WAN or Internet) and is defined by the members or sites running a particular application. According to the invention, a site can run more than one application, and therefore more than one IDDB application network will exist over the same physical network. For example, in FIG. 1, the remote or mobile computers 6a, 6b, 6c and the server 8 belong to an IDDB application network for the sales department, and the computers 10a, 10b and server 8 belong to an IDDB application network for accounts receivable.

The IDDB application network 1 may also be viewed as a clique, meaning that every site or node is assumed to be able to initiate or receive a connection link to or from every other site or node as required. This means that the underlying physical networking system handles all routing and supplies a logical direct link to every other node. If the IDDB application runs on a common network, such as the Internet, then all sites will have a connection to the common network and every site is accessible by another site using the appropriate IP address. As depicted in FIG. 1, the IDDB application network 1 does not run on a common physical network, but rather comprises the LAN 2, the WAN 4 and remote dial-in sites 6.

Figure 2A:
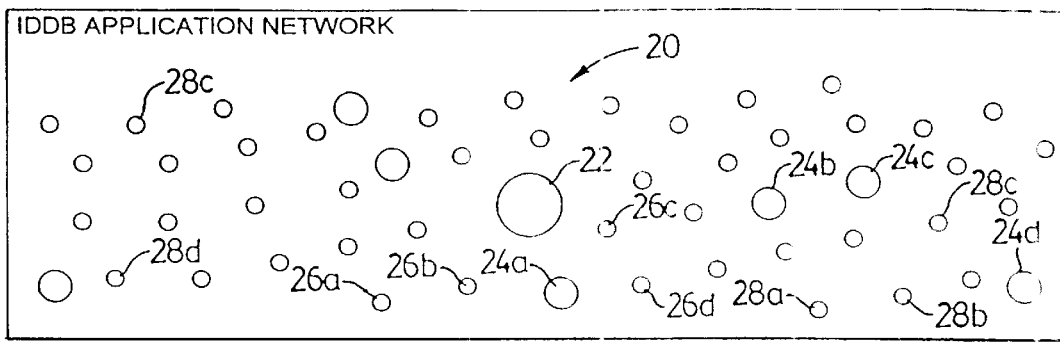
FIG. 2(a) shows in diagrammatic form an example of an IDDB application network according to the present invention.
Figure 2B:
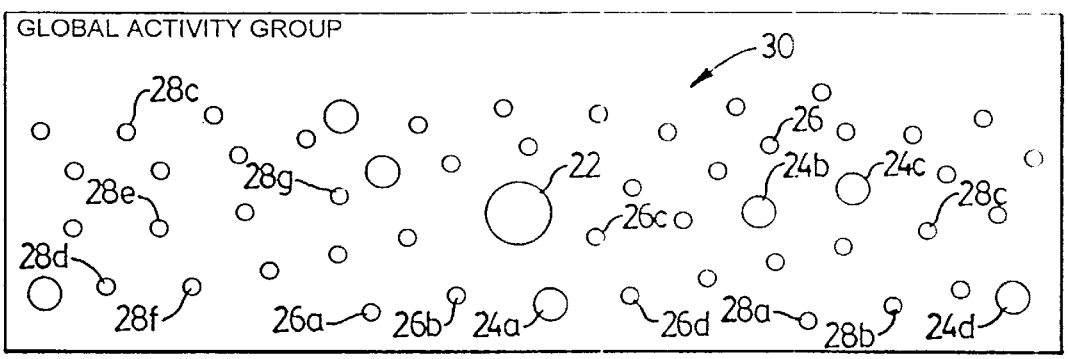
FIG. 2(b) shows the global activity group for the application network of FIG. 2(a)
Figure 2C:
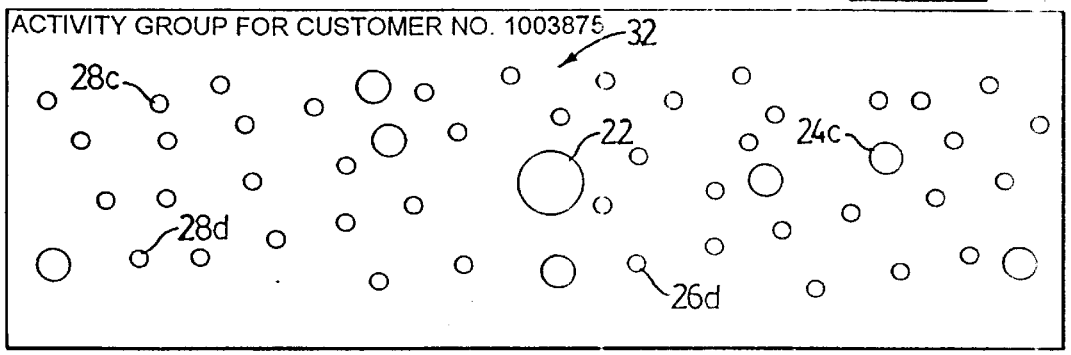
FIG. 2(c) shows an activity group for a first customer in the application network of FIG. 2(a)
Figure 2D:
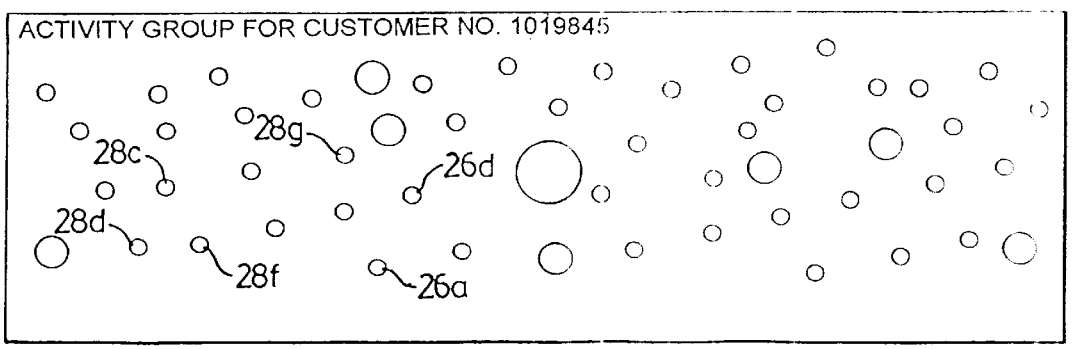
FIG. 2(d) shows an activity group for another customer in the application network of FIG. 2(a)
Figure 3:
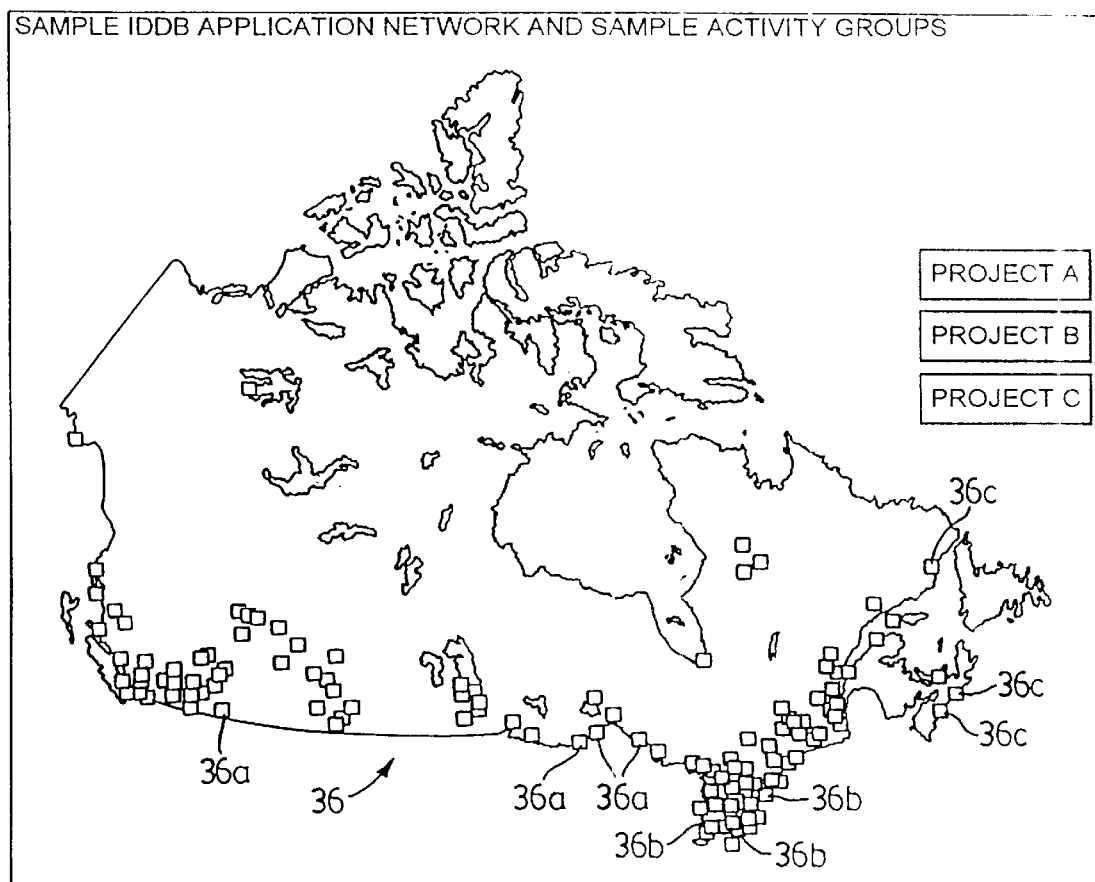
FIG. 3 shows in diagrammatic form another exemplary IDDB application network and activity groups according to the present invention.

The network topology for an IDDB application network 1 according to the present invention is considered further with the examples shown in FIGS. 2 and 3.

Reference is made to FIG. 2(a) which shows an example of an IDDB application network denoted generally by 20. The IDDB application network 20 comprises a head office 22, branch offices 24 and individual office workstations 26 or mobile users 28. Head office 22 typically comprises a large computer, e.g mainframe, running a DB2™ database, or the like, which contains the entire database for the organization (although it will be understood that a central database is not required by the IDDB). Branch offices 24 are shown individually as 24a, 24b, 24c . . . and typically comprise a UNIX-based machine running an Oracle™ database or the like. The individual workstations 26 comprise desktop or laptop computers with a Windows™ platform and run Paradox™ database or the like.

No lines between the sites are shown in FIG. 2(a) because according to the invention all sites, i.e. head office 22, branch offices 24, individual workstations 26 and mobile users 28, are peers and communicate with each other regardless of the presence or absence of other sites in the network 20. For example, mobile user 28b is free to communicate with branch office 24b regardless of whether head office 22 is connected. The structuring and controlling of links between the sites will be described below. As will also described in more detail below, the IDDB application network 20 comprises activity groups.

FIG. 2(b) shows a global activity group 30. By definition, the global activity group 30 is a special activity group which includes all the sites and all the information (including system housekeeping information which is not contained in an explicit activity). In particular, the global activity contains user and site database information, global user permissions, translations of text (e.g. static text tags, menu text . . . ) appearing in the application's user interface and reports.

The information in a global activity is used at all sites, and therefore the global activity group 30 includes all the sites, i.e. head office 22, the branch offices 24, the individual work stations 26 and mobile users 28, in the IDDB network 20 as depicted in FIG. 2(b).

FIGS. 2(c) and 2(d) show individual activity groups. The sites belonging to the activity groups may be the same, overlapping or distinct. For example, if the IDDB application comprises a customer database, then FIG. 2(c) represents an activity group 32 for customer no. 1003875, and FIG. 2(d) represents an activity group 34 for customer no. 1019845. As can be seen, mobile users 28d, 28e belong to both activity groups 32 and 34, i.e. sites 28d and 28e have both customers 1003875 and 1019845. The remaining sites, e.g. 22, 24c, 26d, 28c, are non-overlapping. It is noted that no branch offices 24 or head office 22 are included in the activity group of the information for customer 1019845. In practical terms, this means that head office 22 and the branch offices 24 are not interested in the information of customer 1019845.

It will also be understood that some or all of the sites in the application network 20 may also appear in different application networks (not shown), so that the sites participate independently in each application network.

Reference is next made to FIG. 3 which shows an exemplary IDDB application network 36 for a construction company. In FIG. 3, all the sites are shown with the same symbol as they are peers regardless of the individual physical database size at the site. The IDDB network 36 comprises three activity groups 36a, 36b, 36c. In the context of a construction company, the first activity group 36a comprises the sites participating in "Project A"; the second group 36b comprises the sites in Project B; and the third group 36c includes the sites involved with Project C.

The IDDB 1 distinguishes between two types of sites: (1) stable sites, and (2) transient sites. Stable sites are sites which are long-term members of the application network and are assumed to have consistently high availability. Stable sites are typically machines within, and controlled by, the organization that owns the application, for example, the mainframe 22 and workstations 26 at head office, and the mini-computer and workstations 26 at the branch offices 24. Transient sites, on the other hand, are machines which are either short-term participants in the application network or have only intermittent availability. Transient sites typically comprise machines belonging to home users or mobile users who may not always be connected to the communication network, or sites belonging to their organizations. In the context of a spanning tree, the stable sites are termed "spine sites" and the transient sites are termed as "non-spine sites".

By distinguishing between stable and transient sites, the IDDB 1 attempts to avoid dependencies on sites with uncertain availability, preferably, a site never attempts to contact a transient site, and communications with a transient site are initiated by the transient machine when it attempts to contact a stable site. The algorithms and procedures for distinguishing between stable and transient sites are described below.

In order to replicate all changes made to an activity to all the other sites in an activity group, the database management system for the IDDB (i.e. IDDBMS) includes a network clock and procedures which enable two sites to agree on the age of changed data, so that changes replicate correctly, but unchanged information is not transmitted redundantly. The network clock procedures include procedures for relative clocks and reference time agreement, drift resistant clocks, and checked clocks as will be described in detail below.

Figure 4:
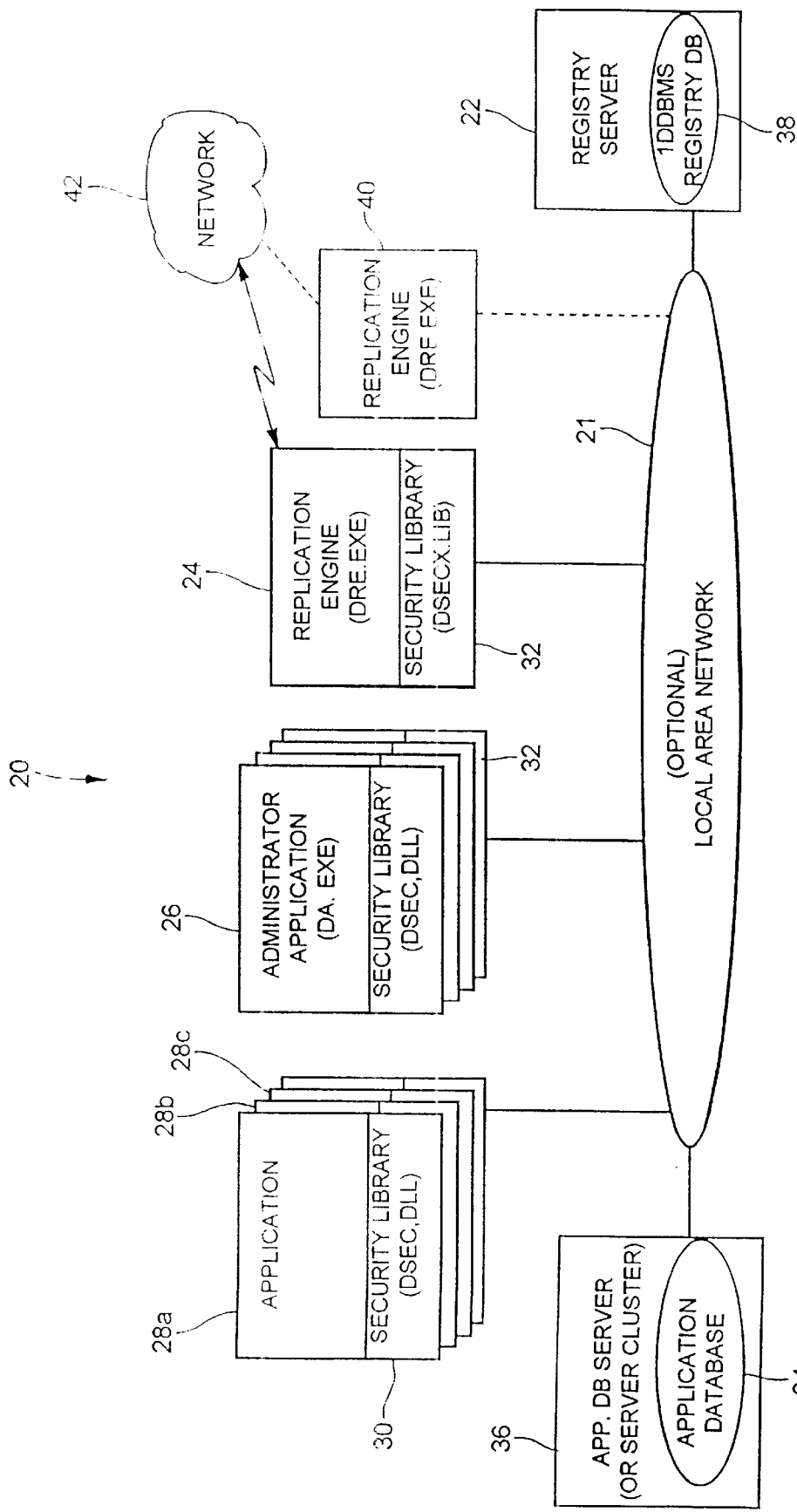
FIG. 4 shows in block diagram form a software architecture for the IDDB of FIG. 1.

Reference is next made to FIG. 4 which shows the software architecture for an IDDB site 20 according to the present invention. The IDDB site 20 comprises the IDDBMS and a number of processes which are depicted as blocks in FIG. 4. The IDDB site 20 includes a registry server 22, a replication engine 24 (DRE.EXE), an administrator application 26 (DA.EXE), and one or more user applications 28, shown individually as 28a, 28b, 28c . . . As shown in FIG. 4, the processes run on separate machines which are coupled to a local area network 21, alternatively, the processes run on a single machine at the site 20. The replication engine 24, the administrator application 26, and the user application 28 are run-time processes, and according to the invention, all communications between any of these run-time components must be secured, i.e. authenticated and encrypted. As shown in FIG. 4, the user application 28 interfaces to the network 21 through an unextended security library 30 (DSEC.DLL), and the administrator application 26 and replication engine 24 interface to the network 21 through an extended security library 32 (DSECX.LIB). For the arrangement shown in FIG. 4, the IDDB site includes one application database 34. The application database 34 resides on an application database server 36 which is accessed through the network 21. It will however be appreciated that the IDDB can run more than one application database.

As shown in FIG. 4, the IDDBMS (i.e. database management system for the IDDB) comprises the registry server 22 and registry database 38, the administrator application 26, the replication engine 24 and user interface 40, and the security libraries 30,32. The user application 28 and application database 34 while present are not part of the IDDBMS.

Referring to FIG. 4, the registry server 22 comprises a run-time component which stores a registry database 38 for the IDDBMS. The IDDBMS registry database 38 tracks the IDDB applications installed at the site 20 and each application's customized security, distribution, and other rules. The registry database 38 may be installed on any machine where it is accessible by the replication engine 24, for example, including the same machine on which the replication engine 24 runs. There is one registry database installed at each site.

Referring to FIG. 4, the replication engine 24 is another run-time process which manages the site-to-site distribution controls for the IDDB applications installed at the site 20. The replication engine 24 is a daemon process that uses a replication engine user interface (DREUI.EXE) 40 to provide the user interface for operator control at the site 20. As shown in FIG. 4, the replication engine includes an interface to one or more other networks 42 for connecting the other sites (not shown) running the application(s). The replication engine 24 uses the registry database 38 (in the registry server 22) to determine the installed applications and their rules. There will be at most one running replication engine 24 at each site 20 regardless of the number of IDDB applications that may be installed at the site 20.

Referring to FIG. 4, the replication engine user interface 40 is a run-time component which provides a user interface for operator control of the replication engine 24 at the site 20. As shown in FIG. 4, the replication engine user interface 40 runs on a separate machine coupled to the LAN 21. The replication engine user interface 40 may be configured in one of three ways. The replication engine user interface 40 runs on the same machine as the replication engine 24. This is typical for a site with a single machine. Secondly, the replication engine user interface 40 runs on another machine located on the same LAN 21 as the replication engine 24. This scenario is shown in FIG. 4 and is typical for office sites where an operator prefers to control the replication engine 24 from a desktop computer rather than walking to the machine running the replication engine 24, this is particularly useful when several different replication engines are operated. Thirdly, the replication engine user interface 40 runs remotely. Such an arrangement is preferred by organizations which have central administrative control over selected remote sites and they do not want to pass control to local site operators.

Referring to FIG. 4, the administrator application 26 comprises a general purpose (i.e. generic) tool which is used to administer the IDDB applications 28 running at the site 20, while keeping each application's security system separate and distinct. The administrator application 26 provides control over user and activity permissions, site operations, and other facilities required by the IDDB applications 28.

Using tools (i.e. utilities) provided by the IDDBMS, an application designer will specify the sets of permission types for each activity, and the administrator application 26 allows the application administrators at run-time to combine the basic permission types into permission groups to which users and sites can be assigned (as described in more detail below). According to this aspect of the invention, administration functions are included in a generic tool which is available to application developers. Thus, there may be several instances of the application administrator 26 running at the same time on different machines, or administering the same or different applications.

Referring to FIG. 4, the security library 32 provides a client application developer with controlled access to a subset of the security engine, and in particular to encryption/decryption and time-stamping functions that the end application uses to read from and write to the application database 34. According this aspect of the invention, all end-user applications share the same security library 30. Preferably, the security library 30 is further encapsulated by a high level class library, for example, in a Delphi™ product, the TSecure table component is preferred instead of the usual TTable component which is used for all database access.

The security library 32 for the replication engine 24 comprises an extended version of the security library 30 and is statically linked into the administrator application 26 and the replication engine user interface 40. The extended security library 32 differs from the application security library 30 in that it allows full access to the entire application database 34, including records of user permissions and administrative functions normally denied to client applications. For example, client applications are never permitted to encrypt using keys to tables which store user permissions, and therefore are prevented from bypassing the administrator application 26 to generate their own legitimate data in those tables in a way that will be accepted by the replication engine 24. Accordingly, if there are several instances of the administrator application 26 running on the same machine at the same time, each is loaded with its own copy of the security library 32. It is possible to publish the security library 32 as a DLL, but as will be appreciated by those skilled in the art this creates a security risk and attackers might be able to use the security library 32 to create malicious applications, which cannot be created using the unextended security library 30. (The operation of both the extended and the unextended security libraries 30,32 is restricted to the permissions owned by the user whose user_id and password are supplied on start-up.)

Referring to FIG. 4, the user application 28 interfaces to the IDDBMS and presents its own custom graphical user interface and reporting functions. The user application 28 allows a user to access the application database 34 running on the database server 36. The user application 28 runs on top of the IDDBMS and in accordance with the invention, all database transactions performed by the user application 28 are against the local application database 34 only. The (unextended) security library 30 provides the user application 28 with database encryption, time-stamping, and other services, as will be described in more detail below. While each application 28 is registered once in the registry database 38, there may be several copies of an application (e.g. 28a, 28b and 28c) running at the same time, and at the same or different machines.

Referring still to FIG. 4, the application database server 36 stores the local (i.e. site) copy of the application database 34. The application database 34 may be running on the same machine as the client application 28, or on a separate server machine 36 (as depicted in FIG. 4), or on a cluster of server machines (not shown). Such choices will depend on the preferences of the designer for the application 28.

The software for the server 36 is typically supplied by the DBMS vendor, and may comprise a simple local database driver, for example a desktop database, or include a complex full server engine implementation, i.e. for client/server databases running on the server or server cluster 36. Because each application 28 may use a different DBMS, there may be several servers 36 running at the site 20.

Alternatively, the application 28 may use more than one application database 34, with each of the application databases 34 individually distributed through the replication engine 24 and stored on a different server machine or server cluster. It will, however, be understood that there is always exactly one copy of the application database 34 installed at each site 20. If application database 34 is implemented as a logical database, i.e. several physical databases form the database 34, then the local database 34 will include all of its parts.

In a practical system, the IDDB site 20 may take several forms.

For example, the IDDB site may comprise a sales agent's notebook computer or a home user's stand-alone machine. Where the site comprises a single machine, the registry server 22, the replication engine 24, the application database 34, and all instances of the administrator application 26 and the user applications 28 run on the same physical machine.

A medium-sized IDDB site, on the other hand, may comprise a client/server installation at a regional office with several hundred individual users, each of which runs the application 28 and possibly the administrator application 26 from his or her workstation. The application database 34 is stored on a server or server cluster 36, and the replication engine 24 and the registry database run 38 on a communication server connected to the Internet or appropriate networks. With such a system, if the local server 36 is down, then all local users are down. (However, users at other sites are unaffected by the failure of the local server 36). In a larger office, it may be preferable to partition the machines into several IDDB sites. For example, a thousand users are partitioned into ten groups of 100 users, and each group has a copy of the local database 34 installed on its own server or server cluster 36. Each group will also have its own replication engine 24 to replicate frequently with the other nine sites in the same building. Such a configuration exhibits improved fault tolerance, since failure of a server 36 will only affect 1/10th of the users in the office.

Activity Groups

It is a feature of the present invention that each site in the distributed database stores "all and only" the data it needs. To allow users to easily find and choose the data they need to work with from the IDDB database, the database is characterized as a set of "activities" on which users can collaborate, and the activity becomes the unit of collaboration. The following description describes a structure for relationships between sites collaborating on common activities, i.e. activity groups, and in particular how to propagate changes efficiently between the members of the activity group.

According to this aspect of the invention, any site with adequate permissions may attach to an activity. Every activity is attached to by one or more spine sites and zero or more non-spine sites. A spine site comprises a stable site which is defined as a long-term member of the application network and is assumed to have consistently high availability. A non-spine site comprises a transient site which is defined as a short-term participant in the application network or a site having only intermittent availability. Transient sites are typically machines belonging to home or mobile users which may not always be connected to the communications network.

Preferably, the distinction between spine and non-spine sites is invisible to the user, thereby allowing the user to participate fully in the activity regardless of the type of site, i.e. stable or transient.

At a system level, a distinction is made between spine sites and non-spine sites in order to manage availability and propagation of updates across the application network. In the IDDB, non-spine sites never link directly with each other in order to avoid creating dependencies on transient sites with uncertain availability. Only spine sites are assumed to have consistently high availability, and thus a non-spine site reports directly to a spine site, though not necessarily always the same spine site. The spine sites themselves are linked as needed using a spanning tree.

Figure 5:
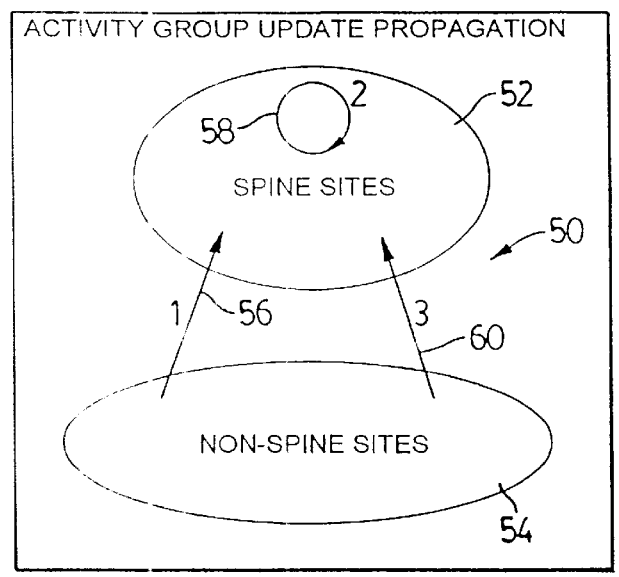
FIG. 5 shows in diagrammatic form update propagation in an activity group according to the present invention.

Reference is made to FIG. 5 which shows how an activity is propagated through an activity group in three stages. In FIG. 5, the activity group is denoted generally by 50 and comprises spine sites 52 and non-spine sites 54. The non-spine sites 54 report changes to the spine sites 52 through a set of links 56. The spine sites 52 report to other spine sites through a set of links 58, and the spine sites 52 report changes to the non-spine sites 54 through a set of links 60. Each link between a pair of sites takes the form of a "database sync" operation. During the database sync operation, the sites determine what record fragments they have and then transmit only updated, i.e. more recent, fragments to each other.

The update propagation procedure involves the following operations. In the first stage, each non-spine site 54 transmits (i.e. link 56) the changed record fragments to one of the spine sites 52. The non-spine site 54 may report to the same spine site 52.

The second stage in the update propagation involves the spine sites 52 sharing all record fragment changes among themselves (i.e. depicted as link 58 in FIG. 5). The changes are shared using a spanning tree established for the spine sites 52. A spanning tree as will be understood by those skilled in the art may take the following form: first, all leaf nodes or 'children' in the tree "push" up the changes to their 'parents' (i.e. the link 58 is a normal synchronization session); then when the parents have seen all the reports from their children, or else timed out, the parents "push" up the changes to their parents; and the process is repeated until the root is reached. When the root is reached (i.e. the root sees all the reports from its children, or else is timed out) the root "pushes" the changes to its immediate children. As soon as each child receives the changes from the root, the children "push" them to their immediate children, and the process is repeated until the leaves are reached. Generation of a spanning is described in more detail below.

The operation of the second stage of the update propagation may be refined. If during the upward wave (i.e. all links between two adjacent levels in the tree) a child is unable to contact its parent, the child attempts to contact other nodes until a working node is located. Every site contacted unexpectedly by a non-child during the upward wave remembers that node, and the site includes the child in its downward wave to ensure that the child will be notified of all updates.

The third stage in the update propagation procedure involves each of the non-spine sites 54 linking again with the spine site 52 as depicted by link 60 in FIG. 5. Because the spine sites 52 are stable sites (i.e. highly available), the onus is on the non-spite sites 54 to link with the spine sites 52.

It will be appreciated that because all changes made at the non-spine sites 54 are normally scheduled to be made visible to the entire spine group (i.e. through links 56, 58) before the non-spine sites 54 link again with the spine sites 52 (i.e. link 60), all sites will see all updates made before the propagation process began at all sites, i.e. spine and non-spine alike, except for updates made at sites which were unavailable during the propagation.

Generating the Spanning Tree

In the context of the present invention, the spanning tree preferably satisfies the following three requirements: (1) minimum height; (2) weighting by bandwidth; and (3) weighting by availability. When propagating changes it is preferable to have as few "waves" of links as possible. With respect to bandwidth, it is preferable for each node to have as much bandwidth as both of its children combined, so that the parent's bandwidth limits do not slow down the propagation algorithm. With respect to weighting, the most available nodes should be higher in the spanning tree. To meet these requirements, the IDDB uses a balanced binary tree as the spanning tree.

An algorithm for generating a balanced binary spanning tree is shown below.

parm ω=weight of site, s∈$S_a$ (higher is better)
begin
   sort the list of sites in descending order by weight
   (* The first node in the list is the root. Each $i^{th}$ node is the parent of the $2i^{th}$ and 2i+1th nodes *)
end
where
   $S_a$ is the set of all sites attached to activity a∈A;
   also known as a's activity group
   A is the set of all of activities Two assumptions are made for the spanning tree algorithm. First, the network is a clique, i.e. any node can link with any other node. Second, each node has a single bandwidth value representative of the typical relative communication channel speed between this node and any other node.

The spanning tree generated by the algorithm above has the following features. First, the spanning tree is a minimum-height balanced binary tree. Second, every non-root node has weight no greater than its parent's weight. More generally, every non-root node has a weight no greater than any node in the next higher level. Third, every leaf node has a weight less than or equal to the weight of any internal node. (Note that the leaf nodes need not all be on the bottom level.) Fourth, where node a and node b are on the same level of the tree and the weight of a is greater than the weight of b, the parent of a will have at least as great as the weight of b's parent. The higher-weight nodes at each level are always children of the higher-weight nodes in the next higher level.

In another aspect, the spanning tree algorithm may be optimized as follows:

let k be the smallest integer satisfying $N \leq 2^k-1$ (where N is the number of nodes),
if $N \leq 2^k-1$ (i.e., the bottom level of the tree is incomplete) insert an empty space in the list in front of the last node,
if there is still room at the right of the bottom level, insert another empty space in front of the next-to-last node,
the last step is repeated until there is no more room in the bottom level or the $2^{k-1}$th mode (i.e. the left-most node in the bottom level) is reached.

Advantageously, the optimization of the spanning tree algorithm preserves the four features (described above) and better distributes the loading between the bottom two levels of the spanning tree.

Figure 6A:
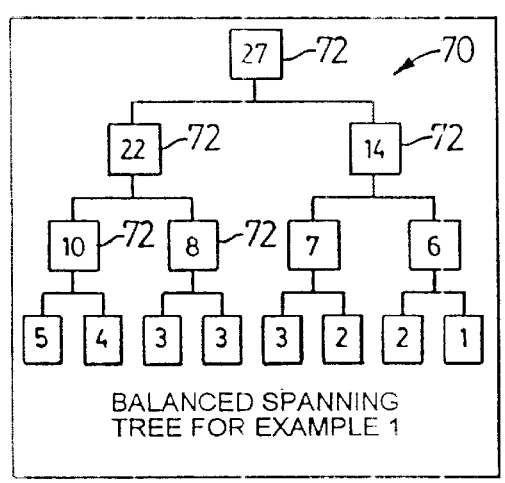
FIG. 6(a) shows a first example of a balanced spanning tree.
Figure 6B:
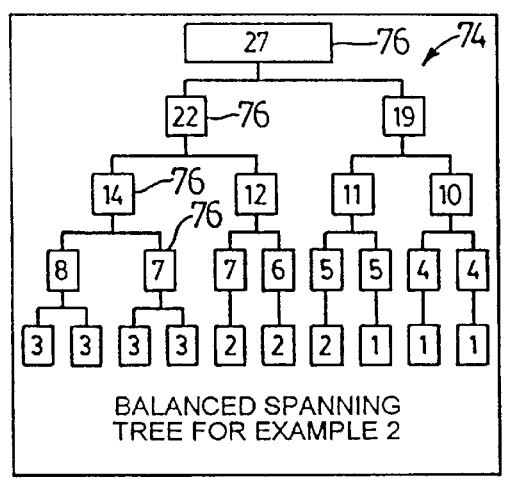
FIG. 6(b) shows a second example of a balanced spanning tree.

Reference is next made to FIG. 6(*a*) which shows an example of a complete balanced spanning tree 70 generated by the algorithm. The spanning tree 70 comprises fifteen spine sites denoted by 72. The sites 72 have similar availability, and their relative bandwidths are 3, 8, 3, 22, 1, 10, 3, 4, 27, 2, 6, 14, 7, 5, 2. Using bandwidth as the only relevant weighting factor, the sites 72 are ordered by weight, 27, 22, 14, 10, 8, 7, 6, 5, 4, 3, 3, 3, 2, 2, 1. Next, the first node is taken as the root and each i'th node is taken as the parent of the 2i'th and 2i+1th nodes, to generate the balanced spanning tree 70 as shown in FIG. 6(*a*).

Reference is next made to FIG. 6(*b*) which shows an example of an incomplete spanning tree 74 generated by the algorithm. The spanning tree 74 comprises 25 spine sites denoted generally by 76. The spine sites 76 all have similar availability, and their relative bandwidths are given as 3, 8, 3, 22, 1, 10, 3, 4, 27, 2, 6, 14, 7, 5, 2, 12, 7, 5, 19, 2, 1, 4, 11, 1, 3. Using bandwidth as the weighting factor, the spine sites 76 are ordered as 27, 22, 19, 14, 12, 11, 10, 8, 7, 7, 6, 5, 5, 4, 4, 3, 3, 3, 3, 2, 2, 2, 1, 1, 1. Applying the algorithm and inserting a space in the ordered list where possible in front of the last nodes produces the spanning tree 74 as shown in FIG. 6(*b*).

It will be understood that the assumption that each node has a single bandwidth value representing the communications channel speed with any other node will not always be a good approximation. For example, in the case of many individual workstations connected to the same WAN, or to the Internet via service providers, the communication speed of site will vary with the communication of other sites due to several factors.

First, external network bottlenecks will affect the speed of the communications channels. A node may be forced to connect with some nodes through a busy remote bottleneck while being able to avoid those bottlenecks when connecting with other nodes. For example, a node in New York usually has faster connections with other nodes in the United States than with nodes in Europe because there is typically lower available bandwidth in cross-Atlantic channels (i.e. undersea cable and satellite links) than in intra-continental channels.

Secondly, external network proximity will affect communication speeds. External network proximity is related to external network bottlenecks, in that, the entire Internet beyond the local network neighbourhood or even the local service provider is viewed as a bottleneck. For example, a node in New York usually has faster connections with another node using the same service provider than with other nodes because bandwidth is generally determined only by the capacity of the communication hardware for the two nodes and the capacity of the router at the Internet Service Provider (ISP). Thus, neither node is affected by the speed of the ISP's own connection(s) with the rest of the Internet or beyond.

Thirdly, multiple local physical network connections will also affect the response of the communications channels. A node may have several physical network connections with different bandwidths, and therefore connections to some other nodes (available through the faster network channels) will always have superior performance than connections to others (available only through the slower channels). For example, a node in New York always has faster channels to another node on the same physical LAN than it has with nodes linked via modem connections to the Internet.

Since there can be substantial variation in the channel speed between pairs of sites, each site may store its bandwidth with other sites. Given the communications bandwidths between all pairs of sites in $S'_a$ (where $S'_a = S' \cap S_a$ the set of all spine sites attached to an activity group) taken as weights of the links (edges) in the graph of the network, it is possible to use any general-purpose spanning-tree generation algorithm to produce a spanning tree. In the context of the present invention, it is preferable to minimize the diameter of the spanning tree rather than maximizing the use of all available highest-bandwidth links.

Reconfiguring the Spanning Tree

Whenever a spine site is added to the activity group, the new spine site is initially assigned an "entering" state. The entering state is propagated through the spine sites of the activity group, and the new spine site is treated as a non-spine site until all existing spine sites have reported that they have seen the new spine site, i.e. by propagation to the spine sites in the activity group. Once reported, the new spine site is then promoted to a normal state and is treated as a spine site. This procedure is preferred to prevent propagation problems so that all spine sites always agree on the set of spine sites in the activity group.

Similarly, whenever a spine site is to be removed from the activity group, the departing spine site is assigned a "leaving" state. The leaving state for the spine site is propagated through the spine sites of the activity group and the departing spine site continues to be treated as a spine site until all existing spine sites have reported (by propagation, to all the spine sites in the activity group) that they have seen the removal request. The departing site is then assigned a "left the group" state and is no longer treated as part of the activity group.

When spine sites are added to or removed from the activity group, the spanning tree must be reconfigured. The spanning tree is reconfigured using a similar election, or equivalent algorithm to ensure consistency and accuracy even when not all sites are on-line simultaneously in order to agree on the change in real time. Preferably, the reconfiguration does not result in the activity group splitting into separate sub-graphs (as is possible with some simple reconfiguration algorithms).

Repairing the Spanning Tree

In addition to adding and removing spine sites from the activity group, there are two situations that call for the reconfiguration of the spanning tree for an activity group. The first comprises a node failure and the second is a node status change. The node status change is handled as a node reconfiguration described above.

The failure of node is handled as follows. When a working node attempts to contact a failed node, the failed node will not answer. The working node periodically retries contacting the failed node, and upon reaching a timeout or a threshold number of failed links, a "reconfigure" operation as described is initiated. If the failed node never returns, the remaining activity group network is intact and recovery is complete. If the node failure is temporary, the node is still reconfigured out of the spanning tree after the timeout. When the node returns, it will initiate a link with some other node during a propagation attempt. If the returning node was not the root, then it will attempt to link with its former parent during the upward wave of links. If the returning node was the root, it will attempt to link with its former children during the downward wave of links. Regardless of which node it contacts, the returning node will see the calling site as in a "left the group" state, thereby informing the returning node that it has been reconfigured out of the spanning tree (i.e. activity group). The contacted node then initiates a normal "add node" reconfiguration to reattach the returning node as though it had never been in the tree.

The bandwidth values utilized by the spanning tree generation algorithm are provided manually or automatically. The bandwidth values may be entered by the administrator at each site based on known up-time and communications hardware numbers. While such an approach is workable, it relies excessively on human intervention, and automatic generation of the bandwidth values is preferred. According to this aspect, the system includes a bandwidth measurement procedure for calculating the bandwidth and availability rankings of each node, or in the general case, of each communications channel based on actual traffic flow. Advantageously, this feature allows the bandwidth values to be dynamically adjusted to reflect ongoing changes in loading and communications equipment. Preferably, the bandwidth measurement procedure accounts for all IDDBMS traffic, by measuring more than one session to ensure that the measurement is not limited to a low traffic period.

Next, the procedure for mapping non-spine sites to spine sites according to the present invention is described.

According to this aspect of the invention, the IDDB system includes a method for a non-spine site to independently select a spine site so that the total mapping is evenly distributed among the spine sites. Because all sites in an activity group, locally store the set of sites belonging to the activity group, this information is available to a non-spine site when selecting a spine site for attachment.

The operation of the procedure for mapping non-spine sites according to the present invention is described with reference to the following pseudo code listing.

Non-Spine-To-Spine Mapping

```
parm    ωₐ = weight of site s ∈ Sₐ (higher is better)
var s    :list of nodes   init S'ₐ;   (*List of all spine sites in a's activity group.*)
    n    :list of nodes   init Sₐ - S'ₐ;  (*List of all non-spine sites in a's activity
                                           group*).
    mapᵢ    :integer    init 0;    (*The i'th non-spine node mapes to the mapᵢth spine
node*)
    posᵢ    :integer    init 0;    (*The ith node is the posᵢth to be mapped to mapᵢ.*)
    try, offset    :integer;
Initial Mapping:
    begin
        sort s in descending order by weight
        sort n in descending order by weight
        for i = 0 to |n| - 1 do begin
            mapᵢ = i mod|s|;
```

-continued $$pos_i = \frac{i+1}{|s|};$$

```
        end
    end
For ith Node, When Linking At Runtime:
    begin
        if map_i is available then select it;
        else begin    (*Try the other spine sites successively, but try them in a
            different order than the other non-spines reporting to this failed spine site
            (as far as possible) by trying every pos_ith site (mod|s|) starting
            from map_i.*)
            try = 1;
            offset = 0;
            while try <|s| and no node has been selected do begin
                if (map_i - try(pos_i))mod|s| = map_i then
                    offset - offset + 1;
                if the (map_i - try(pos_i)+offset)mod|s|th node is available then
                    select it;
                try = try + 1;
        end
    end
    (*Continue regular link with selected node.*)
end
```

The algorithm for mapping non-spine sites as shown above assumes that any non-spine site is free to link with any spine site. The algorithm is run locally at each non-spine site and results in a balanced load distribution for non-spine to spine site links.

Advantageously, the algorithm for mapping non-spine sites-to-spine sites generates a mapping with the following features. First, the number of non-spine sites reporting to each spine site is balanced. Secondly, the higher the weight (i.e. bandwidth) of a spine site, the higher the total weight of the non-spine sites mapped to it. Thirdly, as a result of the failure rollover provision, the non-spine nodes mapped to an unavailable spine node are distributed fairly among the available nodes. In the case of a massive failure, e.g. where a large number of spine sites are simultaneously unavailable, the algorithm still provides a fair distribution. By choosing $-try(pos_i)$ (rather than $+try(pos_i)$) in the central distribution expression (see algorithm above), the higher-weight non-spine sites in a failed group will tend to try the higher-weight spine sites first, while the lower-weight non-spine sites in the group will try the lower-weight spine sites first.

Figure 7:
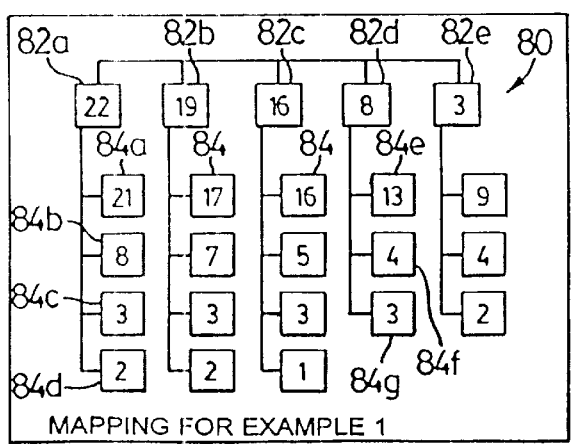
FIG. 7 shows mapping for the first example of FIG. 6(a)

Reference is next made to FIG. 7 which shows an example of non-spine site to spine site mapping generated by the algorithm described above. The mapping is denoted generally by reference 80 and comprises spine sites 82 (shown individually as 82a, 82b, 82c . . . ) and non-spine sites 84 (shown individually as 84a, 84b . . . ). In the example for FIG. 7, the spine sites 82 have the following bandwidths 22, 8, 19, 3 and 16, and the non-spine sites 84 have the bandwidths 5, 9, 3, 16, 2, 1, 13, 4, 2, 8, 3, 21, 7, 4, 3, 17, 1, 3. Following the ordering steps, the spine sites 82 and non-spine sites 84 are arranged as follows:
spine sites:
   22 19 16 8 3
non-spine sites:
   21 17 16 13 9 8 7 5 4 4 3 3 3 2 2 1 1
Following the mapping step, the mapping 80 is produced as shown in FIG. 7. From FIG. 7, it can be seen that the spanning tree 80 is balanced, and the higher the weight of a spine site, the higher the total weight of its mapped non-spine sites. For example, spine site 82a has the highest weight (i.e. 22), and accordingly, the total weight of the non-spine sites 84a–84d is the highest (i.e. 34). If spine site 82d (weight-8) is not available, then the algorithm tries to connect the non-spine site 84e (weight- 13) to the weight-16 site 82c, the weight-19 site 82b, the weight-22 site 82a, or weight-3 site 82e and in that order. The algorithm then tries to connect the weight-4 site 84f to the weight-19 spine site 82b, to the weight-3 site 82e, to the weight-16 site 82c, or to the weight-22 site 82a and in that order. The algorithm then tries to connect the weight-3 non-spine site 84g first to the weight-22 spine site 82a, the weight-16 site 82c, the weight-3 site 82e, or the weight-19 site 82b, and in that order.

According to this aspect of the invention, whenever a non-spine site is added or removed from the activity group, the only effect is to change the non-spine to spine site mapping. It is however to be understood that when any site is added or removed from the activity group, the non-spine nodes or sites will not be aware of the change until after their next link. This means that there will be a window of one or more links for each non-spine site where it will choose a spine site based on old information, thereby resulting in a loading which is not optimally distributed. The effect will however be temporary and is self corrected as the nodes become aware of the changes to the activity group.

Relative Clocks and Reference Time Agreement in the IDDB

As described above the IDDB 1 comprises a database which is distributed or spread over the sites belonging to the application network, and each site works independently on its own data. To propagate changes made to the database, the IDDB includes a procedure for updating changes to fragments at different sites in the activity group. In the context of the present invention, a fragment is a piece of an individual record and comprises a subset of columns in a record. The underlying principle for this aspect of the present invention is that the "most recent fragment survives".

The implementation of the "most recent fragment survives" procedure depends on two sites being able to agree on the age of a fragment. According to this aspect of the invention, it is not necessary that two sites agree on the actual date and time the fragment was changed, rather the two sites may safely share data as long as they can reliably agree on the age of the fragment. This is accomplished by storing a time-stamp with the fragment at the site, and according to this aspect of the invention every fragment has exactly one time-stamp.

The time-stamp comprises an actual date-and-time time-stamp relative to the clock of the local site clock recording when the fragment was last modified. Thus, a fragment will usually have different time-stamps at different sites, but as the site clocks move forward, the age of the fragment increases naturally and all sites are able to agree on the fragment's age at any given time. In other words, each fragment will have a relative age determined by its actual time-stamp at any site relative to the system clock of that site.

For example, site A (e.g. site 14b in FIG. 1) has a fragment $f_A$ with a time stamp $t^f_A$. The local time for site A is $t_A$ and the local time a site B (e.g. site 10a in FIG. 1) is $t_B$. If the time of the fragment $t^f_A$ is 1:00 (hours:minutes), the local time at site A is $t_A=3:00$ and the local time at site B is $t_B=3:10$, then the time-stamp for the fragment at site B is $t^f_B$ is 1:10. While sites A and B do not agree on the actual time the fragment was last modified, the age of the fragment is two hours at both sites, i.e. $t_A-t^f_A=2:00$ and $t_B-t^f_B=2:00$. Without any changes to the local clocks, the sites A, B at time t+1:00 will agree that the fragment f is 3:00 hours old, at time t+6:00 the sites will agree that the fragment f is 7:00 hours old, and so on.

Because the local system clocks at the sites may be unreliable, e.g. easily reset by the user or not tamper-resistant, the clocks are vulnerable to drift and various degrees of deliberate tampering. In another aspect, the present invention includes a procedure for drift-resistant clocks as described below.

According to this aspect, all sites agree on the age of any fragment the sites share in common, within a tolerance of at most δ, according to the invariant given by the following expression:

According to the invention, the relative clock procedure establishes a time invariant when a record is created, by requiring that all fragment time-stamps for a newly created record be set to the current time of the local system clock. Once created at one site, the fragments may be propagated to other sites and the invariant is preserved.

There are two principal situations where sites need to compare or transmit time-stamps for fragments. The first situation involves determining what fragments are new by comparing their ages. The second situation concerns determining the fragment time-stamps when actually transmitting the fragments. In this aspect, in every on-line conversation, the two sites first agree on a reference time for the start of the current conversation. The sites then compare and transmit all fragment time-stamps, not as actual time-stamps, but as fragment ages expressed as offsets from the agreed reference time. Each site then stores the reference time in terms of its local clock. The two sites must also control relative clock drift between them over time, so that fragments at one site do not age faster than at another site. It will be appreciated that such a result would cause inconsistency and integrity problems. To control relative clock drift, the sites remember historical statistics about the relative time differences between their local clocks and use this information to decide whether fragments may be safely transmitted while preserving the invariant. (A procedure for drift-resistant clocks is described in more detail below.)

The operation of the procedure for a two-message protocol to establish agreement on a reference time between sites is described with reference to the following pseudo code listing.

Reference Time Agreement (Two-Message Version)

```
var t_start, t_end :time;   (*Local timing for echo message's send/return*)
    t_ref        :time;   (*Result: agreed reference time (in terms of local clock)*)
For the initiator:                      For the receiver:
  begin                                   begin
  t_start = current_time;
  send ⟨token_request⟩; (*M1*)
                                          receive ⟨token_request⟩;
                                          t_ref = current_time;
                                          send ⟨token_reply⟩;  (*M2*)
  receive ⟨token_reply⟩;
  t_end = current_time;

t_ref = t_start + (t_end - t_start)/2;

end                                     end
```

Fragment Age Agreement Invariant $$\forall s_1, s_2 \in S, f \in F_{s_1}, F_{s_2} : f_{s_1}=f_{s_2} \Rightarrow \|a^f_{s_1}-a^f_{s_2}\| \$ \delta$$

where δ is a constant; S is the set of all sites; $F_s$ is the set of fragments at site s; $a^f_s$ is the age of fragment f at site s.

where δ is related to the maximum acceptable amount of clock drift between any two sites. Typically, the acceptable clock drift δ will have a value of 1.1 hours so that if one site changes to or from daylight savings time before another site, the site will still be able to communicate.

At the beginning of a conversation between two sites, i.e. an initiator and a receiver, the sites agree on a reference time using the two-message protocol. According to the protocol, the initiator site S1 sends one message, M1, and the receiver site S2 sends one reply, M2. The receiver site S1 uses the arrival time of the message M1 as its reference time. The sender site S2 calculates the time interval from the time message M1 was sent $t_{start}$ to the time message M2 was received $t_{end}$, and the midpoint of this time interval becomes the reference time for the sending site S2.

The total transmit time should be less than twice a maximum allowed skew $\sigma_{max}$. If the total transmit time exceeds the maximum allowed skew $\sigma_{max}$, the two-message procedure is repeated until the tolerance is achieved or until a timeout is reached. In a practical system, a maximum skew $\sigma_{max}$ of 1 second is typical to obtain better-than-one-second timing accuracy, which means that the timing pings must have round trip times under 2 seconds. For networks with slower response times, a slightly higher value for the maximum skew $\sigma_{max}$ is chosen.

According to this aspect of the invention, there is also provided a procedure utilizing a three-message protocol for reference time agreement. The three-message reference time agreement procedure is described with reference to the following pseudo code listing.

Using the three-message protocol, the system is less sensitive to transient communication latencies than in the first two-message protocol.

It will be appreciated that the three-message protocol described above can be extended to any number of messages, where each extra message completes another pair that can be used to obtain an additional comparison point, all of which are used in the final average of estimated differences between the local clocks a the two sites S1 and S2.

It is noted that the N-message procedure is preferable to the two-message procedure for two important reasons. First, the greater the number of messages used, the less the probability of reaching the worst-case skew. Secondly, the two-message procedure (described above) allows only one

Reference Time Agreement (N-Message Averaged Version, N=3)

```
var  t_Air          :time;  (*Local estimate of difference in initiator and receiver
                              clocks*)
     t_start, t_end :time;  (*Local timing for echo message's send/return*)
     t_remote       :time;  (*Remote time stamp for receipt of echo message*)
     t_remote—Air   :time;  (*Remote estimate of difference in initiator and receiver
                              clocks*)
     t_ref          :time;  (*Result: agreed reference time (in terms of local clock)*)
For the initiator:                   For the receiver:
    begin                                begin
        t_start = current_time;
        send ⟨token_request⟩; (*M1*)
                                            receive ⟨token_request⟩;
                                            t_start = current_time;
        receive ⟨t_remote⟩;                 send ⟨t_start⟩; (*M2*)
        t_end = current_time;
```

$$t_{Air} = \left(t_{start} + \frac{t_{end} - t_{start}}{2}\right) - t_{remote};$$

```
        t_ref = t_end;
        send ⟨t_ref, t_Air⟩; (*M3*)
                                            receive ⟨t_remote, t_remote—Air⟩;
                                            t_end = current_time;
```

$$t_{Air} = t_{remote} - \left(t_{start} + \frac{t_{end} - t_{start}}{2}\right);$$

```
                                            if t_Air>t_remote—Air
                                                begin swap (t_Air, t_remote—Air); end
```

$$t_{ref} = t_{remote} + t_{Air} + \frac{(t_{remote\_Air} - t_{Air})}{2};$$

```
end                                     end
```

According to the three-message protocol, the initiator site S1 sends a message M1, the receiver site S2 replies with message M2, and the initiator site S1 then replies with message M3. The initiator site S1 calculates the midpoint between the time when message M1 was sent and the time message M2 was received. This value is compared with the local time at the receiver site S2 when the message M1 was received in order to estimate the relative difference between the clocks of the two sites. The receiver site S2 repeats these operations with the messages M2 and M3. The two estimates are then averaged, and the initiator site S1 chooses a reference time relative to its local clock, and the receiver site S2 uses the average difference to calculate the corresponding reference time relative to its own local clock, and thus, both local reference times will reflect the same real time.

As described, the three-message reference time procedure utilizes an extra message in order to achieve better reliability on inconsistent communication lines. Both sites S1 and S2 estimate the difference in the initiator and receiver clocks $t_{Air}$ and then use the average to determine local reference times.

site, i.e. the initiator site S1, enough information to estimate the actual clock difference $t_{ir}$ between the two sites, i.e. only the initiator S1 sees and times a full round-trip message pair.

As in the case for the two-message procedure, the total transmit time for any message pair should be less than twice the allowed maximum skew $\sigma_{max}$. If not, the message pair is not considered as a data point and the procedure continues until the desired number of valid message pairs is reached or until a timeout threshold is reached.

Once the two sites S1 and S2 agree on a reference time, the sites proceed with transmitting all fragment time-stamps as delta's or offsets from the reference time. For example, consider sites A and B which have agreed on their reference times $t_A$=3:00 (local time at site A) and $t_B$=3:10 (local time at site B), and the local time stamp of the fragment $t^f_A$ is 1:00. The age of the fragment $a^f_A$ is then 2:00 (hours:minutes), i.e. $t_A - t^f_A$. If the fragment f does not exist at site B but should be replicated at B, then the fragment f is transmitted to site B along with its age $a^f_A$ (as known to site A). The fragment f is stored at site B and the age of fragment at site B is $a^f_B$=2:00 (i.e. $t_B - t^f_B$) and the invariant is preserved. If the fragment f exists at site B and has the same age as at site A (i.e. $a^f_A = a^f_B$), then no further no adjustments need be done and the invariant is preserved. If the fragment f exists at site B but is older than the fragment f at site A (i.e. $a^f_A < a^f_B$), then the newer fragment f at site A is transmitted to site B along with its age $a^f_A = 2:00$. The newer fragment f is stored at site B and the invariant is preserved. The other situation occurs where the fragment f at site B is the newest (i.e. $a^f_A > a^f_B$), and in this case, the fragment is transmitted to site A with its age $a^f_B$ (as known to site B), and stored at site A, and the invariant is preserved.

Drift-Resistant Clocks

In another aspect, the present invention provides a method for correcting accumulated clock drift which may occur between sites in the network.

The effects of accumulated clock drift are first considered by way of the following example.

Sites A and B which share a fragment f. Initially, the clocks at both sites A and B are accurate. On June 1, a user at site A updates fragment f and the update needs to be reported to site B. Site A links to site B and updates fragment f at site B, and disconnects. At this point, the time-stamps for fragment f between the sites A and B are consistent, i.e. both may show slightly different actual time-stamps, but both will agree on the age of the fragment.

If the clock at site B is altered, e.g. the clock at site B is turned back six days. On June 5, a user at site A updates fragment f, and on June 7, site A links to site B. In the absence of any mechanism to check the de-synchronization between the times at site A and site B, the replica of fragment f at site B will appear to be more recent (i.e. one day old) whereas the fragment f at site A which will appear to be older (i.e. two days old). This occurs even though the fragment f at site B is actually an old update from site A. The older version of the fragment f will overwrite the newer version of the fragment and consequently the changes to the fragment f at site A will be lost. (A similar result occurs when a site's clock is moved forward.)

A partial solution to this problem involves having each site store the last delta clock difference between the site and any site to which it links. When the sites link again, the sites compare clocks and also compare the delta to the delta stored from the last link. If the two delta's are off by more than a set amount (e.g. 1.1 hours, to allow for daylight savings time differences), or if the two delta's differ by more than the elapsed time since the last successful link, then the link is rejected. It will be appreciated that this approach puts an upper bound on the clock changes that can be permitted and detected between two consecutive links. If only the delta from the last link is compared, then multiple changes in the same direction from link to link will allow two sites' clocks to drift with respect to each other over time. For example, this can happen if one clock runs slightly faster or slower than another. It can also open a window opportunity for attackers.

According this aspect of the invention, the problem of clock drift between sites in the network is addressed by extending each site's knowledge of its link histories. Instead of storing the delta from the last link with each other site, each site i stores the maximum and minimum historical delta's $t_{\Delta ijmax}$ and $t_{\Delta ijmin}$, determined in all past links to each other site j. According to this aspect of the invention, problems resulting from gradual drift over time are eliminated by preserving the invariant according to a procedure as illustrated with reference to the following pseudo code listing.

Clock Drift Control Procedure

```
var t_Δir max, t_ir min :time; (*Max and min deltas to remote site r, stored across
                                  successive links)
For the first link between i and r.
    begin
        (*Calculate this session's t_Δir using a reference time agreement protocol see above*)
        t_Δmax = t_Δir :
        t_Δir min = t_Δir :
    end
For each subsequent link:
    begin
        (*Calculate this session's t_Δir using a reference time agreement protocol
          see above*)
        (*This t_Δir must not cause t_Δirmax - t_Δirmin to exceed δ - δ_max *)
        if (t_Δirmax - δ - δ_max)>t_Δir or t_Δirmin + (δ - δ_max)< t_Δir)
            reject link;
        else if (t_Δir > t_Δirmax )
            t_Δirmax = t_Δir;
        else if t_Δir < t_Δirmin )
            t_Δirmin = t_Δir;
```

It will be understood that the value for δ should be chosen as low as possible in the importance of catching gradual clock drifts. In applications where daylight savings time changes are not important, or could produce errors, choosing a lower value for δ, e.g. ten minutes, will further reduce exposure to tampering attempts.

If the clocks at two sites are altered by the same amount and in the same direction, the delta remains the same and the two sites are still be able to communicate. This is acceptable because it means that the two sites will still agree on the relative ages of all fragments they hold in common and therefore they may still safely share data.

There may, however, be situations where the clock of one site is tampered with between communication sessions in such a way that the clock drift control procedure shown above cannot detect the change. For instance, a user might change the system clock forward, or backward, make changes to the database resulting in fragments whose apparent ages are less, or more, than their true ages and real time, and then reset the system clock to correct the time. When the site connects to other sites, its clock will appear to be acceptable according to the above protocol but its fragments will have ages that are incorrect.

To handle such situations, the replication engine includes a procedure to log an audit trail whenever a future-dated time-stamp is encountered. The processing of the fragment with logged time-stamp is then up to the application designer. In one scenario, the fragment is deemed corrupt and rejected. The fragment is overwritten by any other version of the same fragment obtained from another site.

In another scenario, the fragment is treated as current. The fragment's time-stamp is set to the current time, stored in the local database at the site, and then the fragment is replicated normally by the replication engine. Such an implementation allows a legitimate user to change a record and set the time-stamp to the future so that the change remains in the database and cannot be undone by other users, but future changes are still able to override and propagate normally. In a similar fashion, the fragment is back-dated by a legitimate user to appear to be done in the far past. Because such a change appears to be older, the fragment is replaced by either the original version of the fragment that was changed or by newer versions of the fragment changed at other sites.

Checked Clocks

As described above, the previous procedures maintain system integrity even in the presence of local clock tampering at one or more sites. In another aspect, the present invention includes a checked clock procedure to better manage local site clocks.

The checked clock procedure has two principal features. First, the checked clock procedure prevents many tampering attempts and accidental clock errors in the first instance. Secondly, the procedure ensures consistent clock time-stamps within a site. Because each site may have separate workstations, there may be several mutually inconsistent clocks. Therefore, if several workstations update local fragments at the same real time, the fragments should still have consistent time-stamps, and therefore ages, regardless of the clock setting of the local workstation through which the update was performed.

The checked clock procedure first identifies one machine and one process at each site which has fairly high availability and can act as a designated time keeper. For example, the replication engine 24 (FIG. 4) is suitable. Each workstation checks its clock and defers to the replication engine's checked clock, so that on start-up, each application uses a reference time agreement protocol to determine the time $t_{\Delta wr}$, the difference between the clock of the workstation and the reference clock of the replication engine for example. Whenever a fragment is modified, its time-stamp is set to the workstation's local clock offset by the time $t_{\Delta wr}$. According to this procedure, two fragments updated at the same time and at the same site by two different workstations will differ in age by at most $2\sigma_{max}$.

The next step in the checked clock procedure involves protecting against clock changes after the replication engine and the workstations have been started. On many platforms, there are calls to get the time since the system was started and the results will be consistent even if the user changes the system clock. If available, these calls can be easily used instead of the usual clock interrogation functions to generate correct time-stamp data. No further checking is necessary except to handle the case where the tick count wraps back to zero.

In a system where there is no tamper proof way to measure the passage of time since the initial reference agreement, for example tick counts, the checked clock procedure relies on the system clock as follows. Each machine's checked clock, including the replication engine's clock, sets up a system timer that will invoke a call-back function at regular intervals, for example every 60 seconds. On each timer event, the checked clock procedure compares the current system time with the stored system time from the last event. The difference should be approximately equal to the timer interval, and if it is, then the current system time is stored and the checked clock procedure waits for the next call-back. It is presumed that the checked clock procedure can still reliably measure the amount of time that has passed since the reference time was established.

If the timer event for a checked clock discovers an unexpected system clock change, the procedure first tries to renegotiate a new reference time with the replication engine. If the replication engine is not available, or it is the replication engine's own checked clock that encountered the time fault, the procedure makes a note of the amount of the discrepancy with the original value while still maintaining knowledge of the original value. The future timer event will check first against the originally-expected time and then against the known discrepancy.

A simplified checked clock procedure according to the present invention is shown in the following pseudo code listing. The simplified checked clock algorithm assumes that, while it may not be able to rely on the system clock's actual date/time, it can assume a tamper proof timer which will let it accurately measure elapsed times while the checked clock is running. In particular, the elapsed time since the initial reference time agreement with the replication engine is measurable.

Checked Clock Protocol (Using Tamper Proof Timers)

```
var t_start time;    (*Agreed reference time (in terms of replication engine
                       clock) *)
    ticks_start :integer; (*Number of local system timer ticks corresponding to t_start*)
Startup (for non-DRE checked clocks):        Startup (for DRE's checked clock):
  begin                                        begin
    (*Calculate t_ref and t_Awr using a
       protocol like the Reference Time Agreement procedure described above)
    start = t_ref − t_Awr ;                      t_start = current_time;
    ticks_start = current_ticks;                 ticks_start = current_ticks;
  end                                          end
```

It will be appreciated that the simplified checked clock procedure shown above relies on the replication engine's clock being accurate on start-up, but not thereafter. As a result, the simplified checked clock procedure is not sensitive to local clock changes because it does not rely on the workstation's clock at any time, unless it runs on the same machine as the replication engine.

In a system where a tamperproof timer is not available, the present invention includes another checked clock procedure as shown below in the form of a pseudo code listing.

The procedure is suitable provided a configurable system timer event, for example WIN32's WM_TIMER message and associated timer call-back routines, or their equivalent, are available. The checked clock procedure shown below comprises a protocol which utilizes the system clock (which is potentially unreliable) together with a system timer event mechanism in order to implement a checked clock that is not sensitive to local changes.

According to this protocol, every time interval $t_\Delta$, the system clock is checked for reasonableness. If shift errors are detected in the system clock, the checked clock compensates, either by renegotiating a reliable time with the replication engine, assuming the replication engine is available and its clock is functional, or by recording the accumulated error.

Checked Clock Protocol (with Tamperproof Timer Events)

Assuming an attacker is able to tamper with the local workstation clock but not the system clock on the replication engine, the attacker could write a program which periodically nudges the local clock consistently forward or backward by a small amount. The maximum amount of undetected error that can be induced following this method is time $t_{err}$ every time $t_\Delta$ the checked clock has been running. In practice, the maximum is significantly less because the attacker's changes must be small enough to avoid triggering a renegotiation attempt with the replication engine's clock even if other system events, for example loading, already introduce other irregular errors into the timer events. In another aspect, the checked clock protocol according to the invention may be extended to prevent or limit this attack by requiring regular periodic renegotiation every time $t_{reneg}$ with the replication engine checked clock. The implementation of the renegotiation step incurs the overhead of at least three messages.

```
parm    t_4             :time;       (*Standard time between timer events*)
        t_err           :integer;    (*Maximum allowable error in tick events*)
var     t_start         :time;       (*Agreed reference time (in terms of DRE's clock)*)
        t_prev, t_now   :time        (*System clock time during last and current events*)
        t_accum_err     :time;       (*Accumulated discovered error*)
Startup (for non-DRE checked clocks):       Startup (for DRE's checked clock)
    begin                                       begin
        (*Calculated t_ref and t_Δwr using a
            protocol like the Reference Time Agreement procedure above)
        t_start = t_ref - t_Δwr ;                   t_start = current_time;
        t_accum_err = 0;                            t_accum_err = 0;
        t_prev = t_start;                           t_prev = t_start;
        set timer to generate event every t_Δ;      set timer to generate event every t_Δ;
    end                                         end
On timer event:
    begin
        t_now = current_time;
        if (|t_now - t_prev - t_Δ|>t_err )begin
            if (this is not the DRE's checked clock, and the DRE checked clock
                is available)
                begin (*Reperform startup*) end
            else
                begin t_accum_err = tf_accum_err + t_now - t_prev - t_Δ; end
            end
            t_prev = t_now ;
    end
When application requeats a time-stamp time;
    begin
        t_now = current_time;
        if (0 < t_now - t_prev < t_Δ) (*if reasonable, before next expected event*)
            begin return t_now - t_accum_err; end (*return full-precision reasonable
                                                    time*)
            else                           (*else let next timer event catch the error
                                                    but*)
                begin return t_prev - t_accum_err; end (*return last-known reasonable time*)
    end
```

As can be seen, the checked clock procedure relies on the system clock for the replication engine being accurate on start-up, but not necessarily thereafter. Each timer event checks whether the clock time differs from the expected time, but does not record the difference if the difference is less than time $t_{err}$. It will be appreciated that there may be more small errors in one direction than in the other. As a result, an attack on the system becomes possible. However, attempting to track and catch a bias in the direction of the small errors is unlikely to be useful because in most real systems the errors are likely to be biased in one direction, for example forward, because when the system is loaded timer events may be delayed even during normal operation when the system clock has remained accurate.

In another aspect, the checked clock procedure is extended to improve the case where an error is detected and the replication engine checked clock is unavailable. The procedure includes the step of recording the accumulated error amount, but does not attempt another renegotiation with the checked clock of the replication engine until another error is detected. According to this aspect of the invention, the procedure periodically, attempts to immediately renegotiate instead of performing the usual timer event procedure when there is an accumulated error amount, i.e. a failed pass negotiation. If the checked clock of the replication engine is still unavailable, the usual time event procedure is followed. The advantage of this approach is that if the checked clock of the replication engine is temporarily unavailable, the checked clock of the workstation renegotiates sooner.

The checked clock procedure described above is extended to protect the entire application network by having the replication engine of each site match its checked clock against a global timer resource, in addition to having each workstation match its checked clock against the local replication engine. Following this extension, the replication engine no longer needs to assume that its local time at start-up is correct, however, a dependency on a central timer site resource is created.

The IDDBMS Registry

Referring back to FIG. 2, the IDDB 1 according to the present invention includes the IDDBMS registry 38. The IDDBMS registry 38 stores information about a site and the applications 28 located at that site including certifications. Preferably, all applications 28 are certified in themselves and also to run at the site.

The organization of the IDDBMS registry 38 (FIG. 4) is now described in more detail. The IDDBMS registry 38 comprises a dApplication Table, a dKey Table, a dLanguage Table, a dMessage Table, a dMsgLang Table, a dLog Table and a dSite Table, as shown below.

The dApplication Table contains one record for each application, and includes the following fields:

| Field | Type | Comment |
|---|---|---|
| ApplicationID | Long | Allocated ID, unique for each application. Also the application's serial number |
| OCACert | Binary | This is the OCA certificate (licence) for the organization deploying the application, signed by the trusted root. It must include a serial number, valid date range, the organization's name, contact information, the ACA signing (public) key, and any other signing keys. It may also include additional information such as a minimum and maximum for ACA serial numbers that may be licensed by this OCA (e.g., to limit the number of IDDB applications that can be deployed under this licence) or other information that adds permissions or places restrictions on this licence. |
| ACACert | Binary | This is the ACA certificate (licence) for this application itself, which must be signed by the OCA signiny key that appears in the OCACert certificate above. It must include a unique serial number (the ApplicationID), valid date range, the application's name, developer support or other contact information, and the site, user, release, command, and other signing (public) keys. It might also include a maximum number ot sites that can be attached, or other information that adds permissions or places restrictions on this licence. |
| EdRelCert | Binary | This is the edition/release certificate (licence) for the currently installed version of the application, which must be signed by the ACA release signing key that appears in the ACACert certificate above. It must include at least an edition ID and release ID, valid date range, |

| Field | Type | Comment |
|---|---|---|
| AppSiteCert | Binary | DC information, and the text edition and release name. This is the Site's Certificate that licenses it to run the appiication, and it must be signed by the site signing key that appears in the ACACert certificate above. It must include the unique SiteID (same as in the SiteCert-see Site table, below), the valid date range, and optionally other information to be used by the application, such as a local driver name (or this can be stored in added fields). |
| Stamp | Stamp | |

The dKey Table has one record for every symmetric cryptographic key used to secure the IDDBMS registry. Each site will have the same records with the same "Key.KeyNames", but with different "Key.Values", as described in more detail below. The dKey table comprises the following fields:

| Field | Type | Comment |
|---|---|---|
| KeyName | Text | Globally unique for all installations of the IDDBMS. |
| Value | Binary | The key value, encrypted with a key derived frotn the site's administrator password. |
| Stamp | Stamp | |

The dLanguage Table contains one record for every language recognized by the IDDBMS. Each application, and the IDDBMS tools and utilities, can support any desired subset of these languages. The dLanguage Table comprises the following fields:

| Field | Type | Comment |
|---|---|---|
| LanguageID | Long | Globally unique for all installations of the IODBMS. |
| NameMsgID | Long | This language's translated name. [Foreign Key: dMessage.MessaqeID] |
| FontName | Text | Default typeface, if applicable. |
| PointSize | Integer | Default font size, if applicable. |
| Direction | Integer | Text flow direction. |
| Stamp | Stamp | |

The dMessage Table includes one record for every translated message used by the IDDBMS itself (in its tools and utilities, etc.). The dMessage Table comprises the following fields:

| Field | Type | Comment |
|---|---|---|
| MessageID | Long | Globally unique for all installations of the IDDBMS. |
| Stamp | Stamp | |

The dMsgLang Table includes one record for every translated message used by the IDDBMS if the language is subscribed to at this site. The dMsgLang Table comprises the following fields:

| Field | Type | Comment |
|---|---|---|
| LanguageID | Long | [Foreign Key: dLanyuage.LanguageID] |
| MessageID | Long | [Foreign Key: Message.MessageID] |
| Text | Binary | The message text in this language. Stored as binary to support both single- and multi-byte Character sets. |
| Stamp | Stamp | |

The dLog Table includes audit and other log messages that are not application-specific. The dLog Table comprises the following fields:

| Field | Type | Comment |
|---|---|---|
| SiteID | Long | [Foreign Key: dSite.SiteID] |
| LogNo | Long | Log entry number, unique locally (within each site). Not a distributed TDDBMS-allocated ID. |
| Severity | Integer | Severity level. |
| Message | Text | The log message text. |
| Stamp | Stamp | |

The dSite Table as shown below includes dSite.LogNoMin and dSite.LogNoMax fields to help ensure that no messages are lost due to user tampering. The dSite Table has the requirement that the log contain all consecutive log numbers in the given range. If the log numbers are not consecutive, then alert messages are sent to the system administrators.

As shown, the dSite Table contains one record that stores the local site's contact and housekeeping information. The dSite Table also includes the following fields:

| Field | Type | Comment |
|---|---|---|
| SiteID | Long | Globally unique across all installations of the IDDBMS. Also the site's serial number. |
| SiteCert | Binary | This is this site's certificate, signed by the trusted root. It must include a unique serial number (the SiteID), valid date range, site name, support contact information (e.g., a local administrator's name and phone number), default LanguageID, and whether this is a spine or non-spine site. It may optionally include other information, such as the site's normal latitude and longitude if applicable (useful for network mapping displays), or a company name for sites internal to a company. [Foreign Key: The LanguageID embedded in the certificate corresponds to a Language.LanguageID] |
| PasswordHash | Binary | Digest of this site's administrator password, which password is used to lock this registry database. Used to validate the password when entered; the registry encryption key must be derived from the password using a different digest algorithm than that used to create this hash (i.e., if MD2 is used to calculate the PasswordHash value, use SHA or some other non-MD2 algorithm to derive a key from the password. |
| LanguageID | Long | Site's default language. Foreign Key: Language.LanguageID] |
| Stamp | Stamp | |
| LogNoMin | Long | Lowest Log.LogNo entry that has not yet been rolled off the system. This can be done manually, under local administrator control, or automatically based on age or the total log size. |
| LogNoMax | Long | Highest used Log.LogNo entry. |
| LastKnownGood Clock | Date/Time | Last externally confirmed consistent local clock value (see description for Drift-Resistant Clocks above. |
| StampLog | Stamp | |

The Application Database Structure

As shown in FIG. 4, the IDDB 1 includes an application database 34. The application database 34 according to this aspect of the present invention is different from the concept of a conventional database. A conventional database comprises a monolithic structure containing a collection of related information, and users retrieve portions of the information from the database as needed.

The application database 34 according to the present invention comprises a collection of activities that are collaborated upon by various sites and each site stores only the activities its users need. In other words, the application database 34 comprises the information entered at each site and the database is distributed over the sites belonging the network.

As described above for activity groups, each activity is independently attachable and independently replicated. The feature of independently attachable activities allows users to choose or belong to different sets of activities. The application database 34 also allows one activity to logically be within another activity group. For example, if an organization has many projects, and each project is organised under a branch office, then the Project activity group could logically fall under the related Branch activity. This feature is then used to let users see only projects within their branch, or within the branches to which they have attached.

The application database 34 according to the present invention will be now described in further detail.

As described the application database 34 comprises a collection of activities and the associated information. In the following description, these definitions are used. An activity is a basic unit of collaboration and comprises a connected and rooted set of related data which will be of interest to a subset of sites (i.e. users who will want to read or update the data). An activity part comprises a subset of an activity which may be independently used by different sites and users, in other words, not each site that uses an activity part may use the entire activity. An activity table comprises a table wherein each unique record defines an activity.

According to the invention, an activity is defined by one database record, termed the root activity record, and the activity comprises: (a) the root record; and (b) all (or a subset) of records that are related to the activity record. The related records are specified using path relationships of one-to-one, or one-to-many (but not many-to-one or many-to-many). It will be appreciated that the group of records is connected because there is a path to every such record that includes only records that are also part of the same activity. In the description of the application database 34, direction for the database schema is defined as "up" for the direction of the "one" end of all one-to-many relationships and "down" as the direction of the "many" end. Accordingly, an activity comprises the activity record and some or all related records beneath it (i.e. "down") in the schema. It will also be understood that if one record in a table is an activity record, then all records in that table are activity records, and the table itself is known as an activity table.

The structure of an activity according to the present invention provides several advantages. First, an activity is easy to describe because every activity is rooted, i.e., utilizing the sense of direction described above, the paths from the single activity record (the root of the activity) to the connected records (i.e. one-to-one and one-to-many) are easily navigated. Secondly, the structure of an activity facilitates description in the database, i.e. the set of all activities in the database is the set of all of records in all activity tables. The third advantage arises because all records in an activity record are the same "kind" of activity (e.g. every record in a Customer table represents a customer). Accordingly, distribution/replication rules will apply to the "kind" of activity, and advantageously the distribution/replication rules can be specified at design time and considered as part of the database schema.

The organization of the application database 34 is further described by way of an example for a construction projects database for a construction company.

The construction company is exemplary of a typical construction company which comprises a number of worldwide branches and a geographically distributed work force. Each branch office is responsible for maintaining its own list of suppliers. The work force includes estimators and purchasers who are concerned with obtaining quotes for construction projects, materials, subcontractors, etc. The estimators and purchasers may spend most of their time in the field and enter data in mobile or home computers, but work in collaboration.

Each construction project comprises a set of estimates and purchase orders. The estimate comprises a standard list of estimating categories, possibly assigning a default supplier to each, and each category included in the estimate has one or more detail lines wherein each detail line shows the quantity and price of a particular product. The purchase order comprises one or more detail lines and each detail line shows the quantity and price of a particular product. The construction company in this example also maintains a standard list of cost categories and products to be used by all branches.

Figure 8:
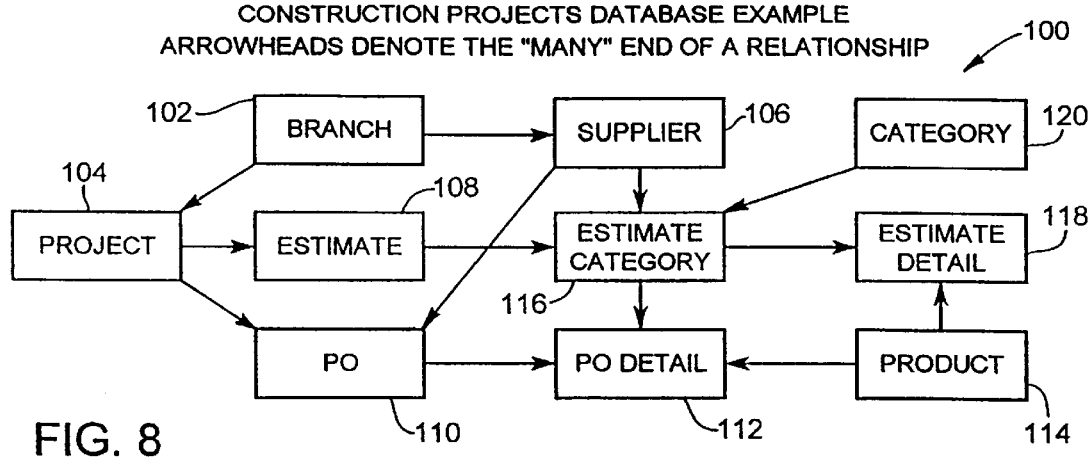
FIG. 8 shows in block diagram a database structure for an IDDB application.

Reference is made to FIG. 8 which depicts an application database 100 for such a construction company. As shown in FIG. 8, the application database 100 for the construction company comprises a collection of tables. The branch table 102 is related "one-to-many" to a project table 104 and a supplier table 106. For the construction company, each branch of the construction company maintains its own list of suppliers, and each project maintains its own internal estimates and purchase orders, and users may collaborate on these. Since the branch office 102 can be involved in more than one project or use more than supplier, the project table 104 and supplier table 104 are connected to the branch 102 as a "many" head connection. The project table 104 is connected to an estimate table 108 and a purchase order table 110. Since a project can have more than one estimate and/or purchase order, the connections between the project 104 and the estimate table 108 and the purchase order table 110 are also of the "many" head type.

As shown in FIG. 8, the purchase order table 110 is connected to a purchase order detail table 112. The purchase order detail table 112 provides additional information and is a many head connection. The purchase order detail table 112 is also connected many-to-one to a product table 114. The purchase order table 110 is related many-to-one to the supplier table 106, i.e. a supplier may be involved in more than one purchase order.

The estimate table 108 is linked with an estimate category table 116 through a many head connection. The estimate category table 116 is linked through a many head connection to an estimate detail table 118. The estimate detail category table 118 stores additional information on the estimate categories in table 116. As shown, the estimate category table 116 is related many-to-one to the supplier table 106 and a category table 120.

The application database 100 as described fulfils two principal requirements of the construction company, namely, each branch is able to maintain its own list of suppliers, and each project is able to maintain its own internal estimates and purchases orders. The application database 100 provides this functionality and allows users to collaborate on these activities. In the context of the database structure, the branch table 102 and project table 104 comprise activity tables, and each record in the branch and project tables 102, 104 defines a unique activity upon which users may collaborate. For example, only sites with users working on Project 123 need to store Project 123's data, and only sites with users maintaining suppliers for Branch A need to store the data for Branch A. It will be understood that the selection of activity tables depends on the requirements of the particular business utilizing the IDDB and particularly on what kinds of collaborations should be allowed. For example, if the application database 100 was intended to be deployed to suppliers as well as to internal staff, then the supplier table 106 could become an activity table, i.e. since different suppliers care only about their own information.

Figure 9:
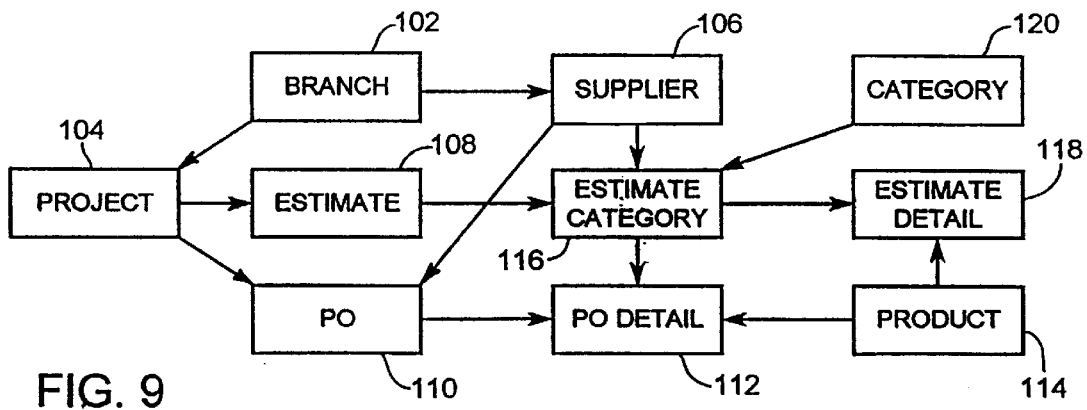
FIG. 9 shows the operations for identifying activity tables for the database structure of FIG. 8.

Once the activity tables have been identified, i.e. the Branch 102 and Project 104 tables as shown in FIG. 9, the next step in the organization of the application database 100 involves assigning the other tables to one of the activity tables or to the global activity.

Figure 10:
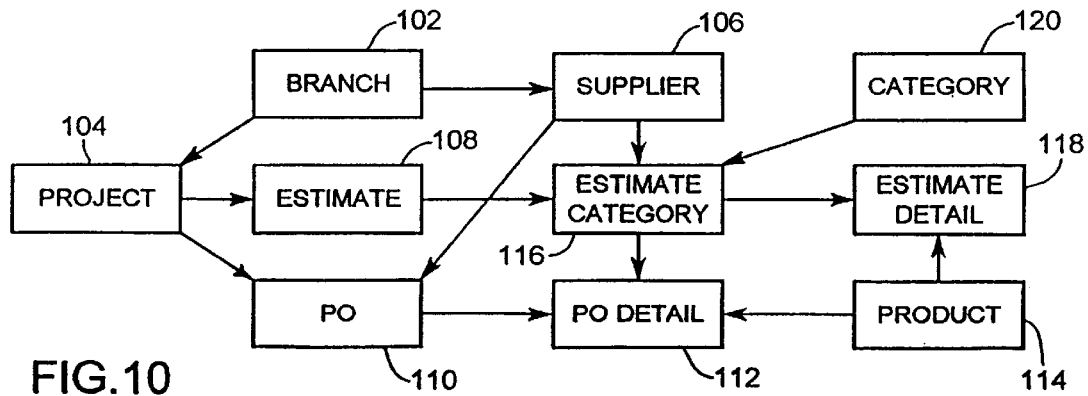
FIG. 10 shows the operations for assigning the tables to activities.

Reference is made to FIG. 10 which highlights the Supplier table 106. According to the requirements of this exemplary construction company, each branch maintains its own supplier list. As a result the Supplier table 106 is selected as part of the Branch activity table 102. It will be appreciated that the Supplier table 106 cannot be part of the Project activity table 104, since there is no path composed of one-to-one and one-to-many relationships leading to the Supplier table 106 from the Project table 104. The other option is to assign the Supplier table 106 to the global activity. The Supplier table 106 would be assigned to the global activity in a situation where supplier lists are to be shared among all branches.

Reference is made to FIG. 10 which also shows the organization of the Product table 114 and the Category table 120. Based on the requirements of this construction company, the Product and Category tables 114, 120 comprise data which is used by all activities, and accordingly the Product and Category tables 114, 120 are configured as part of the global activity. It will be understood that tables belonging to the global activity are replicated to all sites in the application network.

The Estimate 108, EstimageCategory 116 and EstimateDetail 118 tables are next considered with reference to FIG. 10. The assignment of the Estimate table 108 is straight forward and falls under the Project activity 104.

The EstimateCategory table 116, on the other hand, embodies a many-to-many relationship between the Estimate table 108, the Supplier table 106, and the Category table 120, each of which belongs to a different activity. To determine the activity of the EstimateCategory table 116, the sharing of the information contained in the EstimateCategory table 116 is considered. In a first scenario, if everyone using information in the Category table 120 needs to know every instance where that Category appears in an actual Estimate, then the EstimateCategory table 116 should be part of the global activity (like the Category table 120). In a second scenario, if users working with a given Branch must know all the places where one of the Branch's Suppliers has been assigned to an EstimateCategory, then it is preferable to have the EstimateCategory table 116 part of the Branch activity. It will, however, be appreciated that many users may work with Suppliers in a Branch and not be interested with whether or where else those Suppliers are being used. It is true that everyone working with an Estimate (for example, estimators, purchasers and auditors for the construction company) will need to know the structure of an Estimate, and therefore it is advantageous to make the EstimateCategory table 116 part of the Project activity (as is the Estimate table 108).

Similarly, the PO table 110, the PODetail table 112 and the EstimateDetail table 118, also fall under the Project activity, even though each of those tables is also at the "many" end of a relationship from a table not in the Project activity.

It will be understood that not all users working on the same Project will need all of the information for that Project. For example, both purchasers and estimators need to know the complete estimate structure (i.e. information in the Estimate 108, EstimateCategory 116, and EstimateDetail 118 tables), and as such these tables form part of the "core activity" needed by all users of a given Project. The estimators, however, do not normally need to know about the actual purchases made (data stored in the PO 110 and PODetail 112 tables), and as a result these tables are labelled as the PURCHASING "activity part" needed by only some users of the Project. A site that uses a Project, but which has no purchasers for it, may choose not to participate in the PURCHASING part of that Project, or an administrator may actively choose to restrict that site from using the Project's PURCHASING information.

Similarly, the Estimate 108, EstimateCategory 116, and EstimateDetail 118 tables may be labelled as ESTIMATING activity part, if it is expected that more tables will be added under Project whose users may not need the Estimate group.

It will be appreciated that each branch of the construction company may have many projects, but in the application database 100 both the Branch 102 and the Project 104 are activity tables. More specifically, the Project table 104 is defined as a "subactivity" of the Branch activity 102. In particular, every user of a Project must also implicitly use some or all of the Branch information. For example, if Project 123 is under Branch A, then every site participating in the PURCHASING part of Project 123 also participates (if only to read) the Supplier records in Branch A.

As described above, the application database 100 distinguishes between subactivities and activity parts. In the example above, the PURCHASING activity part may be replaced declaring the PO table 110 to be an activity table and a subactivity of the Project table 104. In the present example, this approach is possible because the set of records defined by the PURCHASING activity part are "rooted", i.e. there is a single PO record that can serve as the activity record to which all other records in the activity part are related, directly or indirectly (see description above).

Figure 11:
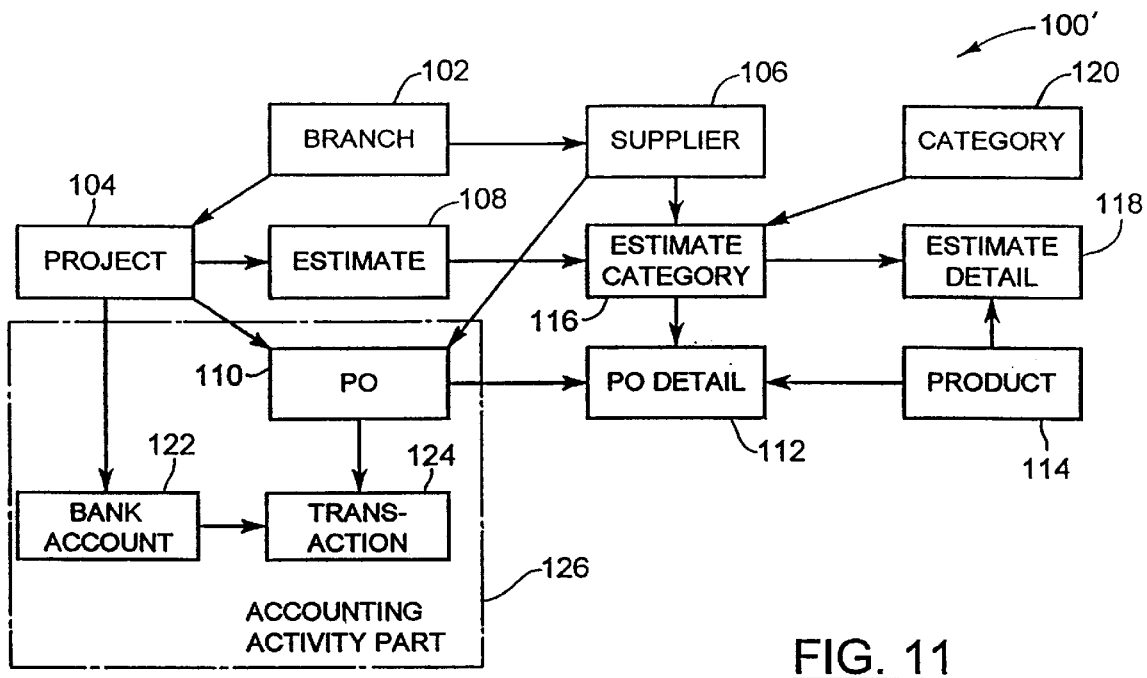
FIG. 11 shows an example of a non-rooted activity part for the IDDB of FIG. 8.

It will however be understood that this approach will not always work (i.e. an activity part is not always equivalent to or replaceable by a subactivity) because an activity part is not always composed of a connected and rooted set of records. For example, tables are added to support accounting and the extended schema for the application database 100 is shown in FIG. 11. Each Project 104 has one or more bank accounts (BankAccount table 122) and many accounting transactions (Transaction tables 124). Each of the Transaction records 124 references a BankAccount record 122 and optionally a Purchase Order (PO table 110). Referring to FIG. 11, the PO 110, BankAccount 122, and Transaction 124 tables comprise an ACCOUNTING activity part 126 and therefore clerks entering accounting transactions will need to match transactions to purchase orders for integrity and audit reasons. (It is assumed that the line-item contents of the purchase order in the PODetail table 112 are not of interest.)

It will be appreciated that the ACCOUNTING activity part 126 cannot be generalized into its own activity because the set of records (i.e. BankAccount 122, PO 110, Transaction 124) in the ACCOUNTING activity 126 is not rooted in any of the three tables 110, 122, 124. The nearest common root is the Project table 104, and hence the reason why ACCOUNTING 126 must in this case be part of the Project activity table 104. The declaration of the tables 110, 122, 124 as a Project activity part, gives them a "root" record, i.e the Project record, shared with the Project activity itself.

For simplicity, the activity parts were described in terms of entire tables, but activity parts can also be defined as a subset of the columns (specifically, one or more complete fragments) from one or more tables. For example, there may exist a table under the Project activity 104 in which the first fragment of every record is of interest only to estimators, the second fragment is of interest to both estimators and purchasers, and all users need the third fragment. The first fragment is labelled as part of the ESTIMATING activity part, the second fragment is labelled as part of both the ESTIMATING and PURCHASING parts, and the third fragment is left unlabelled as part of the core activity.

Standard Tables in the Application Database

In addition to the business tables (e.g. construction company) described above, the application database 34 includes tables which are used by the IDDBMS to store security and other application-specific information. The tables are needed because users, permissions, and similar information must be stored and administered separately for each application network, even when multiple application networks overlap at the same site. These tables comprise Design-Time tables 128, Runtime Permission tables 130, Network tables 132, and Local and Support tables 134. To differentiate these standard tables from the business tables, the standard table names are prefixed with a lowercase "d".

Figure 12:
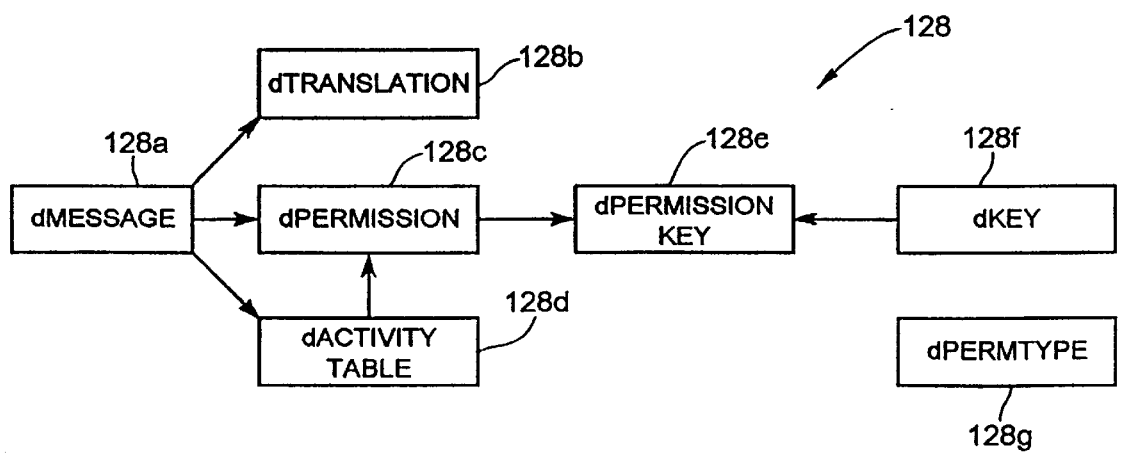
FIG. 12 shows exemplary design-time tables for the IDDB application of FIG. 8.

Reference is made to FIG. 12, which shows the Design-Time tables 128 denoted individually by 128b to 128f. As shown in FIG. 12, the Design-Time tables 128 comprise a dTranslation table 128b, a dpermission table 128c, a dActivityTable 128d, a dPermissionKey table 128e and a dKey table 128f. The tables related to the dMessage table 128a contain translated names as will be understood by those skilled in the art. The contents of the Design-Time tables 128 are determined at design time. The Design-Time tables 128, along with the distribution and other rules in the Distribution Control (DC) file (described below) form a part of the database schema. It will be appreciated that any changes to these tables require a new release edition, just as changes to the database schema require a new release edition.

Figure 13:
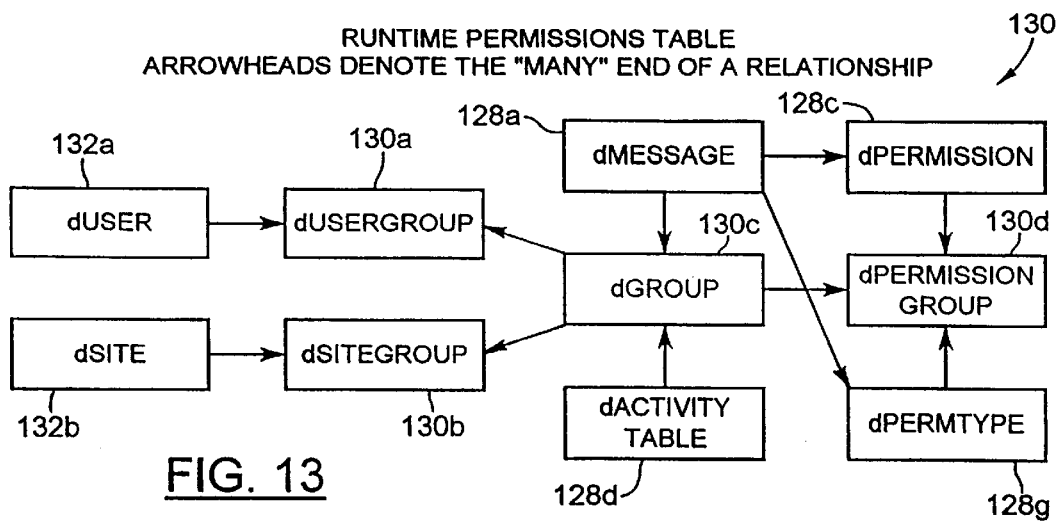
FIG. 13 shows exemplary runtime permission tables for the IDDB of FIG. 8.
Figure 14:
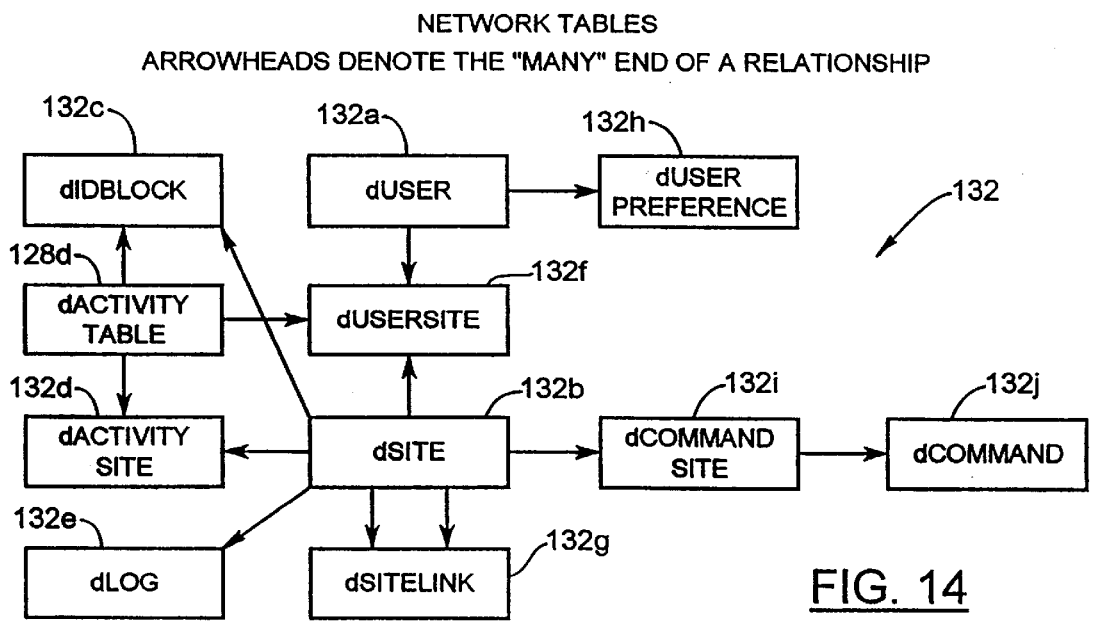
FIG. 14 shows exemplary network tables for the IDDB of FIG. 8.

Reference is next made to FIG. 13, which shows the Runtime Permission tables 130 in the context of the linked tables from the Design-Time tables 128 (FIG. 12) and the Network tables 132 (FIG. 14). As shown in FIG. 13, the Runtime Permission tables 130 comprise a dUserGroup table 130*a*, a dSiteGroup table 130*b*, a dGroup table 130*c*, and a dPermissionGroup table 130*d*. The Runtime Permission tables 130 relate to runtime permissions, both per-user and per-site. The dUserGroup table 130*a* embodies a many-to-many relationship between the dGroup table 130*c* and the dUser table 132*a*. The dSiteGroup table 130*b* embodies a many-to-many relationship between the dGroup table 130*c* and a dSite table 132*b*. It is noted that the dSite table 132*b* is implemented as an activity table. As also shown in FIG. 13, the dGroup 130*c* and dPermissionGroup 130*d* tables are linked to respective Design-Time tables.

Reference is next made to FIG. 14 which shows the Network tables 132 comprising a dUser table 132*a*, a dSite table 132*b*, a dIDBlock table 132*c*, a dActivitySite table 132*d*, a dLog table 132*e*, a dUserSite table 132*f*, a dSiteLink 132*g*, a dUserPreference table 132*h*, a dCommandSite table 132*i*, and a dcommand table 132*j*. The Network tables 132 store information about the network, including site-to-site link history data, user preference, commands (such as system/activity broadcast messages or record deletions), and housekeeping information about where activities and users are working throughout the system. As shown, the dSiteLink table 132*g* embodies a reflexive many-to-many relationship for the dSite table 132*b*, recording links from one site to another. As also shown in FIG. 14, the dActivity table 128*d* (FIG. 12) is linked in an one-to-many relationship to the dIDBlock 132*c*, dActivitySite 132*d* and dUserSite 132*f* tables. The definitions for the Network tables are described below.

Figure 15:
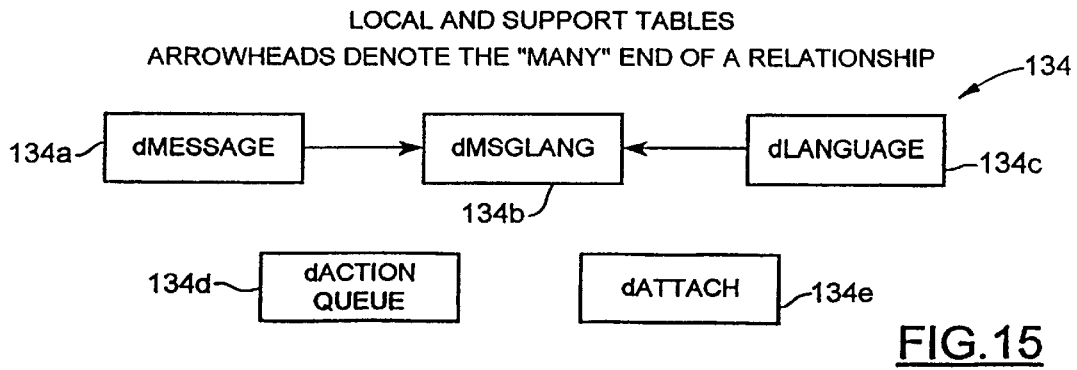
FIG. 15 shows exemplary local and support tables for the IDDB of FIG. 8.

Reference is next made to FIG. 15, which shows the Local and Support tables 134 comprising a dMessage table 134*a*, a dMsgLang table 134*b*, a dLanguage table 134*c*, a dActionQueue table 134*d*, and a dattach table 134*e*. The Local and Support tables 134 store local information about the site and language-independent messages. The dLanguage table 134*c* comprises an activity table.

In the following description, the contents or definitions of the tables are provided. The tables shown below include the minimum necessary fields, and other fields may be added as needed by the IDDBMS implementor based on the understanding of the present invention. In the following description it is to be understood that tables designated as "Design Time" refer to tables in which the content is preset by the database designer and therefore are considered to be part of the database structure which means that these tables are not to be modified at runtime.

The dActionQueue table 134*d* belongs to the group of Local and Support tables (FIG. 15). The dActionQueue table includes one record for every pending network action requested by the application. For example, an application may request to attach a site to, or remove it from, a shared activity. The dActionQueue table comprises the following fields and the implementation of the table will be within the understanding of one skilled in the art:

dActionQueue Table

| Field | Type | Comment |
| --- | --- | --- |
| ActionID | Long | Local unique ID. |
| Action | Text | Text command; e.g., "attach Project 123". |
| StatusMsgID | Long | Current status; translated message. [Foreign Key: dMessage.MessageID] |
| StatusDate | Date/Time | Last time this request's status was updated. |
| SubmitDate | Date/Time Stamp | Date request was submitted |
| Stamp | | |

The dActivitySite table 132*d* belongs to the Network tables 132 (FIG. 14) and includes one record for every site participating in every activity. The dActivitySite table comprises the following fields:

dActivitySite Table

| Field | Type | Comment |
| --- | --- | --- |
| Activity-TableID | Long | Identifies the type of activity (e.g., 1 = Project) |
| ActivityID | Long | The actual activity of the above type (e.g., 123 = Project 123)* |
| SiteID | Long | Attached site. |
| Parts | Text | The tags for the activity parts being used at this site. |
| Stamp | Stamp | |

The dActivityTable 128*d* is a Design-Time table (FIG. 12) and therefore is not modified at runtime. The dActivityTable comprises one record for every activity table in the system. The contents of the dActivityTable are set at design time, and the table comprises the following fields:

dActivityTable Table

| Field | Type | Comment |
| --- | --- | --- |
| Activity-TableID | Long | Identifies the type of activity (e.g., 1 = Project). |
| TableName | Text | Actual table name in this schema. |
| NameMsgID | Long | Translated message containing the name of this activity as it should be displayed to the user; e.g., the Project table is always named "Project" in the schema but the activity name may be shown to users in different languages as "Project", "Projekt", "project" etc. [Foreign Key: dMessage.MessageID] |
| Stamp | Stamp | |

The dAttach table 134*e* belongs to the Local and Support tables 134 group shown in FIG. 15. The dAttach table 134*e* includes one record for every active client process using the database. The IDDBMS uses the dattach table 134*e* to signal client processes. The dattach table comprises the following fields:

| dAttach Table | | |
|---|---|---|
| Field | Type | Comment |
| AttachID | Long | A unique identifier for a session. When a new session starts, it creates a new dAttach record with any unused AttachID; e.g., by taking the lowest unused number, or by continually incrementing AttachID as a counter field. |
| ExitNow | Bool | As described below. |
| Stamp | Stamp | |

For example, when a new release has been received and the site has been set to install releases automatically, the Exit-Now field of all records can be set by the replication engine (DRE) process, including the replication engine's own record in the dattach table. When all other processes have exited, the DRE process may begin installing the new release. A flag outside the database may be set during the installation to prevent new processes from attempting to attach before the release installation is complete.

The dcommand table 132*j* belongs to the Network tables 132 (FIG. 14), and stores system and network commands, for example to propagate record deletions or to "condemn" a site. The dCommand table comprises the following fields:

| dCommand Table | | |
|---|---|---|
| Field | Type | Comment |
| CommandID | Long | Globally unique command identifier. |
| CommandCert | Binary | Certificate for this command, including the command itself, command type, date initiated, site where initiated, and other desired information. The certificate must be signed by one of: the trusted root (in which case the SignerCert field is unused); a user (in which case the SignerCert must contain the user's certificate or user identifications so that the certificate may be looked up), or by a site (in which case the SignerCert must contain the site's certificate or site identification (e.g. "Site 123") so that the certificate may be looked up). |
| SignerCert | Binary | As above. |
| Stamp | Stamp | |

The dCommandSite table 132*i* also belongs to the Network tables 132 group (FIG. 14). The IDDBMS uses the dCommandSite table 132*i* to store local state information for commands that may take significant time to process, for example, propagated record deletions. The dCommandSite table 132*i* comprises the following fields:

| dCommandSite Table | | |
|---|---|---|
| Field | Type | Comment |
| SiteID | Long | [Foreign Key: dSite.SiteID] |
| CommandID | Long | [Foreign Key: dCommand.CommandID] |
| Status | Long | Status information; there may be additional fields here if a numeric "state" marker is insufficient. |
| Stamp | Stamp | |

The dGroup table 130*c* belongs to the Runtime Permissions 130 group (FIG. 13) and includes one record for each permissions group defined by the administrators. The dGroup table comprises the following fields:

| dGroup Table | | |
|---|---|---|
| Field | Type | Comment |
| GroupID | Long | Unique identifier. |
| Activity-TableID | Long | The type of activity, or zero for the global activity. [Foreign Key: dActivityTable.Activity-TableID] |
| NameMsgID | Long | Translated name for this permissions group (e.g., "Purchaser", "Kaufer", etc.) [Foreign Key: dMessage.MessageID] |
| dPermission GroupChecksum | Long | Cached number of related records in dPermissionGroup (to prevent record-deletion attacks in that table). |
| Stamp | Stamp | |

The IDDBMS uses the dGroup table 130*c* to store permissions groups for all activity types, where the dActivityTableID foreign key is used to determine to which activity type this permissions group applies.

The dIDBlock table 132*c* belongs to the Network tables 132 (FIG. 14). The IDDBMS uses the dIDBlock table 132*c* to store blocks of allocated ID's of all types as used by the application. The dIDBlock table 132*c* comprises the following fields:

| dIDBlock Table | | |
|---|---|---|
| Field | Type | Comment |
| Activity-TableID | Long | The type of activity, or zero for the global activity. [Foreign Key: dActivityTable.Activity TableID] For example, "1" may denote "Project". |
| ActivityID | Long | The actual activity's ID, if ActivityTableID is nonzero. These first two fields together uniquely identify every activity in the system. [Foreign Key: into the selected table} For example, along with the above, "123" would specify which project, in this case "Project 123". |
| Name | Text | Text name of the allocated ID field. An activity may have several allocated ID's, and these |

-continued dIDBlock Table

| Field | Type | Comment |
|---|---|---|
| | | three fields together uniquely identify every allocated ID in every activity in the system. For example, along with the above, "EstimateID" would mean, informally, "this is an IDBlock of EstimateIDs guaranteed to be unique within Project #123". |
| MinID | Long | Lowest value in this block of ID's. This is part of the key because the same allocated ID may have many IDBlocks since the blocks are allocated as needed. This field uniquely identifies the specific block. |
| SiteID | Long | The site that has ownership of this ID Block. Sites that own an IDBlock may use and/or delegate (give to other sites) any subset of the block. |
| MaxID | Long | Highest value in this block of ID's. |
| Next-AvailableID | Long | Lowest unused ID value, initially set to the same value as MinID when the block is first created. When NextAvailableID > MaxID, the block has been used up. |
| Stamp | Stamp | |

The dKey table 128f belongs to the Design-Time tables 128 (FIG. 12). The dKey table 128f includes one record for every symmetric cryptographic key used to secure the application database. The number of records and their key names are set at design time, but the actual key values are generated pseudo-randomly for each site at runtime. Each application site will have the same records with the same "dKey.KeyName"s, but with different "dKey.Value"s. The Key Management is described below. The dKey table comprises the following fields:

dKey Table (Records: Design Time; Values: Runtime)

| Field | Type | Comment |
|---|---|---|
| KeyName | Text | Globally unique for all installations of the application. |
| Value | Binary | The key value, encrypted with a key derived from the site's application administrator password. |
| Stamp | Stamp | |

The dLanguage table 134c belongs to the Local and Support tables 134 (FIG. 15). The dLanguage table 134c includes one record for every language recognized by the IDDBMS. The dLanguage table comprises the following fields:

dLanguage Table

| Field | Type | Comment |
|---|---|---|
| LanguageID | Long | Globally unique for all installations of the IDDBMS. |

-continued dLanguage Table

| Field | Type | Comment |
|---|---|---|
| NameMsgID | Long | This language's translated name. [Foreign Key. dMessage.MessageID] |
| FontName | Text | Default typeface, if applicable. |
| PointSize | Integer | Default font size, if applicable. |
| Direction | Integer | Text flow direction. |
| Stamp | Stamp | |

The "LanguageID's" are preferably assigned by the IDDBMS implementor and used by application designers and administrators. While each application database can support any desired subset of these languages, the LanguageID's must be consistent with the dLanguage records in the IDDBMS registry.

The dLog table 132e belongs to the Network tables 132 (FIG. 14). The dLog table 132e includes application-specific audit and other log messages. The dLog table comprises the following fields:

dLog Table

| Field | Type | Comment |
|---|---|---|
| SiteID | Long | [Foreign Key: dSite.SiteID] |
| LogNo | Long | Log entry number, unique locally (within each site). Not a distributed IDDBMS-allocated ID. |
| Severity | Integer | Severity level. |
| Message | Text | The log message text. |
| Stamp | Stamp | |

In the Site table, the Site.LogNoMin and Site.LogNoMax fields help ensure that no messages are lost due to user tampering because the log must always contain all consecutive log numbers in the given range. If it does not, alerts are sent to administrators.

The dMessage table 134a belongs to the group of local and support tables 134 (FIG. 15). The dMessage table 134a contains one record for every translated message used by the application. The dMessage table comprises the following fields:

dMessage Table

| Field | Type | Comment |
|---|---|---|
| MessageID | Long | Globally unique for this application. |
| Stamp | Stamp | |

The dMsgLang table 134b also belongs to the Local and Support tables 134 (FIG. 14). The dMsgLang table 134c includes one record for every translated message used by the application if the language is subscribed to at this site. The dMsgLang table 134b comprises the following fields:

| dMsgLang Table | | |
|---|---|---|
| Field | Type | Comment |
| LanguageID | Long | [Foreign Key: dLanguage.LanguageID] |
| MessageID | Long | [Foreign Key: dMessage.MessageID] |
| Text | Binary | The message text in this language. Stored as binary to support both single- and multi-byte character sets. |
| Stamp | Stamp | |

The dPermission table 128*c* belongs to the Design-Time tables 128 (FIG. 12). The dpermission table contains one record for every basic permission that can be granted for some activity type, as defined at design time in the .DC file. The dpermission table comprises the following fields:

| dPermission Table | | |
|---|---|---|
| Field | Type | Comment |
| Permission-Name | Text | Unique identifier. |
| Activity-TableID | Long | The type of activity, or zero for the global activity. [Foreign Key: dActivityTable.ActivityTableID] |
| NameMsgID | Long | Translated name for this basic permission. [Foreign Key: dMessage.MessageID] |
| Stamp | Stamp | |

It will be appreciated that each activity part is by definition a permission, although the application database designer may choose to define additional permissions for any given activity table. The permissions are grouped into permission groups using the dGroup 130*c* and dPermissionGroup 130*d* tables (FIG. 13).

The dPermissionGroup table 130*d* belongs to the Runtime Permission tables 130 (FIG. 13). The dPermissionGroup table 130*d* provides a "many-to-many" relationship between the dPermission 128*c*, dPermType 128*g,* and dGroup 130*c* tables (as shown in FIG. 13). The dPermissionGroup table 130*d* includes one record for every basic permission and type to appear in the given group. The dPermissionGroup table 130*d* comprises the following fields:

| dPermissionGroup Table | | |
|---|---|---|
| Field | Type | Comment |
| GroupID | Long | [Foreign Key: dGroup.GroupID] |
| Permission-Name | Text | [Foreign Key: dPermission. PermissionName] |
| PermTypeName | Text | [Foreign Key:dPermType.PermTypeName] |
| Permit | Bool | True if this permission group includes the given permission, false if it explicitly excludes the given permission. |
| Stamp | Stamp | |

It is to be understood that, unlike most of the other tables which only grant permissions, the dPermission Group table may also be used to revoke permissions (i.e. if Permit= FALSE).

In another aspect, the dPermissionGroup table is to be protected against tampering. For example, by deleting a dPermissionGroup record in an undetectable manner, a local tamperer could gain access to perform actions from which they would normally be excluded on the given activity. To prevent such record deletions from being undetected, the IDDBMS stores a checksum of the number of dPermissionGroup 130*d* records in the dGroup table 130*c* record. The checksum is used to verify the integrity of the dPermissionGroup records and can only be tampered if the attacker also knew the dGroup.Stamp encryption key.

The dPermissionKey table 128*e* belongs to the Design-Time tables 128 (FIG. 12). The dPermissionKey table 128*e* provides a many-to-many relationship between the dpermission 128*c* and dKey 128*f* tables. The dPermissionKey table 128*e* includes one record for every cryptographic key the permission requires, as defined at design time in the .DC file. The IDDBMS uses the information in the dPermissionKey table 128*e* at runtime for key management, so that only the minimal set of keys needed by a user is loaded into the memory of the workstation. The dPermissionKey table comprises the following fields:

| dPermissionKey Table | | |
|---|---|---|
| Field | Type | Comment |
| Permission-Name | Long | [Foreign Key: dPermission.PermissionName] |
| KeyName | Text | [Foreign Key: dKey.KeyName] |
| Stamp | Stamp | |

The dPermType table 128*g* is a Design-Time table 128 (FIG. 12) and includes one record for every variant type (e.g., Read, Write, Create, Delete) that can be applied to a basic permission. For example, if an application defines a basic permission named ESTIMATING, the application may want to distinguish between users having Read access to ESTIMATING, and users having Write access, etc. The dPermType table comprises the following fields:

| dPermType Table | | |
|---|---|---|
| Field | Type | Comment |
| PermTypeName | Text | Unique identifier. |
| NameMsgID | Long | Translated name for this permission type. [Foreign Key: dMessage.MessageID] |
| Stamp | Stamp | |

The dSite table 132*b* belongs to the Network tables 132 (FIG. 14) and comprises an activity table. The dSite table 132*b* includes one record for each site in the application network. The IDDBMS implementor may decide to store the full contents of the dSite table, or just a chosen subset thereof, at each site. The dSite table comprises the following fields:

| dSite Table | | |
|---|---|---|
| Field | Type | Comment |
| SiteID | Long | Globally unique across all installations of the IDDBMS. Also the site's serial number. |
| SiteCert | Binary | This is the site's application certificate, signed by the ACA. |

-continued

| dSite Table | | |
|---|---|---|
| Field | Type | Comment |
| | | It must include a unique serial number (the SiteID), valid date range, site name, support contact information (e.g., a local administrator's name and phone number), and whether this is a spine or non-spine site. It may optionally include other information, such as the site's normal latitude and longitude if applicable (useful for network mapping displays), or a company name for sites internal to a company. |
| PasswordHash | Binary | Digest of this site's administrator password, which password is used to lock this registry database. Used to validate the password when entered; the registry encryption key must be derived from the password using a different digest algorithm than that used to create this hash (i.e., if MD2 is used to calculate the PasswordHash value, use SHA or some other non-MD2 algorithm to derive a key from the password. |
| LanguageID | Long | Site's default language. [Foreign Key. Language.LanguageID] |
| dSiteGroup Checksum | Long | Cached number of related records in dSiteGroup (to prevent record-deletion attacks in that table). |
| Stamp | Stamp | |
| LogNoMin | Long | Lowest Log.LogNo entry that has not yet been rolled off the system. This can be done manually, under local administrator control, or automatically based on age or the total log size. |
| LogNoMax | Long | Highest used Log.LogNo entry. |
| Bandwidth | Long | Bandwidth estimate (used by spine configuration algorithms). |
| StampLog | Stamp | |

The dSiteGroup table 130b belongs to the Runtime Permission tables 130 (FIG. 13). The dSiteGroup table 130b provides a many-to-many relationship between the dSite 132b and dGroup 130c tables, where each record represents the site's inclusion in the given group. The dSiteGroup table 130b comprises the following fields:

| dSiteGroup Table | | |
|---|---|---|
| Field | Type | Comment |
| GroupID | Long | [Foreign Key: dGroup.GroupID] Because each group applies to exactly one activity table (possibly the global activity), this field implicitly tells us which activity table we're dealing with. The next field then tells us the specific activity for which permission is being granted. |
| ActivityID | Long | The actual activity's ID, if the related record in dGroup has a |

-continued

| dSiteGroup Table | | |
|---|---|---|
| Field | Type | Comment |
| SiteID | Long | nonzero ActivityTableID. (Foreign Key: into the selected table] [Foreign Key: dSite.SiteID] |
| Stamp | Stamp | |

It will be appreciated that, unlike most of the other tables which only grant permissions, the dSiteGroup table can be used to revoke permissions (in rare cases) by including permission with the setting "Permit=FALSE" to exclude the user. As described above for the dPermission table, the IDDBMS can use a similar procedure, i.e. storing a checksum, for the dSiteGroup table to detect tampering.

The dSiteLink table 132g belongs to the Network tables 132 (FIG. 14). The dSiteLink table 132g provides a many-to-many reflexive relationship for the dSite table 132b, and includes one record for every pair of sites that has ever linked. (Each site need only store those records where "SiteID=THIS SITE".) The dSiteLink table comprises the following fields:

| dSiteLink Table | | |
|---|---|---|
| Field | Type | Comment |
| SiteID | Long | [Foreign Key: dsite.SiteID] |
| LinkToSiteID | Long | [Foreign Key: dSite.SiteID] |
| Schedule | Text | Scheduling rule, stored in some format (e.g., hourly on the hour; every Wednesday at noon; etc.) |
| Offset1 | Long | For multiple callbacks from non-spine to spine nodes, the time offset at which to start the first call. (Used only if this is a non-spine site.) |
| Offset2 | Long | For multiple callbacks from non-spine to spine nodes, the time offset at which to start the second call. (Used only if this is a non-spine site.) |
| LastLink | Date/Time | Time of last successful link (according to this site's local clock) |
| LastLinkDelta | Long | Last successful link's delta. |
| PastDeltaMin | Long | Minimum of deltas over all past successful links (note that this implicitly excludes links that exceeded the delta limit and so were rejected) |
| PastDeltaMax | Long | Maximum, similarly. |
| LastAttempt | Date/Time | Last time a link attempt was made (necessarily according to this site's local clock) |
| LastAttempt-Delta | Long | The last delta from a link that connected successfully but was rejected for delta or other reasons. |
| BadAttempts | Long | Number of unsuccessful attempts due to connection/validation problems, since the last successful link. |
| BadClock Attempts | Long | Number of unsuccessful attempts due to clock-delta rejections, since the last successful link. |
| Stamp | Stamp | |

The dTranslation table 128b belongs to the Design-Time tables 128 (FIG. 12). The dTranslation table 128b is populated at design time and records every tablename/fieldname that stores a translated message ID. The translation utility for the IDDBMS uses this information (and other information) at runtime to manage all translation for all applications. The dTranslation table comprises the following fields:

dTranslation Table (Design Time)

| Field | Type | Comment |
|---|---|---|
| TableName | Text | Name of the table. |
| FieldName | Text | Name of the field. |
| NameMsgID | Long | Translated name for this field itself (e.g., "Product Name") [Foreign Key: dMessage.MessageID] |
| fPluralMsgID | Long | Translated plural name for this field itself (e.g., "Product Names") (Foreign Key: dMessage MessageID] |
| Stamp | Stamp | |

The dUser table 132a belongs to the Network tables 132 (FIG. 14). The dUser table 132a includes one record for each authorized user in the application network. The IDDBMS implementor has the option of storing the full contents of the dUser table 132a, or just a chosen subset, at each site. The dSite table comprises the following fields:

dUser Table

| Field | Type | Comment |
|---|---|---|
| UserID | Long | Unique identifier within the application network. Also the user'serial number. |
| UserCert | Binary | This is this user's certificate, signed by the ACA. It must include a unique serial number (the UserID), a (possibly unique) logon name, valid date range, user name, contact information, whether this user may by default log on to all sites or no sites (exceptions are stored in the dusersite table), and the user's public signing key. The certificate may optionally be extended to allow multiple signing keys for different purposes. |
| PasswordHash | Binary | Digest of this user's logon password, which password is used to authenticate the user. Used to validate the password when entered. |
| LanguageID | Long | User's preferred language. (Foreiqn Key: Language.LanguageID] |
| PrivateKey | Binary | User's private key, encrypted using the user's signing password. The user's signing password must be different from the logon password. Because the private key structure contains redundant information that will let us know that we have decrypted it correctly, there is no need to store even a hash of the user's signing password. Intended Use: The user logs on to the application by providing his logon name and logon password. Once in the application, each time he wishes | dUser Table -continued

| Field | Type | Comment |
|---|---|---|
| | | to sign something, the application should prompt him for his signing password, which can be used to decrypt the private signing key to create the signature; the signing password is then immediately nulled, and if he wants to sign something else he must enter the signing password again. |
| duserGroup Checksum | Long | Cached number of related records in duserGroup (to prevent record-deletion attacks in that table) |
| duserSite Checksum | Long | Cached number of related records in dusersite (to prevent record-deletion attacks in that table) |
| Stamp | Stamp | |

The dUserGroup table 130a belongs to the Runtime Permission tables 130 (FIG. 13). The dUserGroup table 130a provides a many-to-many relationship between the dUser 132a and dGroup 130c tables, where each record represents the user's inclusion in the given group. The dUserGroup table 130a comprises the following fields:

dUserGroup Table

| Field | Type | Comment |
|---|---|---|
| GroupID | Long | [Foreign Key: dGroup.GroupID] Because each group applies to exactly one activity table (possibly the global activity), this field implicitly tells us which activity table we're dealing with. The next field then tells us the specific activity for which permission is being granted. |
| ActivitvID | Long | The actual activity's ID, if the related record in dGroup has a nonzero Activity/TableID. [Foreign Key: into the selected table] |
| UserID | Long | [Foreign Key: dUser.UserID] |
| Stamp | Stamp | |

It will be appreciated that the dUserGroup table 130a may be used to revoke permissions, by setting "Permit=false" to exclude the user. As described above, the IDDBMS can use a checksum of the number of dUserGroup records in the dUserGroup table to detect if the table has been altered.

The dUserPreference table 132h belongs to the Network tables 132 (FIG. 14). The dUserPreference table comprises the following fields:

dUserpreference Table

| Field | Type | Comment |
|---|---|---|
| Activity/ TableID | Long | The type of activity, or zero for the global activity. [Foreign Key: |

-continued dUserpreference Table

| Field | Type | Comment |
|---|---|---|
| | | dActivityTable.ActivityTableID] For example, "1" may denote "Project". |
| ActivityID | Long | The actual activity's ID, if ActivityTableID is nonzero. These first two fields together uniquely identify every activity in the system. [Foreign Key: into the selected table] For example, along with the above, "123" would specify which project, in this case "Project #123" |
| UserID | Long | [Foreign Key: duser.UserID] |
| Preference-Name | Text | Name of the preference setting. This is a string that can be queried by the IDDBMS or any application. |
| Value | Text | Value of the preference setting. |
| Stamp | Stamp | |

The dUserPreference table 132*h* may be characterized as containing "distributed .INI file data", where the PreferenceName is the "left side" of the .INI setting and the Value is the "right side" of the .INI setting. Each record is a specific user's preference setting under some specific activity. The preference names may be application-defined and -extended, although the IDDBMS may also choose to reserve some preference names for its own use. For example, instead of storing the user's preferred LanguageID in the dUser 132*a* record directly, the IDDBMS could store a preference with ActivityTableID=0 (global), ActivityID=0) in the dUserPreference table.

The dUserSite table 132*f* belongs to the Network tables 132 (FIG. 14). The IDDBMS uses the dUserSite table 132*f* to store exceptions to the user's default site logon permissions (see the dUser table above). The dUserSite table comprises the following fields:

dUserSite Table

| Field | Type | Comment |
|---|---|---|
| Activity-TableTD | Long | The type of activity, or zero for the global activity. [Foreign Key: dActivityTable.ActivityTableID] For example, "1" may denote "Project". |
| ActivityID | Long | The actual activity's ID, if ActivityTableID is nonzero. These first two fields together uniquely identify every activity in the system. [Foreign Key: into the selected table) For example, along with the above, "123" would specify which project, in this case "Project #123". |
| UserID | Long | [Foreign Key: duser.UserID] |
| SiteID | Long | [Foreign Key: dSite.SiteID] |
| SunStart | Date/Time | Beginning of permitted time window at this site for this day of the week. |
| SunEnd | Date/Time | End of permitted time window at this site for this day of the week. |
| MonStart | Date/Time | Beginning of permitted time window at this site for this day of the week. |
| MonEnd | Date/Time | End of permitted time window at this site for this day of the week. |
| TueStart | Date/Time | Beginning of permitted time window at this site for this day of the week. |
| TueEnd | Date/Time | End of permitted time window at this site for this day of the week. |
| WedStart | Date/Time | Beginning of permitted time window at this site for this day of the week. |
| WedEnd | Date/Time | End of permitted time window at this site for this day of the week. |
| ThuStart | Date/Time | Beginning of permitted time window at this site for this day of the week. |
| ThuEnd | Date/Time | End of permitted time window at this site for this day of the week |
| FriStart | Date/Time | Beginning of permitted time window at this site for this day of the week. |
| FriEnd | Date/Time | End of permitted time window at this site for this day of the week. |
| SatStart | Date/Time | Beginning of permitted time window at this site for this day of the week. |
| SatEnd | Date/Time | End of permitted time window at this site for this day of the week |
| Stamp | Stamp | |

The dUserSite table (like the dPermission table described above) may be used to revoke permissions (if the user's default is to be allowed to work at all sites) in a manner similar to that described above.

Distribution Control

For the IDDB according to the present invention, the distribution control (DC) information is treated as part of the database schema. The IDDBMS uses the distribution control information to distribute the database effectively and securely.

In particular, the DC information includes a description of the tables for the database and the relationships between the tables; the allocated ID's the IDDBMS will use as keys, and which tables use the keys; the activities and activity parts, along with the basic permissions that apply to each activity or activity part; the distribution rules for each table; and selective encryption rules for specific columns of the database.

DC Language Grammar

In the following description, the Distribution Control for the IDDB is described using the known Extended Backus-Naur Form (EBNF) standard notation which will be familiar to those skilled in the art. For convenience the EBNF notation utilized in the following description is as follows:

EBNF Summary

EBNF (Extended Backus-Naur Form) uses production rules to define a grammar as a sequence of tokens separated by white space. In the production rules, =(equal) separates the left- from the right-hand-side, | (vertical bar) is a separator between alternatives, and . (period) terminates the entire production.

The tokens are described as follows:

| | |
|---|---|
| "token" | quotes surround text that appears exactly as shown (without the quotes) |
| [ optional ] | square brackets surround optional items |
| ( group ) | round brackets group together a series of items |
| {zero or more} | braces surround a group of items that repeat zero or more times |
| "A". . . "Z" | exactly one of the characters in the given range |

EXAMPLES

"*"|"/"|"%" pm-expression means either a "*", or a "/", or a sequence consisting of "%" followed by a pm-expression ("*"|"/"|"%") pm-expression means a sequence consisting of either a "*" or a "/" or a "%", and then a pm-expression

{"0" . . . "9"} means a (possibly empty) sequence of digits

As shown below, the EBNF notation defines the DC language grammar. In addition to the tokens below, the DC language supports standard C/C++ programming language comments (i.e. /* . . . */ stream comments and // . . . line comments) which are treated as white space.

```
                              DC Langaage Grammar
db-decl = "database" database-name "{" { permtypeset-decl | permset-decl } "}"
Pemtypset-decl = "pemtypes""{" { permtype-name ";" } "}".
id-decl = "id" id-name "{" "stock" int-value ";" ["reorder" int-value ";" ) "{".
table-decl = "table" table-name {": " activity-decl } "{" (table-clause
extend-decl = "extend" "table" table-name "{" { table-clause
activity-decl = activity-table-decl | activity-subtable-decl
       activity-table-decl = "activity" table-name [ "," table-name).
              activity-subtable-decl = table-name ["(" activity-part-decl ")"]
decl }.
       table-clause = repl-decl key-decl | relset-decl ¦ permset-decl | cryptset-decl.
              repl-decl = "replicate" ("asneeded" | "idblock" | "local"
                     ("user" permission-name { "," permission-name }) ) ";".
              key-decl = "key" field-name ["root" ]{ "," field-name ["root"]}";".
              relset-decl = "relatedto" "{" { rel-decl}"".
                     rel-decl = ( "one" "many") table-name
                                   ["key" key-name { "," key-name } ( "optional" ]]";".
              permset-decl = "pemissions" "{" {perm-decl } "}".
                     perm-decl = permission-name
                            ":" "core" | "all" | freg-spec { "," frag-spec } ) ";".
                     frag-spec = table-name { ":" stamp-field-name }.
              cryptset-decl = "encrypt" crypt-algo "{" { crypt-decl } "}".
                     crypt-algo = "DES" | "3DES" | ("RC2" int-value ) | ( "RC5" int-value
//Note: This rule can he extended as descried to support any needed algorithms.
                     crypt-decl = field-name [cryptkey-name ] ";".
id-name              = str-value.
table-name           = str-value.
field-nane           = str-value
activity-part-name   = str-value
permission-name      = str-value.
cryptkey-name        = str-value.
str-value            = ( char | digit ) { ( char ¦ digit ) }.
int-value            = digit { digit } .
char                 = ( "A".. "Z" | "a".. "z")
digit                = ( "0".. "9".
```

The Distribution Control requirements according to this aspect of the invention are described in terms of the DC language as shown above.

The Database and the Global Activity

A first requirement is that the application designer for the IDDB be able to declare a unique database name. The designer must also be able to declare the basic permissions that apply to the global activity. The way the permissions are applied to the activity tables in the same as the way the permissions are applied to the global activity. (The basic permissions are described in more detail below.)

In the DC Language, a database declaration, db-decl, takes the following form:

| db-decl |
| --- |
| db-decl = "database" database-name "{" { permtypeset-decl \| permset-decl } "}"<br>    permtypeset-decl = "permtypes" "{" { permtype-name ";" } "}".<br>For example, for a dataoase QBPACE32, the database declaration db-decl is as follows:<br>    database QBPACE32<br>    {<br>        permtypes { Read; Write; Create; Delete; }<br>        permissions<br>            ESTIMATING: core;// see Table declarations below<br>        }<br>    } |

As shown above, the database name uniquely identifies the application database. The set of basic permissions as declared above apply to the global activity, and every other set of basic permissions apply to exactly one activity table. The other basic permissions can therefore be declared as part of each applicable activity table, as will be described below.

IDDBMS—Allocated ID's

The IDDB provides the application designer with the facility to declare ID's that the IDDBMS will manage. For example, the application designer needs the capability to specify stock and recorder quantities individually for each ID.

In DC Language, an id declaration, id-decl, takes the form:

| id-decl |
| --- |
| iddecl = "id"id-name "{" "stock" int-value ";" ["reorder" int-value ";" ]"}"<br>For example, |

| -continued |
| --- |
| id-decl |
| id ProjectID { stock 300;<br>            reorder 50;<br>id CountryID { stock 25; } |

As shown above, the reorder quantity is optional and defaults to half of the stock quantity. The designer must later designate in which table the ID is being used as, or as a part of a unique key (as described in more detail below). It will also be understood that the name of the key field must be the same as the name of the ID.

Tables

The IDDB provides the application designer with the facility to declare each database table, including its relationships with other tables, primary keys, distribution rules, activity participation including basic permissions if it is an activity table, and encryption rules for sensitive fields.

In the DC Language, a table declaration, table- decl or extend-decl, takes the form:

| table-decl and table-clause |
| --- |
| table-decl = "table" table-name { ":" activity-decl }"{" { table-clause } "}".<br>extend-decl = "extend" "table" table-name "{" { table-clause } "}".<br>    table-clause = repl-decl \| key-decl \| relset-decl \| permset-decl \| cryptset-decl.<br>For example, a Product table is declared as follows:<br>        table Product /* . . . */<br>        {<br>            /* . . . */<br>        }<br>        extend table Product<br>        }<br>            /* . . . */<br>        } |

The table may optionally be declared to be part of an activity (":" activity-decl); if not, it is part of the global activity. The body of the table declaration contains all of the following information about distribution, primary key fields, relationships, permissions, and encryption, as needed.

It will be understood that not all of this information is necessary or relevant for every table. For example, only activity tables may have a set of basic permissions, because permissions always apply to a certain activity.

The extend keyword lets a designer add to the functionality of a previously declared table. This feature is particularly useful to extend the core required tables, which are described in a STANDARD.DC file described below.

Defining Activities and Activity Parts

The IDDB provides the application designer with the capability to declare the activities, i.e. activity tables and each activity's activity parts (and the interrelationships between tables if one activity is under another activity). Each activity part is defined by some subset of the tables that are part of the same activity.

In the case where one activity is under another activity, for example, if a Project is under Branch in the example below, this means that attaching to any Project in a given Branch automatically attaches a site to the Branch as well if the site is not attached to it already. The same level of control is applied to activity parts, so that a table can be defined as in a given activity part of not only the current activity but also of parent activities (as are PO and PODetail described below). This means that any site that attaches to any Project's PURCHASING activity part also attaches to the related Branch's SUPPLIER activity part. In context of the business example, this means that "a project's purchasers need to use the list of suppliers shared among all projects in this branch".

In the DC Language, an activity declaration, activity-decl, takes the form:
activity-decl
    activity-decl=activity-table-decl|activity-subtable-decl.
        activity-table-decl="activity" table-name {"," table-name}.
        activity-subtable-decl=table-name ["(" activity-part-decl ")"].
        activity-part-decl=[table-name] activity-part-name {"," activity-part-decl}.

In the example, the activity declaration is as follows:
    table Branch: activity {/* . . . */}
    table Supplier: Branch(SUPPLIER) {/* . . . */}
    table Project: activity, Branch {/* . . . */}
    table Estimate: Project {/* . . . */}
    table PO: Project(PURCHASING, Branch SUPPLIER) {/* . . */}
    table PODetail: Project(PURCHASING, Branch SUPPLIER) {/* . . . */}

As shown above, the first form, i.e. activity-table-decl, is used when a table is itself an activity table, and the table is identified as such by ": activity", followed by a list of other activities that the activity is under, if any.

The second form, i.e. activity-subtable-decl, is used for tables that are under an activity table and form part of that activity. These tables are identified as such by ": ActivityTableName" followed by an optional bracketed list of activity parts that include this table, if any. The list of activity parts may reference activity parts in activities that are parents of the current activity (as described in the above examples). This means that any sites attaching to that activity part also attach to the parent activity's specified part.

Controlling Distribution

The IDDB provides the application designer with the capability to declare distribution rules for each table.

It will be understood that not all tables require the designer to specify an explicit distribution rule. According to this aspect of the invention, for activity tables the distribution rules are predefined and may not be overridden. For tables not under any activity, the default distribution rule is to replicate the complete contents globally to each site. For tables under an activity, the default distribution rule is to replicate the appropriate subset of its contents to every site participating in the shared activity. If an activity part is specified for the table, then the particular activity part is also replicated.

Preferably, the application designer is able to override the default replication for the latter two cases by specifying that a table's contents be replicated "as needed". This means that each site only stores records for which there are already related records in other tables. For example, the standard table dMsgLang (see above) is replicated "as needed" so that only messages actually referenced at a given site are stored there because a translated product name is irrelevant at a site that does not store the Product record.

In another aspect, the IDDBMS includes a special distribution rule for IDBlocks and preferably this rule is not available to the application designer.

In DC Language, a replication declaration, repl-decl, is of the form:

| repl-decl |
| --- |
| repl-decl = "replicate" ( "asneeded" \| "idblock" "local"\| "user" permission-name { "," permission-name } ) ) ";". <br> For example, the table dMsgLang is declared as follows: <br>   table dMsgLang <br>   { <br>     replicate asneeded; <br>     /* . . . */ <br>   } <br>   table Transaction : Project <br>     replicate user ACCOUNTING, ADMIN; /* Project's <br>     ACCOUNTING and ADMIN permissions */ <br>   } |

As shown above for the table dMsgLang, the declaration specifies a user-level rule to replicate the relevant contents of the table only to sites where some user with at least one of the given permissions is permitted to work. If no user with any of the given permissions may work at a site, that site should not receive the data. The control provided by this feature is similar to that already provided by default through activity parts since each activity part is implicitly a permission for the activity. However, the user-level rule provides a finer granularity of control and also allows designers and administrators to actively prevent replication based on user and user-site permissions.

It will be understood that the "replicate idblock" statement is meaningless in an application DC file, although it appears once in STANDARD.DC. The application designer may choose to omit the "idblock" keyword as shown above from the DC language statement, and instead assume the replication rule for the table named dIDBlock.

Defining the Primary Key

According to this aspect, the IDDB provides the application designer with the facility to declare the field(s) making up the primary key of each table. In particular, if any key field is an IDDBMS-allocated ID being used as a guaranteed-unique key, it is flagged as such in the (exactly one) table where it is being used for record uniqueness. At most one such ID is flagged for such use in the same table.

In the DC Language, a key declaration, key-decl, is of the form:

| key-decl |
|---|
| key-decl = "key" field-name ["root" ]{ "," field-name ["root" ] }";".<br>For example, for table dMsgLang the key is declared as follows:<br>    table dMsgLang<br>    {<br>        key MessageID, LanguageID; /* no allocated ID required because this table<br>        embodies a many-to-many relationship */<br>        /* ... */<br>    }<br>    table Project : activity, Branch<br>    {<br>        key ProjectID root; /* this is the table where ProjectID is used as the<br>        unique key, and it must be globally unique */<br>        /* ... */<br>    }<br>    table Estimate : Project<br>    {<br>        key ProjectID, EstimateID root; /* EstimateID Unique within each Project<br>        */<br>    } |

As shown above, at most one key field is designated root in each table, but it may or may not be the only key field. If it is the only key field, the ID is globally unique; if it not the only key field, then there is at most one other key field, which must be the key of an activity table, and this ID is unique within the activity.

Defining Relationships

The IDDB provides the application designer with the facility to declare one-to-one and one-to-many relationships between any two tables, including reflexive relationships to the same table. To allow reflexive relationships, as well as relationships from several tables to the same target table, the application designer must also be able to rename the key fields as needed. The key fields appear in the target table, but they may appear under different names.

In DC Language, a relationship declaration, relset-decl, is of the form:

| relset-decl and rel-decl |
|---|
| relset-decl = "relatedto" "(" { rel-decl } ")".<br>    rel-decl = ( "one" | "many" ) table-name<br>        "key" key-name { "," key-name } ["optional" } ]";".<br>For example, the relationships for the table Project /* ... */ are declared as follows:<br>    table Project<br>    {<br>        key ProjectID;<br>        relatedto<br>        {<br>            many Estimate;<br>            many PO;<br>        }<br>        /* ... */<br>    }<br>    table Message /* ... */<br>    {<br>        key MessageID;<br>        relatedto<br>        {<br>            one Product key NameMsgID; /* i.e.,<br>            Message.MessageID = Product.NameMsgID */<br>            /* ... */<br>        }<br>        /* ... */<br>    }<br>    table Category /* ... */<br>    { |

| -continued |
|---|
| relset-decl and rel-decl |
|         key CategoryID;<br>        relatedto { many Category key ParentcategoryID; }<br>    }<br>    table Invoice /* ... */<br>    {<br>        key InvoiceID;<br>        relatedto { many TransactionPart optional;}<br>    } |

As can be seen from the above example, if any of a key's field names are changed in the target table, all field names must be specified even if some field names are the same, and the order and actual data types must match. The relationship may also be reflexive, as for the Category table where the Category records, although stored in a flat table, are logically structured as a tree, and each record has at most one parent, but one record may be the parent of several other records. If the relationship is marked optional, then the foreign key field in the target table may legally contain null or invalid keys, signifying no relationship. For example, in the Invoice table shown example above, a given TransactionPart record may reference an invoice (e.g. if the transaction is an invoice payment) while another may not (e.g., the transaction records a bank service charge).

Specifying Basic Permissions

According to this aspect, the IDDB provides the application designer the capability to declare basic permissions that apply to each activity. Every activity part is implicitly an activity permission as well, so this facility concerns the designer's ability to specify additional permissions as desired.

In DC Language, a permission set declaration, permset-decl, is of the form:

| permset-decl and perm-decl |
|---|
| permset-decl = "permissions" "{" { perm-decl } "}".<br>    perm-decl = permission-name<br>    ":" ( "core" | "all" | frag-spec { "," frag-spec } ) ";".<br>    frag-spec = table-name { ":" stamp-field-name } | permset-decl and perm-decl

For example, the basic permissions for the table Project /* ... */ are declared as follows:

```
table Project
{
    /* ... */
    permissions
    {
        ESTIMATING: core;    // needs only core activity (no
                             activity parts)
        ADMIN: all;          // needs all data in the activity
        ACCOUNTING: Bank, Transaction, Transactionpart:Stamp1;
                             // needs the selected tables/columns only
    }
}
```

The permissions clause may only be used in activity tables (or, in the database declaration, for the global activity; see above). For each permission name, the designer specifies the tables within the activity which someone who has this permission may use: either core, meaning only the tables in this activity that are not marked as part of an activity part; or all, meaning all tables in this activity regardless of activity parts; or a comma-separated list of table/fragment names if the designer wishes to manually specify a set of tables.

In the example shown above, the ACCOUNTING permission applies to the Bank and Transaction tables, as well as the fragment controlled by the Stamp1 stamp field of TransactionPart.

Because the basic permissions may be used to restrict, as well as grant access, entering a list of table names is useful for defining a permission intended only to limit a user. For example, suppose that a particular table (e.g., AccountingTransaction) is part of many activity parts, but it is desirable to specifically bar some users of those activities from writing to the table. A permission ACCTRANS: AccountingTransaction is defined and the user is granted the usual permissions, except the permission ACCTRANS with the dPermType of Write is revoked by setting Permit= FALSE in the respective dPermissionGroup record at runtime.

Encryption and Data Security

The IDDB also provides the application designer with a facility to selectively encrypt columns in any table, and specify different algorithms, key lengths, and even actual keys for different (sets of) columns. Preferably, the application designer is allowed to have columns in different tables encrypted with the same key.

In DC Language, an encryption declaration, cryptset-decl, is of the form:

cryptset-decl, crypto-algo, and crypt-decl

```
cryptset-decl - "encrypt" crypt-algo "{" { crypt-decl } "}".
    crypt-algo = "DES" | "3DES" | ( "RC2" int-value ) | ( "RC5"
    /*             in-value.
    Note: This rule can be extended as desired to support any needed
    algorithms. */
    crypt-decl = field-name [ cryptkey-name ] ";".
```

For example, selected columns in the Employee table are encrypted as follows:

```
table Employee /* ... */
{
    /* ... */
    encrypt RC2 16 // use 16-byte (128-bit) keys
    {
        Address;
        Phone;
        Position  EmployeeFinancial;
        Salary    EmployeeFinancial;
    }
}
```

In this example, the Employee.Address and Employee.Phone fields are encrypted with the same 16-byte RC2 key (though the actual key value itself will be different from site to site at runtime). The keyname is by default the same as the table name (i.e. Employee). The columns Employee.Position and Employee.Salary are encrypted with a different 16-byte RC2 key called EmployeeFinancial.

Since the designer can choose keynames as desired, the designer can easily specify the same key (as long as it is the same type of key algorithm with the same parameters, if any) for columns in other tables. This feature allows encrypting columns in different tables with the same key.

The Standard.DC Distribution Control File

Each application's Distribution Control includes a standard DC file that defines and controls the standard tables described above for the application database. A STANDARD.DC according to this aspect of the invention which also shows the use of the replication rule set is shown below.

STANDARD.DC File

```
/******************************************************************
**
**    STANDARD.DC
**
**    This distribution control file must be #include'd in any application .DC
**    to provide the standard system settings expected by the DRE.
**    DO NOT change this file. If you need to extend any of these system tables
**    (e.g. to add a relationship), do so in your application's .DC source file
**    using the 'extend' keyword. For example:
**        //Our application has a Product table, and we want the product name
**        //to be a translated message. We need to extend the Message table:
**        extend table Message
**        {
**            relatedto
**            {
```

-continued

| STANDARD.DC File |
|---|

```
**              one Product key NameMsgID;
**          }
**  }
***********************************************************************/
id SiteID            { stock 20; }
id UserID            { stock 20; }
id GroupID           { stock 20; }
id CommandID         { stock 30; }
id LanguageID        { stock 5; }
id MessageID         { stock 500; }
id ActivityTableID   { stock 0; }
// Site and related tables
//
table dSite : activity
{
    key SiteID root;
    relatedto
    {
        many dIDBlock;
        many dLog;
        many dcommand key OriginatingSiteID;
        many dcommandSite;
        many dSiteLink;
        many dUserSite;
    }
}
table dIDBlock
{
    replicate idblock
    key ActivityTableID, ActivityID, Name, MinID;
}
table dLog
{
    key SiteID, LogNo;
}
table dCommand
{
    key CommandID root;
}
table dCommandSite
{
    key SiteID, CommandID;
}
table dSiteLink
{
    key SiteID, LinkToSiteID;
}
// Security tables
//
table dKey
{
    replicate local;
    key KeyName;
    relatedto
    {
        many dPermissionKey;
    }
}
table dPermission
{
    replicate local;
    key PermissionName;
    relatedto
    {
        many dPermissionKey;
        many dPermissionGroup;
    }
}
table dPermType
{
    replicate local;
    key PermTypeName;
    relatedto
    {
        many dPermissionGroup;
    }
}
```

-continued

STANDARD.DC File

```
table dPermissionKey
{
    replicate local;
    key PermissionName, KeyName;
}
table dUser
{
    key UserID root;
    relatedto
    {
        many dUserSite;
        many dUserPreference;
        many dUserGroup;
    }
    encrypt 3DES
    {
dUserGroupCheckSum; //make these difficult to read, much less change
dUserSiteChecksum;
    }
}
table dUserSite
{
    key ActivityTableID, ActivityID, UserID, SiteID;
}
table dUserPreference
{
    key ActivityTableID, ActivityID, UserID, PreferenceName;
}
table dGroup
{
    key GroupID root;
    related to
    {
        many dUserGroup;
        many dPermissionGroup;
    }
    encrypt 3DES
    {
dPermissionGroupChecksum; //make these difficult to read, much less
                                change
    }
}
table dPermissionGroup
{
    key GroupID, PermissionName, PermTypeName;
}
table dSiteGroup
{
    key Group ID, ActivityID, SiteID;
}
table dUserGroup
{
    key GroupID, ActivityID, UserID;
}
//Languages and messages
//
table dLanguage : activity
{
    key LanguageID root;
    relatedto
    {
        many dMsgLang;
        many dUser;
        many dSite;
    }
}
table dMessage
    replicate asneeded;
    key MessageID root;
    relatedto
    {
    one dLanguage      key NameMsgID;     //here we choose to override
    one dGroup         key NameMsgID;     //the name of the key as it
    one dpermission    key NameMsgID;     //appears in the related table
    many dMsgLang;
    }
}
```

-continued

STANDARD.DC File

```
table dMsgLang
{
    replicate asneeded;
    key MessageID, LanguageId;
56
//Miscellaneous
//
table dAttach
{
    replicate local;
    key AttachID;
}
table dActionQueue
{
    replicate local;
    key ActionID;
}
table dActivityTable
{
    replicate local;
    key ActivityTableID root;
    relatedto
    {
        many dActivitySite;
        many dIDBlock;
        many dGroup;
        many dUserSite;
        many dUserPreference;
    }
}
table dActivitySite
{
    key ActivityTableID, ActivityID, SiteID;
}
table dTranslation
{
    replicate local;
    key TableName, FieldName;
}
table dVersion
{
    replicate local;
    key Version;
}
```

The implementation of the STANDARD.DC as shown above in pseudo-code form is based on the previous DC language description and will be within the understanding of one skilled in the art and further description is therefore not needed.

Distributed Record Creation

To distribute the data across the application network, the IDDB includes a distribution mechanism. According to this aspect of the invention, the IDDB provides a distributed record creation process which features fail-safe mechanisms that ensure the consistent recognition of the identity and age of any fragment throughout the application network, regardless of site. (The methods for agreeing on the ages of fragments are described above.)

Identity. As will be described, the distributed record creation procedure makes it possible for all sites to always agree whether "this fragment" and "that fragment" represent the same data, even if their attributes may be different. For example, two sites must always be able to agree that "my Erin Mills Project record" and "your Erin Mills Project record" represent the same Project, even if one record has a different contact phone number or an updated mailing address.

As will now be described, the distributed record creation procedure according to this aspect of the invention provides procedures for fragment identity agreement.

Key Uniqueness Requirements

In a database system, a key for a record is the unique identification for the record. The key for a fragment is, in turn, the record key with a sequential vertical fragment number denoting the part of the record that the fragment represents.

To agree on the identity of a fragment, reliance is placed on the fragment's key, which means that the key must be unique across the entire distributed database. In order to ensure a unique key, the key must be unique when the record is created.

The IDDB includes an active key allocation procedure for generating unique keys. To guarantee that a key will be unique across the entire distributed system, the procedure preferably has knowledge of all the keys in the system. The keys are generated by making the root node of each activity group responsible for creating and delegating "approved" batches of keys for all other sites to use. During the normal site links, each site requests such key blocks as needed from the root or from other sites in the activity group, then uses the keys itself or delegates them to other sites in the activity group as necessary. Therefore, the root site in the activity group needs to maintain knowledge of the greatest key value of each type that has been created, and can continue creating new key batches or sets as existing key sets are used up.

According to this aspect, the key sets comprise "ID's" and "ID blocks". An ID is a key (or a part of a composite key)

which is guaranteed to be unique across the system (or within its parent, if it is part of a composite key with an activity table key). In the following description, each ID is defined to be a long integer, although it will be understood that the IDDBMS implementor is free to choose a different data type to represent the ID's.

According to the key allocation procedure, the current root of the activity is responsible for generating all ID's or ID blocks that must be unique for that activity throughout the system, and more ID blocks are created as the ID's are used. In particular, the root of the global activity is responsible for generating the unique ID's of activity table records. It will however be appreciated that not all ID's under an activity need to be unique within that activity. In the following example, a database schema comprises an Estimate table as part of a Project activity and a Country table as part of a Branch activity. While the ID's for the Estimate table are unique within a given Project, the ID's for the Country table need be only globally unique, i.e. if the Branches are to be split and a Country reassigned to another Branch.

Preferably, the ID's are allocated before they are needed. (To allocate ID's "just-in-time" as they are needed, would mean that a site could not create a record without an on-line transaction.) Accordingly, the ID's are allocated in blocks before they are needed, and each site stores a pool of all the potential types of ID's it may need. This feature is used to guarantee that no ID of the same kind can exist at more than one site simultaneously.

Those sites that may need to supply ID blocks to other sites store additional reserves of any ID's that its "children" may require in order to avoid running out if there is a sudden simultaneous demand from many children. For example, spine sites, that may be asked for ID's by non-spine sites, some of which will not connect to the current activity root directly, will preferably store sufficient additional ID's to meet such demands.

Each type of ID to be generated includes the following two quantities: (1) s, the stock quantity; and (2) r, the reorder quantity. The stock quantity s represents the number of ID's allocated in a new block. The reorder quantity r represents the number of ID's below which level the site will request a new block from another site.

Preferably, spine sites will stock some multiple of the usual stock quantity, depending on the number of non-spine sites in the activity, since some (or perhaps all, in a massive failure situation) may look to the spine site for ID blocks for the given activity.

The "stocking" and "reordering of ID's is described further by way of an example for purchase order (PO) ID's. The Project activity includes a PO table and the IDDBMS is configured to stock PO ID's in groups of 40 and reorder at 15. With these values, every site in a given Project's activity group automatically receives a block of 40 PO ID's just in case they are needed (or more for spine sites), and any site may then generate at least 25 purchase orders without queuing a request for more PO ID's during the next network connection. The reorder quantity of 15 gives each site a buffer wherein a reorder request has been triggered but the site can still continue working autonomously with the existing ID's. The site could continue generating PO's without making a network connection until all PO ID's were exhausted, but then it would be forced to connect to another site in the activity group before more PO's could be created. With well-chosen stock and reorder quantities for each ID, and regular connections between sites, such an occurrence is minimized.

If the IDDBMS utilizes a 32-bit or longer value for the ID's, then usually the stock and reorder quantities could simply be set to very high values (e.g., stock 1,000,000; reorder 100,000) so that a single ID block would always be sufficient for every site.

The application designer may decide that some entities, for example Branches and Countries, should only be created centrally at whatever site the activity root is located. To implement a "Zero-Stock Idiom", the stock and reorder quantities are set to zero for both BranchID's and CountryID's. With zero stock and reorder values, no other sites can ever obtain the proper ID's and therefore can never create the related entities.

As described, entities using controlled ID's in their keys may only be created using valid pre-allocated ID's, and fall into five general creation cases. The first two cases require pre-allocated ID's for records to be created and comprise:

(1) Top-level (parent) tables which are tables that are not at the "many" end of any relationship. Each table has a single controlled ID as its complete primary key, and records may only be created using preassigned ID's.

(2) One-to-many relationships (general case) represent the exception to case (5) below and comprise tables that are one-to-many from a parent table and must have a controlled ID in the primary key, e.g., Estimate 108 (FIG. 8) is one-to-many from Project 104 (FIG. 8). Often the controlled ID is the entire primary key and, if so, the key must be globally unique. If the parent table's key together with the child's controlled ID is the child table's key, then the controlled ID is unique within the parent's key. This is often the case when the parent is an activity table.

The remaining three cases do not require pre-allocated ID's for records to be created. The records may be safely created by any site at any time as long as the related parent record(s) already exist. These creation cases comprise:

(3) One-to-one relationships comprising tables that are children of another table in a one-to-one relationship, and the children have the same key as their parent. Records may be created at any time without extra ID keys by using the parent's key since the parent record exists and its key is already unique throughout the network. This means that there is no violation of identity even if two sites both create the same related record independently, and all sites can always agree that they are the same record.

(4) Tables embodying many-to-many relationships comprise a table where the key is a concatenation of the two (or more) parent keys. New records are created at any time without loss of identity because no additional identity information is required to specify a unique key. Consider the example comprising a SupplierProduct table (key: SupplierID, ProductID), which is a many-to-many relationship between Supplier (allocated key: SupplierID) and Product (allocated key: ProductID). Accordingly, a given SupplierProduct key can only ever embody one thing, namely how that specific Supplier relates to that specific Product. There is no identity problem should two sites independently create the same record, since all sites can always agree on the record's identity because the related Supplier and Product records already exist and are already guaranteed to have the same meaning at all sites.

(5) One-to-many relationships with a useful key in the problem domain (special case). In special cases, a table that is one-to-many from a parent does not need its own controlled ID if a unique useful key is already supplied by the problem domain. For example, to date-version a Tax table there is provided a Tax table having (allocated key: TaxID) related one-to-many TaxDate (key: TaxID, EffectiveDate). The EffectiveDate is the date at which the new tax rules go in force. These records may be created at any site, since if records with the same key are created at two sites they must refer to the same version of the same Tax (because they refer to a Tax, which already has identity) and the EffectiveDate quantity is independently meaningful and unique in the problem domain.

It will be understood that according to this aspect of the invention the unit of replication is the record fragment, but the unit of creation is the record. At creation time, it is preferable to create the entire record instead of one fragment of a record, because at creation time the entire record has the "common update responsibility" normally associated at modification time with a fragment. In other words, the user creating a record is modifying all fragments in that record, and is responsible for setting them correctly.

Distributed Record Deletion

A significant feature of the IDDB according to the present invention is that it is difficult to lose data. In particular, the only way to destroy information manually is to delete is simultaneously from every site at which it is stored. If the record is deleted at one site, the IDDB replicates the record from other undamaged sites and the record is "backfilled".

There will however be occasions where it is necessary to delete a record. The IDDB includes a procedure for asynchronous record deletion, where at some point after a record has been deleted at one site it is not yet deleted at another site, but must not be "backfilled" at the original site(s). The asynchronous record deletion procedure utilizes system commands to propagate the deletion(s) through the activity group as will now be described in more detail.

To delete records, deletion commands are propagated using a Command table. The Command table contains system commands which are to be sent through the network. It will be understood that although deletion of a record means the removal of a particular allocated ID throughout the network, the ID's for the deleted record(s) are not to be reused.

The deletion Command record is a signed certificate containing a command of the form or equivalent:

delete tablename keyfield1 {keyfield2 . . . }

The command is signed either by the site initiating the deletion or by the user authorizing the deletion. The former is useful when permission to delete records is given on a per-site basis. The user authorization is useful when permission is given on a per-user basis.

In the distribution control (DC) file, the application designer may specify for each table whether records in the table may be deleted by any site in the activity group, by authorized sites only, or by authorized users only. If records are to be deleted only by authorized sites or users, the PermissionID is also preferably specified. (The IDDBMS uses the PermissionID to determine whether the site or user has the requisite permission).

Based on the tablename and key field values parsed at replication time, the IDDBMS knows by which activity (possibly the global activity) the to-be-deleted record is controlled, and the IDDBMS can ensure that the command is replicated only within the appropriate activity group. When a site receives and executes the delete command a dCommandSite entry is created containing a reference to the original Command record and this site's SiteID. The dCommandSite entry is signed with the private key of the site. As each site sees the full set of dCommandSite records, the site may safely delete the command itself and the related dCommandSite records, since it knows that the other sites have already seen the command, so no backfilling of the deleted record will occur.

Distributed Record Modification

If the same fragment is updated at two different and possibly distant sites, the IDDB preferably includes procedures for determining which fragment should take precedence, and procedures for attempting to detect and log collisions.

The general procedure used by most application networks to determine which fragment takes precedence comprises the rule that the "most recent fragment survives".

The IDDB allows the procedures for detecting and logging collisions to be implemented at design time or delegated to an administrator at run-time. The advantage of a design-time policy is that it is easy to apply consistently across the application network and cannot be overridden by individual administrators. The advantage of a runtime policy is that it can be customized for specific situations and uses.

The IDDBMS according to the present invention provides the following three collision procedures: (1) most recent fragment survives; (2) "blindside" detection; and (3) full logging, as will now be described in more detail.

(1) Most Recent Fragment Survives

According to the most recent fragment survives rule, the most recently changed version of the fragment survives, regardless of variations in local clock differences. The IDDBMS performs no extra logging and it is assumed that the most recent information supersedes older information. The integrity of this procedure is based on the generation of consistent and proper time-stamps throughout the application network. Preferably, the IDDBMS utilizes relative clocks as described above, or an equivalent thereof.

(2) "Blindside" Detection

While the "Most recent fragment survives" procedure will work well in most database applications, it does not detect the case illustrated by the following example.

In this example, there are three sites A, B, and C. The real last-updated time of the version of a given fragment f at site s is $t^f_s$, and at the start all three sites are and remain synchronized.

|  | Site A | Site B | Site C |
|---|---|---|---|
| Start | $t^f_A$ = 1:00 pm | $t^f_B$ = 1:00 pm | $t^f_C$ = 1:00 pm |
| B edits at 2:00 | $t^f_A$ = 1:00 pm ←←← | $t^f_B$ = 2:00 pm | $t^f_C$ = 1:00 pm |
| Link A–B | $t^f_A$ = 2:00 pm | $t^f_B$ = 2:00 pm | $t^f_C$ = 1:00 pm |
| A edits at 3:00 | $t^f_A$ = 3:00 pm | $t^f_B$ = 2:00 pm | $t^f_C$ = 1:00 pm |
| C edits at 4:00 | $t^f_A$ = 3:00 pm | $t^f_B$ = 2:00 pm | $t^f_C$ = 4:00 pm |
| Link A–C | $t^f_A$ = 3:00 pm ←←← | ?????→→→ | $t^f_C$ = 4:00 pm |

It can be that while site C's fragment is more recent, it was changed on the basis of its 1:00 p.m. value, whereas site A's fragment was changed on the basis of the more recent 3:00 p.m. value. Generally, this is not a problem and "most recent fragment survives" procedure is sufficient. However, the "blindside" detection procedure is advantageous in cases where the previous value of the fragment was important because it affects the current value of the fragment.

Application Designer Workarounds

Site permissions also provide the application designer and administrators with an effective way to deal with sensitive fragments to ensure that they are only modified at one site (or, by one user). If a fragment can only be modified at one site then the problem cannot occur, and if only one user has permission then that user is responsible for knowing the correct state since that user "owns" the fragment.

It is also advantageous to date-version the information, i.e. a history of versions of the record is kept. The date-version procedure comprises separating the columns of the table (e.g., a Tax table, with key TaxID) into separate Tax (key: TaxID, as before) and TaxDate (key: TaxID, EffectiveDate) tables, related on-to-many. The Tax table stores the core information that does not change over time and the TaxDate table stores the information that does change over time. The application can always go back and determine the value of the information as of any given time in the past.

Automated IDDBMS Detection and Reporting

One way to provide automated reporting of the information for "blindside" detection involves having each fragment store a hash of the entire fragment contents as of the last replication. When the replication engine (DRE) has just replicated a fragment, both sides store with that fragment a hash of the contents exactly as they were just replicated, and/or a time-stamp. As users at the site make changes to the fragment, the stored hash is unchanged. This way, when the next replication occurs, while deciding whether to replicate, the two sites can easily determine whether the above condition has taken place (i.e., whether either site's fragment was changed based on information newer than the information the other site's fragment was changed based on).

According to the "blindside" detection procedure, one site is getting hit (i.e. blindsided) with an unforeseen change after it has already made changes based on older data, under the assumption that the older data was the most recent (if a replication time-stamp is being stored) or at least that the two changes were made based on different versions of the record (if a hash is being stored). The cost of this detection is that the IDDBMS must store an extra hash result, which with the stamp field increases the housekeeping and security overhead in each fragment. As with time-stamps, the IDDBMS may choose to let the user configure how many bytes of hash to store and/or whether to use a time-stamp.

Applying this procedure to the above example, the replication engines would know that the fragment at A was last changed at 3:00 p.m. and that before 3:00 p.m., the fragment had been replicated to/from A to 2:00, with the hash providing some validation of the contents at that time. The replication engines would also know that C's fragment was last changed at 4:00 p.m. and that before that the fragment had been replicated to/from C at 1:00 p.m. with the hash providing some validation of the contents at that time. Both sides have sufficient information to create audit log messages, containing all of the above information including each side's current record contents, that can later be reviewed by an administrator at these or any other appropriate sites.

In addition to reporting the "blindside" collision in the audit logs, the application designer should decide on the following actions: (1) whether to completely refuse to replicate the fragments (it will be understood that this could cause inconsistency in some situations); (2) whether to replicate and keep the most recent current fragment; (3) whether to replicate and keep the fragment with the most recent replication time-stamp (the fragment that was changed based on newer information); or (4) whether to replicate and keep the fragment with the least recent replication time-stamp (the fragment that was changed based on older information).

The selection of the appropriate action will depend the application designer's needs in the given situation.

(3) Full Logging

The third procedure for collision detection comprises full logging of all fragment replication.

Record Fragments

The IDDB according to the present invention provides two principal levels of replication control.

The first is activity-level replication for both activities and activity parts as described above. Activities can be defined as cohesive groups of related information. This feature provides a higher degree of control than specifying match criteria for sets of records in different tables.

The second level of replication control is where record fragment is the unit of replication. The record fragment defines the granularity with which changes propagate through the distributed system. Some columns in a table will have a common update responsibility, and grouping these columns together in fragments allows designers to achieve full replication control without having to micro-manage replication rules on a field-level basis. As described in relation to Record Creation Semantics, in the special case of record creation (rather than modification) the entire record has common update responsibility.

According to the invention, a fragment is defined as the unit of replication. A record fragment is a set of non-primary key columns together with one stamp field. Every fragment in the database is uniquely identified by its table name, record key, and a fragment ID (e.g., the stamp field name) to identify a specific fragment within that record.

To make stamp fields more visible, the IDDBMS could reserve the fieldname prefix "Stamp" to identify stamp fields, and the designer may still create as many stamp fields as desired in the same table (e.g., "Stamp", "Stamp2", "StampEngineering", etc.).

The Primary Key

It is to be understood that the table's primary key columns are not part of a data fragment, but are shared by all fragments. The table name and primary key (along with the fragment name/number, usually the stamp field name) uniquely identify each fragment of data in the database.

Because the primary key value is not part of any fragment but is used to identify fragments, values of the primary keys cannot be arbitrarily changed as can the values of normal data fields. If the application needs to change a primary key value, the change is processed as a "delete" of the old record followed by an "add" of the same data under the new key, in a manner recognized by the IDDBMS.

Changing a primary key value otherwise, by bypassing the IDDBMS, would be seen by the IDDBMS as the disappearance of the old record (which would be backfilled from other sites) and the creation of a new record (which may pass or may fail integrity checks and be ignored. Thus, making such a change outside the IDDBMS would result in the change being "self-repaired" and not persisting.

Identifying Fragments

The columns making up a fragment are preferably columns with a common update responsibility. That is, a user or process that knows enough to change one field in the fragment can be assumed to know enough to also change the others. The information in a fragment is preferably cohesive, and putting columns in the same fragment will tightly couple those columns for replication purposes.

For example, given a Supplier table with columns {Name, Address, City, Province, Phone, Fax, PaymentTerms, ShippingMethod}, the designer would preferably put the first six columns in one fragment and the last two in another. If a user updates a supplier's address, it is likely because the supplier has moved or the address was incorrect, and in this situation the same user at the same time should know enough to change the other fields (e.g. City) appropriately and these changes should be replicated together. Another user at another site may know that the supplier has just changed his operations policies, and may adjust the default shipping method or payment terms. These changes do not share a common update responsibility with the supplier's name and address (just because a user knows to update an address doesn't means he also knows to update the payment terms), and therefore should not conflict with name or address change made elsewhere in the network. By putting these columns in separate fragments, the designer achieves the desired effect.

Damage Detection and Repair

The IDDB preferably includes procedures for detecting local database corruption, whether accidental or deliberate. At the very least, corrupt data must not be allowed to escape into the rest of the application network, since this would seriously compromise integrity. Furthermore, it is preferable that information from the rest of the network be used to actively correct corrupted data at the local site, and this process should be automatic and transparent (save in audit logs) to the application's users and administrators.

To implement satisfactory damage detection and repair, the IDDBMS must first implement integrity controls that allow it to verify the integrity of fragments in case they are accidentally corrupted or deliberately attacked and suitable mechanisms are described in the context of Fragment Validation below.

According to this aspect of the invention, at replication time and before replacing a given fragment the replication engine checks its validity. Any fragment that fails its integrity check is treated as if it did not exist. If a valid version of the same fragment exists at the other site, the replication engine replaces the local corrupt version. If no valid version exists at the other site, the invalid fragment(s) may optionally be physically deleted.

The processing steps executed at replication time (not including security procedures) are as follows:

(1) Perform reference time agreement with other site, and use SiteLink historical information to determine a cutoff time before which no local fragments need be considered for replication.

(2) Determine the (set of) activity(ies) to be replicated between these two sites.

(3) For those activities, scan all database fragments and determine the set of local fragments that are more recent than the cutoff time.

(4) For each fragment, check integrity. If the check fails, physically delete the local fragment.

(5) The site with the smaller set (i.e. Site A) sends its set of fragment keys and stamps (much smaller than the actual data values) to the other site (i.e. Site B), which compares it to its own list and determines which direction (if any) to replicate each fragment.

(6) Site B transmits all its fragments that are newer than Site A's (or that Site A does not have at all). Site B also transmits a request-list, a list of fragments where Site A's are newer (or that Site B does not have at all).

(7) Site A transmits Site B's request-list.

It will be appreciated that according to the sequence of steps described above only new (or new-seeming) fragments will be checked because the integrity check is performed after the determination of the cutoff time is set. As a result, if there are corrupt fragments with old time-stamps which do not have corresponding new versions at other sites, they will not be checked by this sequence. Preferably, the IDDBMS periodically checks the integrity of all fragments in the database. For performance reasons, the IDDBMS implementor should allow local site administrators to have this occur with a different frequency/schedule than normal replication.

This information may also optionally be made available to the application, for example, using a FragmentOK function or similar API that returns a Boolean value, hiding the hashing and other techniques being used internally. Then, whenever the application reads data it can also confirm whether or not that data is valid, which may be appropriate for some applications.

Periodically, pairs of sites will preferably perform complete scans to compare their database contents, so that any inconsistencies in fragments older than the cutoff date can be discovered. These should appear very rarely if at all. For example, if an "old" record is deleted and there are no newer updates to it at other sites, the normal replication check (which is optimized to assume that fragments older than the cutoff date are unchanged) will not catch the deletion.

Replication Rules

The IDDB according to the present invention allows application designers to flexibly and accurately control the distribution of the database contents to appropriate sites.

The distribution of the database is controlled by three principal procedures: global replication; activity replication (including variations for activity parts and subactivities), and as-needed replication.

While the replication procedures have been described or referred to above, the replication procedures are summarized as follows:

(1) Global Replication is the default for tables in the global activity (not under an activity table). All fragments are distributed to all sites.

(2) Activity Replication comprises replicating the core activity (not including activity parts) to all and only those sites participating in the activity.

(3) Activity Part Replication comprises replicating within a given activity, the fragments in each activity part to all and only those sites participating in those parts.

(4) Subactivity and Subactivity Part Replication. If participating in an activity implicitly makes a site part of a parent activity (and/or if participating in an activity part implicity makes the site part of a parent activity part), then that activity and/or its appropriate parts are replicated as well.

(5) user permission-name {"," permission-name} comprises replicating the relevant contents of this table only to sites where at least one user with at least one of the specified set of permissions is allowed to log on.

(6) as needed replication comprises replicating a fragment to a site only if that site already (or as a result of this round of replication) has a related record. For example, dmessage and dMsgLang (used to store language-independent messages) are replicated asneeded. If an application database defines a Product table whose name is stored as a translated MessageID, not all Product records may exist at all sites, and only those sites with a given Product should store the related translated message. For another example, the dLanguage table is an activity and sites should only store message translations for languages which they are actually using.

(7) local replication. The table contents are intended for local use only and are not replicated to other sites.

(8) idblock replication applies to the dIDBlock table only and comprises an internal rule which is not available to application designers.

Security for IDDB Networks

According to another aspect of the present invention, the IDDB includes mechanisms for securing the communication paths between sites running an application over the network. While most of the communication links between sites in an IDDB application network can be secured using conventional security techniques, e.g. authentication handshakes, session keys, certificates/CA's/CRL's, the IDDB according to the invention presents a new class of security issues.

It is a principal feature of the IDDB that each site in an application network has a local copy of "all and only" the data it needs, and sites in the application network include computers outside the organization, for example, notebooks for mobile users and remote home computers. The crux of the security issue in the IDDB becomes how to store sensitive information on an untrusted machine run by a potentially untrusted user.

Accordingly, the IDDB provides a security mechanism which reasonably ensures that the database can only be accessed via the legitimate application, i.e. users cannot bypass the legitimate application to perform unauthorized database access.

The security of the IDDBMS preferably depends only on the actual cryptographic keys used to create certificates or secure each site, and the mechanisms used to manage and protect those keys so that they are never divulged to an attacker, including protocols and key management. This approach is based on the assumption that an attacker will have full knowledge about how the IDDBMS stores keys, encrypts time-stamps, calculated uniqueHashes and fragHashes, and so on.

In the description that follows, the following definitions are used:

digest, cryptographic hash, and hash are used interchangeably, uniquehash for a given field in a given record means a hash of the record's primary key value(s) and the field's column name, fragHash for a given record fragment means a hash of the contents of all data fields in the fragment Local Databases: Reading and Tampering As will be described below, the IDDBMS includes security tools to prevent unauthorized reading of the database, even though every attacker is assumed to have full physical access to the database itself. The IDDBMS also includes mechanisms for determining the integrity of every fragment so that tampered or corrupted fragments are not replicated and can be replaced with valid data from other sites. While the IDDBMS cannot prevent unauthorized changes to the local database, e.g. by malicious users or accidental corruption, tampered or corrupted fragments can be detected and replaced. These security mechanisms are described below in connection with Fragment Validation.

Certificates And CA's

Securing an IDDB application network comprises extensive use of certificates, and certification authorities (CA's). To ensure that the IDDBMS vendor, its clients, and their applications all have a sufficient degree of autonomy and control, the IDDB includes at least three levels of CA's (others can be inserted as desired):

(1) Trusted Root. The Trusted Root (TR) is generally the IDDBMS vendor or some other central licensing authority which acts as a certification authority (CA) to generate licence certificates for the organization CA's (OCA's). Preferably the certificates include the usual contents, i.e. the entity's unique name, public key(s) (if applicable), valid date range including expiry date, etc., as specified by ANSI, PKCS, and other known standards, in addition to the IDDBMS-related specific content described below. These OCA certificates may include optional information about licensing terms, fee structures, number of applications that may be developed/certified.

(2) Organization CA's (OCA's). Each organization maintains its own CA to generate licence certificates for its own applications, particularly the applications' CA's (ACA's). The OCA's might also generate other kinds of certificates, for example to set organization-wide security policies that should be shared by all its present and future applications.

(3) Application CA's (ACA's). Each application maintains its own CA to generate license certificates for its sites, users, software release packages, system commands, and possibly other uses. In particular, site and user certificates include each entity's public key(s), so that sites and users can digitally sign database structures, documents, or any other data. While the user's signing key may never be used by the actual IDDBMS, it is preferably provided by the IDDBMS so that the application designers may use user- and site-based digital signatures as desired (e.g., to validate application-specific information, such as estimates on a building project that must be authorized by two users).

Figure 16:
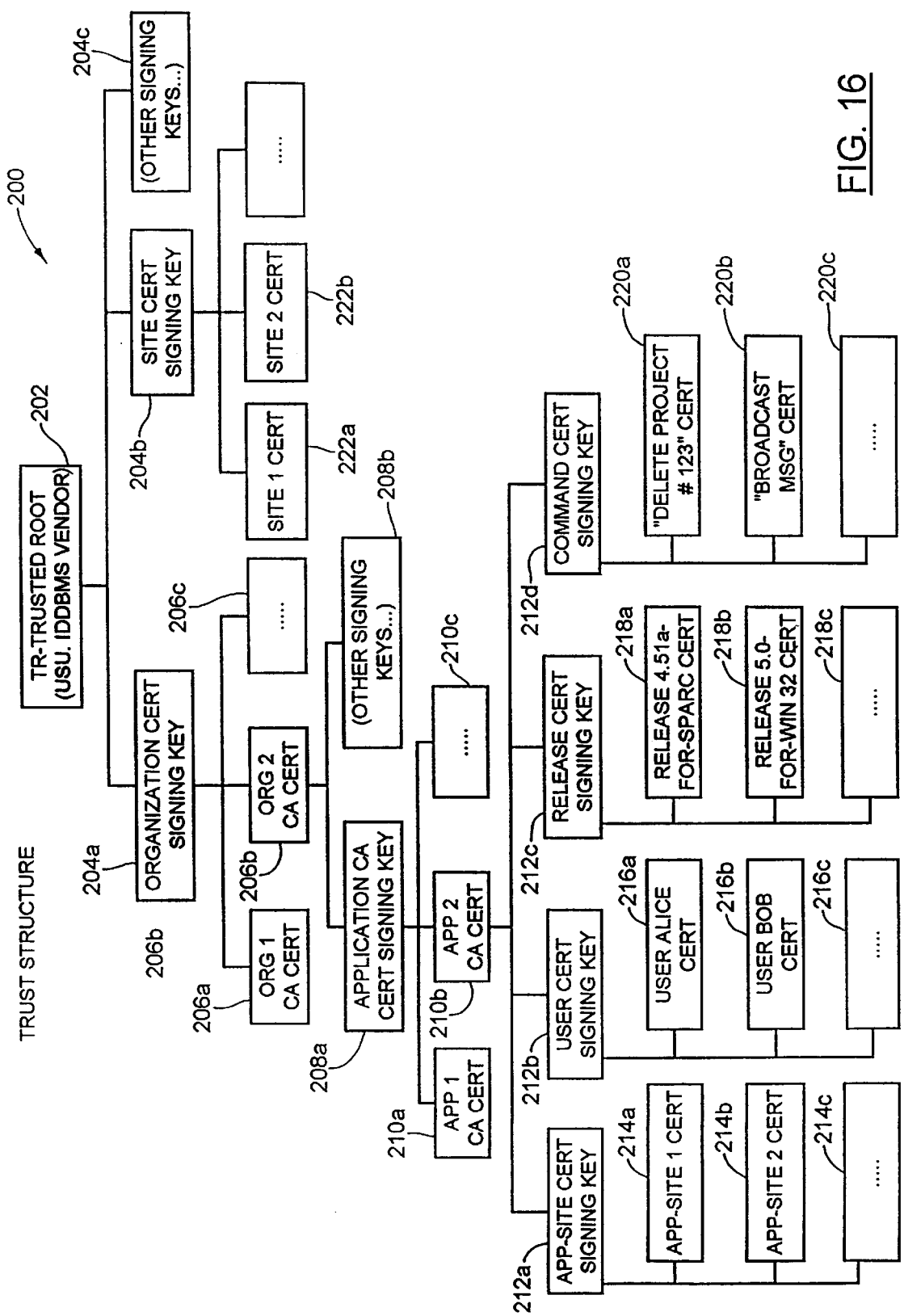
FIG. 16 shows a trust structure according to the present invention.

Preferably, the different kinds of certificates (and different signing keys) described above are used for the different things that a CA might "sign". Reference is made to FIG. 16 which shows a trust structure 200 for the IDDB. The trust structure 200 comprises a trusted root (TR) 202 and a first layer of signing keys 204. The signing keys 204 includes an organization certification authority 204a, a site certification authority 204b, and other signing keys indicated generally by 204c. The organization certification authority 204a is used for signing a series of organization CA certificates 206. Under the organization CA certificate 206a, application certification authority (ACA) signing keys 208 are provided. As shown in FIG. 16, the application CA 208a is used for signing application certificates 210a, 210b. Under an application, for example, "APP 2" 210b, there is provided another series of signing keys 212. As shown in FIG. 16, there is a signing key 212a for certifying application sites 214a, 214b. There is also a signing key 212b for certifying users 216a, 216b. There is a signing key 212c for certifying releases 218, for example, Release 5.0 for "WIN32" 218b. There is a signing key 212d for certifying system commands, i.e. in the command tables, 220.

It is preferable to use a key 212b for signing user certificates 216 which is different than the key 212d for signing system command certificates 220. That way, even if an attacker breaks the user-certificate signing key 212 and is able to temporarily generate illegitimate user certificates (until an administrator revokes the ACA certificate 210b), the attacker cannot at any time generate illegitimate system commands. Similarly, users 212a and 212c use still different keys.

The IDDBMS preferably manages the certificates and the certificate revocation lists (CRL's) according to generally accepted practices. In the context of the IDDB, the CRL's are propagated through the network by performing CRL replication as part of a normal link, for example, immediately after the authentication handshake.

Site Authentication

Referring to FIG. 16, when a new site is to be added to an application network, the application certification authority (ACA) 210b creates a site certificate 214c for the new site to validate it in the network. The site certificate 214c is generated by the ACA 210b using the application-site certification signing key 212a.

Later, whenever the site links with any other site in the application network, both sites first check that they agree on the trusted root (TR) 202 (FIG. 16), the current OCA certificate 206b (FIG. 16), and the current ACA certificate 210b (FIG. 16). If the sites do not agree on the Trusted Root 202 and the certificates 206, 210, then they cannot meaningfully validate each other, and the link is therefore rejected, and appropriate error messages are generated for the audit logs. If the sites do agree on the TR 202, the OCA 206b, and the ACA 210b, then the sites exchange their own certificates 214 and proceed to validate each other using their private keys and a standard authentication protocol.

Link Encryption

If the authentication succeeds, i.e., each site proves that it is indeed the site mentioned in its certificate, the two sites next agree on a session key. Agreement on the session key is preferably done securely either by a straightforward exchange of random bits in envelopes secured with their respective public keys, or by using Diffie-Hellman key agreement or an equivalent protocol as will be understood by one skilled in the art. Once the agreement on the session key is complete, the link proceeds with all data streams encrypted using the session key.

Release Packages

According to this aspect of the present invention, each software release package is released as a certificate with a signature that includes the Trusted Root (TR), Organization Certification Authority (OCA), and Application Certification Authority (ACA) certificate chain. The authenticity and integrity of each release package is verified by any site that agrees on the chain.

Fragment Validation

As described above, for every fragment of every record in the database it is necessary to know when the fragment was last modified, by whom, and from which site. Furthermore, the fragment is preferably verified to ensure that the change was made through a legitimate application program, and not by a tampering attempt that bypassed the legitimate application. In particular, fragments that have been tampered with are not to be replicated to other sites, but are overwritten by valid copies of the same fragment obtained from other site(s).

According to this aspect of the invention, a stamp 242 (FIG. 17) is generated for each fragment and the stamp 242 is checked and verified during replication.

Figure 17:
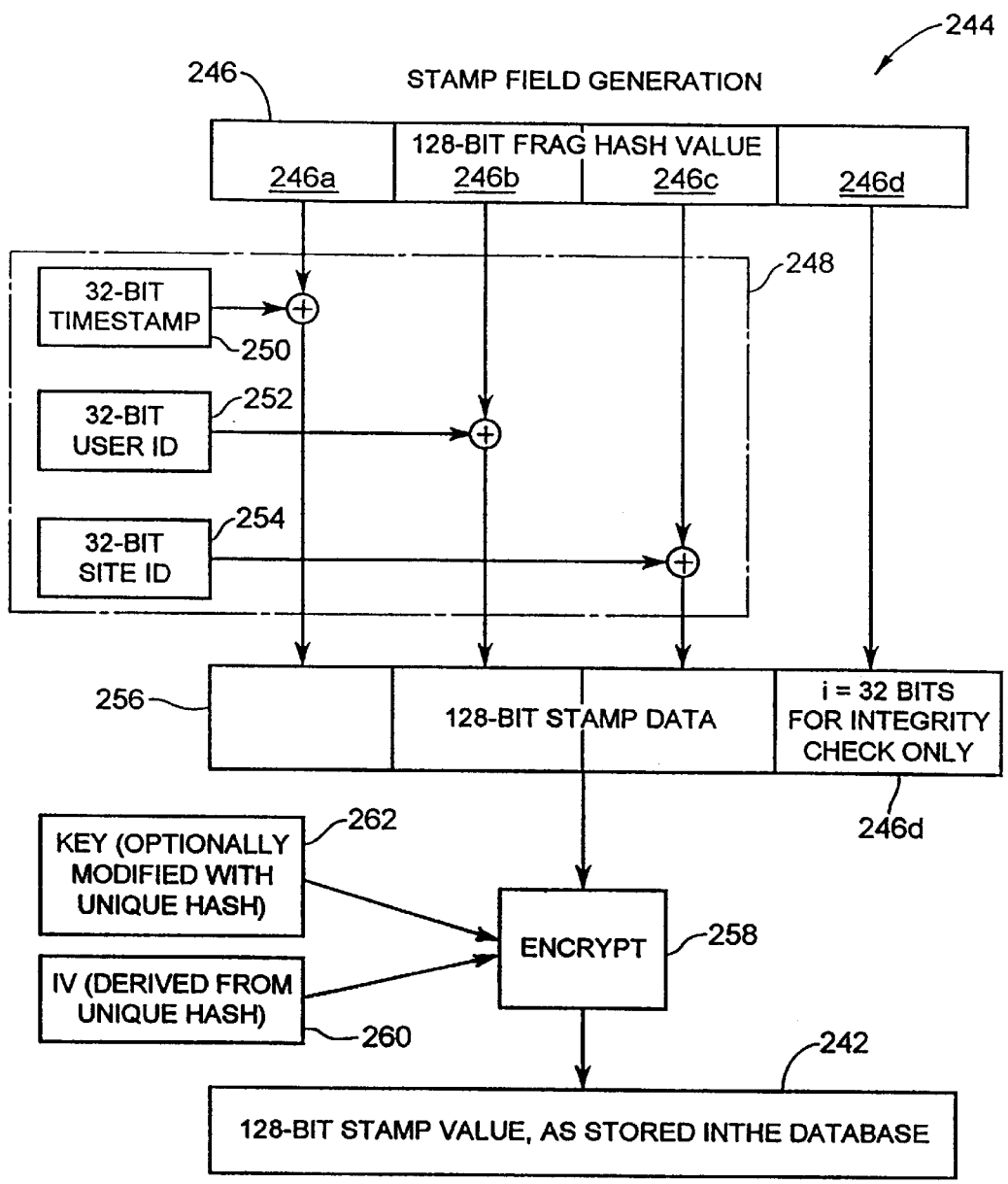
FIG. 17 shows a method for stamp field generation according to the present invention.

The stamp 242 comprises a bit field which is encrypted and generated according to a method 244 as depicted in FIG. 17. The size of the field 242 is selected as 128 bits, but it is to be understood that the actual data sizes here and below, e.g. 32, 128 or 256 bits, can be altered to suit the application's needs.

Reference is made to FIG. 17, which shows the method steps for generating the encrypted bit field 242, i.e. "fingerprint". The first step (block 246) involves calculating a fragHash value for the fragment, using the entire contents of the fragment's data fields. For a fragment where the data fields are encrypted, the plaintext values are used, not the ciphertext values as stored in the database.

The next step (block 248) comprises an exclusive OR (XOR) operation, wherein a first portion 246a of the fragHash 246 is XOR'd with a field 250 for the 32-bit time-stamp, a second portion 246b is XOR'd with a field 252 for the 32-bit UserID, and a third portion 246c is XOR'd with a field 254 for the 32-bit Site ID. The remaining 32 bit portion 246d in the fragHash 246 is reserved for an integrity check. The result of the XOR operation in block 248 is a 128-bit stamp data block 256 including the integrity check field 246d. It will be understood that the order of XOR operations is not important and different portions (non overlapping) of the original fragHash may be XOR'd than those shown.

The last step (block 258) comprises encrypting the 128-bit stamp data block using a symmetric cipher to generate the fingerprint 242. The symmetric cipher is preferably operated in a mode such as Cipher Block Chaining CBC which requires an initialization vector (IV) 260 as will be understood by those skilled in the art. The encryption operation 258 requires the initialization vector 260 and a key 262. The key 262 is known to the IDDBMS, and preferably every table and every stamp field have their own key. The initialization vector (IV) 260 is generated from the uniqueHash of the stamp field (a hash of the record's primary key and the stamp field's column name).

Given the correct fragHash and uniqueHash values (i.e. calculated from the fragment itself) and the correct stamp encryption key, the replication engine (DRE—FIG. 4) performs the integrity check and extracts the time-stamp, UserID, and SiteID information.

It will be appreciated that the uniqueHash value is typically longer than the initialization vector (IV) 260. A typical hash function returns a 128-bit result, whereas most conventional block ciphers use 64-bit blocks. Thus, using the lesser number of bits required by the initialization vector (IV), or otherwise compressing the fragHash to end up with the number of bits needed for the vector IV, means reducing the uniqueness of the "fingerprint" 242 of the stamp field's position in the database. It is preferable that the method 244 utilize all of the bits in the uniqueHash for encrypting the stamp field 242.

For example, to provide an extra margin of security, in a 128-bit fragHash and a 64-bit block cipher, the first 64 bits of fragHash comprise the initialization vector (IV), and the remainder of the fragHash is XOR'd with the key 262. The objective is to make the encryption 'different' in each possible table position, so that even using the same cryptographic key and the same stamp column, the same value will encrypt to a different result in one row than in another. This helps prevent replay attacks, as described below.

Therefore to successfully attack a fragment, a potential attacker must know the stamp encryption key as well as all the keys used to secure the encrypted data fields (if any) in the fragment.

Optimization for Replication

Figure 18:
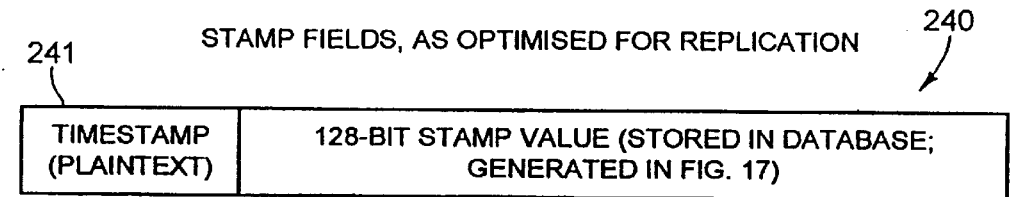
FIG. 18 shows a stamp field optimized for replication.

As shown in FIG. 18, the stamp fields 240 comprises a time-stamp field 241 and an encrypted bit field 242, which are optimized for replication efficiency.

The time-stamp field 241 appears in plain text, and comprises the time at which the fragment was last changed. The bit field 242 is encrypted and generated according to a method 244 depicted in FIG. 17. The stamp fields 240 shown in FIG. 18 are optimized for replication purposes.

The plaintext time-stamp field 241 allows the IDDBMS to quickly determine the age of a fragment, i.e. "fast scan", without the need to read every field of every fragment in the database that might be replicable (based on the activities at this and the other site), calculate uniqueHashes and fragHashes and decrypt the stamp, to determine the age of every fragment. While periodically the IDDBMS (typically the replication engine DRE process) should traverse the entire database to perform integrity checks and otherwise use the stamps, an optimization to speed replication (at the cost of deferring some validity checks) is desirable.

Because the plaintext time-stamp field 241 is pre-pended to the stamp 242, the field 241 is the most significant part of the value and the entire field 240 may be used as the basis of a SELECT . . . WHERE clause. For example, if Global-Table is a table to be replicated globally, and it has two fragments with stamp fields named Stamp and Stamp2, then replication engine (DRE) performs the following operations to obtain a "first-cut" set of fragments changed since some cutoff time:

SELECT *
FROM GlobalTable
WHERE
   Stamp>=<cutoff>OR
   Stamp2>=<cutoff>

Once the result set is obtained, the replication engine (DRE) checks the actual encrypted time-stamp 242 (FIG. 18) of each fragment and uses that, not the plaintext time-stamp 241, as the basis for replication.

It will be appreciated that this approach trades off delayed security for efficiency. The plaintext field 241 of the time-stamp 240 may be changed by an attacker, and the only way to detect the change is to conduct a "full scan" which comprises verifying the integrity of every fragment in the database, using the encrypted field 242 in every time-stamp 240. Accordingly, the IDDBMS preferably lets the application designer choose whether to perform a full scan of the database for every replication operation, or to use a fast scan for most replication operations with periodic full scans at selected intervals.

In the following, two general types of attacks, Blind Attacks and Partial-Compromise Attacks, and the security of the encrypted stamp field according to the invention are described.

Blind Attacks

Blind attacks comprise attacks where the attacker has no knowledge of the actual cryptographic keys used to secure the database, but otherwise the attacker has unlimited access to the physical DBMS itself and is able to create or modify records at will.

The attacks are described below in terms of tampering with existing records, but the same principles and considerations apply to tampering by creating new illegitimate records.

(a) Direct Tampering

It will be appreciated that any attacker can make changes to a fragment and then calculate the correct unencrypted stamp data. But without the stamp encryption key 262 (see FIG. 17), the attacker cannot successfully store a correct stamp to validate the tampered fragment. The attacker could tamper with a fragment and then set the stamp value blindly, but since the decrypted stamp value would be unintelligible, the IDDBMS will detect the tampering.

The probability that a given stamp value, set blindly by an attacker, will validate the tampered data is $1/2^i$ where i is the number of unmodified, i.e., not XOR'd with another value, fragHash bits 246d in the stamp (FIG. 17). For i=32, an attacker would have to blindly modify over three billion records to have a better than even chance that one change will go undetected.

(b) Basic Replay Attack

Under this scenario, even without knowing any stamp encryption keys, an attacker could copy the entire contents of a given fragment in one record, including the stamp, and store it in the same fragment of another record. The unencrypted stamp data would match perfectly, but the attack would fail because the same stamp in a different record would have a different primary key value. This means that the uniqueHash value 260 (FIG. 17) will be different, and since the uniqueHash is used during decryption with the initialization vector (IV), the stamp value will be unintelligible and the tampering is detected.

(c) Replay Attack Combined with Birthday Attack

Under this scenario, an attacker attempts tampering by combining a replay attack with a form of birthday attack taking the form of successively computing the uniqueHash (i.e., hash of primary key values and column name) for every existing fragment in a table; and if any two computations match, conducting a successful replay attack between any two fragments with the same uniqueHash.

It follows that for n-bit uniqueHashes, there are $2^n$ possible values, and therefore, an attacker would have to compute hashes for $2^{n/2}$ samples to have a better than even chance of finding some pair of samples that hash to the same value. In database terms, the attacker would need a target table that contained at least $2^{n/2}$ records to have a better than even chance that a particular stamp column's uniqueHash matched in two different records. For 128-bit uniqueHash values, that means $2^{64} > 1.8 \times 10^{19}$ records, which is well beyond the size of even the largest conventional databases.

If only half the uniqueHash bits are used, for example with 128-bit uniqueHash values and 64-bit vectors IV (i.e. where the hash is only used to obtain an initialization vector IV), the attacker would still need $2^{32} > 4,000,000,000$ rows to make a successful birthday attack likely. Because it is conceivable that a database table of this size could be implemented, to prevent such an attack, the designer will preferably use more than 64 bits of the uniqueHash to directly affect the stamp encryption, whether as a vector IV, or as a change to the actual key.

It will be appreciated that even with a table of sufficient size for a match, the attack will only succeed when there are no encrypted fields in the target fragment. If there are encrypted fields, the attacker must know all the encryption keys for the encrypted fields, or otherwise find fragments which match both in the stamp's uniqueHash and the encrypted fields' uniqueHashes, which is impractical to do.

As noted above, a variant attack can be used to create illegitimate records by first, computing the uniqueHash values of all possible keys, including ones that do not currently exist in the database, then, if a uniqueHash is found that matches that of an existing record, creating a new record and copying the data. Since most records in relational databases are related to records in other tables, however, the forged record, even if successfully created, may not be useful to the attacker. For example, if the record has no related records in other tables, the application may never be able to navigate to the forged record at all.

To prevent this class of attacks, the IDDBMS implementor preferably chooses sufficiently long uniqueHash values (and preferably use all the bits in the encryption), and/or the application designer should have one or more encrypted fields in every sensitive fragment.

Partial-Compromise Attacks

Partial-Compromise attacks assume that the attacker also has knowledge of some actual cryptographic keys to secure the database, in particular, a key used to encrypt a stamp.

(a) Direct Tampering Attacks

If an attacker knows a stamp encryption key, then the attacker can successfully tamper with a fragment since the attacker will be able to generate valid time-stamps. However if fields in the fragment are encrypted, the attacker will need to know the additional key(s) in order to gain access to the information contained in the fragment.

If any fields in the fragment are encrypted with keys unknown to the attacker, no successful tampering can take place even if the attacker knows the stamp encryption key. The attacker can forge fragment data and calculate and store the correct and properly encrypted stamp value, but the attacker cannot store a properly encrypted data field without knowing that field's key. Because the field with the unknown key results in unintelligible data when decrypted, the stored stamp no longer correctly validates the actual contents of the fragment. It would only have validated the originally intended tampered contents, which could not be completely stored without knowledge of all the necessary encryption keys.

(b) Compromise of One Stamp Key

Under this scenario, if an attacker is able to compromise one stamp encryption key, the attacker may be able to modify any fragment whose stamp is encrypted with that key. (The attacker will also have to know the key(s) for fields in the fragment if they are encrypted.) However, it will be appreciated that the attacker does not gain any knowledge that would help to tamper with other fragments whose stamps are encrypted with a different key.

Accordingly, it is preferable to use a different key for every stamp field. By using a different key, an attacker who knows one stamp key (e.g. a user with legitimate access to parts of one table) is prevented from gaining further access to other fragments in the system. In addition to the malicious attacker, this feature prevents users with legitimate access to parts of one table from gaining further access to other fragments in the system.

Securing User and Site Permissions

In the previous sections, the security features for securing information in the IDDB were described. The IDDBMS also preferably includes mechanisms whereby application designers may specify security permissions that are considered part of the database schema. Preferably, the security permissions cannot be overridden at runtime, but allow administrators at runtime to create convenient groupings of these basic permissions and then dynamically apply (permit or revoke) those permissions groups to specific users and sites as desired. Furthermore, there is preferably the capability for the application to query the IDDBMS at any time, via an application program interface (API), to determine whether a given user has a certain permission on a given activity.

The IDDBMS preferably also has the capability to calculate a minimal set of cryptographic keys legitimately required by the user to use the database. This aspect is described further below in connection with Key Management.

(a) Design-Time Security Tables

Figure 19:
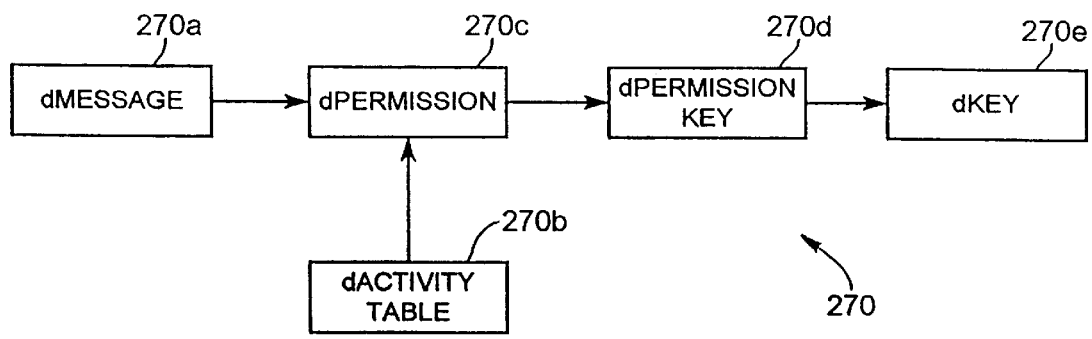
FIG. 19 shows a subset of design-time tables.

Reference is made to FIG. 19 which shows security-related design-time tables 270. The design-time tables 270 comprise a subset of the design-time tables 128 shown in FIG. 12 and described above.

As shown in FIG. 19, the security-related design-time tables 270 comprise a dActivityTable 270b, a dpermission table 270c, a dPermissionKey table 270d and a dKey table 270e. As described above, the dActivityTable 270b includes one record for each activity table in the application database (including any activities defined in STANDARD.DC for the standard tables). The dPermission table 270c includes one record for each basic permission in the database security model (as defined in the DC file). The dPermissionKey table 270d embodies a many-to-many relationship describing the parts of the database covered by each permission. The dKey table 270e includes one record for each (symmetric) cryptographic key used to encrypt any data or stamp column in the database. With the exception of the dKey table 270e, whose records are predefined but whose actual key values will vary from site to site at runtime, the contents of these tables are fixed at design time and are considered part of the database schema, as is the DC file.

According to this aspect of the invention, each permission is attached to one specific activity table or global activity.

(b) Run-Time Permissions Tables

Figure 20:
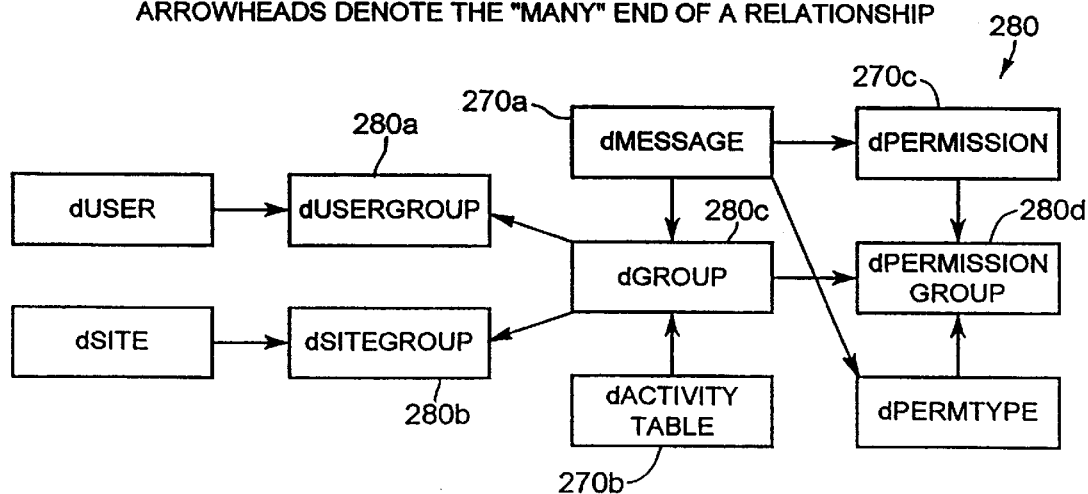
FIG. 20 shows a subset of runtime permission tables.

Reference is next made to FIG. 20 which shows runtime permission tables 280. The runtime permission tables 280 correspond to the tables shown and described above for FIG. 13. The runtime permission tables 280 comprise a dUserGroup table 280a, a dSiteGroup table 280b, a dGroup table 280c, and a dPermissionGroup table 280d.

At runtime, authorized administrator(s) may create groups of the basic permissions which are stored at design time in the dPermission table 270c (FIG. 19). Like the basic permissions (i.e. in the dPermission table), the dPermissionGroup table 280d for each permissions group has a language-independent name and is attached to one specific activity table (including the global activity). The basic permissions may only be arranged into groups if they and the group have the same activity table. This ensures that permissions are actually applicable and logical when grouped, since each permission make sense only for its activity table. The dPermissionGroup table 280d is a many-to-many relationship between the dGroup 280c, the dPermission 270c and dPermType tables.

The dGroup table 280c includes one record for each permissions group defined by administrators. At this level, each permission in the group is either granted (Permit=TRUE) or revoked (Permit=FALSE) in the dPermissionGroup record. The granting of the permissions group is cumulative, except that even one revocation overrides all grants of that permission.

Each permissions group defined in the dGroup table 280c may be applied to any site or user by creating an appropriate record in the dSiteGroup 280b or dUserGroup 280a tables. The security considerations for preventing tampering or deletion of records in the dPermissionGroup 280d, the dSiteGroup 280c, the dUserGroup 280a tables were described above.

(c) Finding User (or Site) Permissions for an Activity

The IDDB preferably provides the capability for the application to query the IDDBMS to determine a user's actual permissions for some activity, utilizing a mechanism, such as, a API function call. For example, the IDDBMS may include a function as follows:

bool dsecIsAllowed(PermissionName, PermTypeName, ActivityTableID, ActivityID);

(If the DSEC does not know the userid currently logged on, an extra parameter for the userid is added.)

In order to reply to the query, the IDDBMS needs to determine the actual permissions for a given user (or site) in a given activity. The actual permissions are determined by performing the steps shown below in pseudo-code form, and then determining whether the requested permission is in the result set of allowed permissions for this user and activity:

```
Perform the query:
    SELECT      *
    FROM        dGroup g, dUserGroup ug, dPermissionGroup pg
    WHERE       d.GroupID = pg.GroupID
        AND g.GroupID = ug.GrouprID
        AND ug.UserID = <UserID>
        AND g.ActivityTableID = <ActivityTableID>
        AND ug.ActivityID = <ActivityID>
        AND pg.PermissionName = <PermissionName>
        AND pg.PermTypeName = <PermTypeName>
    ORDER BY pg.Permit
```

Since false entries are assumed to appear first, the following rule may be applied: if the first entry has pg.Permit=FALSE or the result set is empty, the user is not permitted; otherwise the user has the permission.

(d) Determining User- or Site-Required Cryptographic Keys

The IDDBMS also preferably has the ability to determine the minimal set of cryptographic keys a given user needs to work with the application database. The minimal set is determined by performing the following steps:

Perform the query:

```
SELECT    *
FROM      dGroup g, dUserGroup ug, dPermissionGroup pg,
          dPemissionKey pk
WHERE         g.GroupID = pg.GroupID
          AND g.GroupID = ug.GroupID
          AND pg.PermissionName = pk.PemissionName
          AND ug.UserID = <UserID>
          AND g.ActivityTableID = <ActivityTableID>
ORDER BY      g.ActivityTableID, ug.ActivityID,
              pg.PermissionName,
              pg.PermTypeName, pk.KeyName, pg.Pemit
```

Next, the result set is traversed, and each group of records with the same g.ActivityTableID, ug.ActivityID, pg.PermissionName, pg.PermTypeName, and pk.KeyName is considered. Then, each access type pg.PermTypeName for each keyname pk.KeyName is accepted if pg.Permit of the first row found is TRUE.

Securing Local Databases

The security mechanism described above for fragment validation addressed the problem of securing a local database by preventing unwanted writes.

The complementary problem comprises preventing unwanted reads. A user, or an attacker, should not be able to successfully read information in the database other than through the legitimate application, so that the application retains control of access to its database. In particular, even an attacker with full access to the physical storage should not be able to successfully read sensitive database contents by bypassing the legitimate application.

To prevent unauthorized reads, the IDDB includes mechanisms for a developer to selectively encrypt the database contents at a sufficiently fine granularity, i.e. at the column level (and not at the table level), as will now be described.

According to this aspect, the application designer specifies a symmetric cipher for each column containing sensitive data. The symmetric cipher is used in a mode, such as CBC, that requires an initialization vector IV, and if applicable the key length and other parameters for configurable ciphers are also specified. Preferably, every Stamp field is encrypted by default.

The IDDBMS is responsible for generating the keys for each site when an application is installed. Each site generates its own keys so that the keys will be different at different sites. The ciphers and key lengths, etc., chosen by the designer do not need to be secret, but the actual key values at each site must be. (The management of database encryption keys is described below.)

The IDDBMS may generate the site's encryption keys immediately when the application is installed, if sufficient entropy is available in the pseudo-random number generator (PRNG), but this is not recommended. It is preferable to delay key generation for each key until its first use or use some other method to generate them at different times or under different conditions, to ensure that the generated keys will not be related. (Delaying generation of each key until first use is possible because the key use is under control of the IDDBMS.) Generating the keys at first use gives the IDDBMS, and its PRNG, the opportunity to run for some time so that the system will have built up sufficient entropy, i.e. via the IDDBMS's preferred sources of randomness, for reliable key generation.

Figure 21:
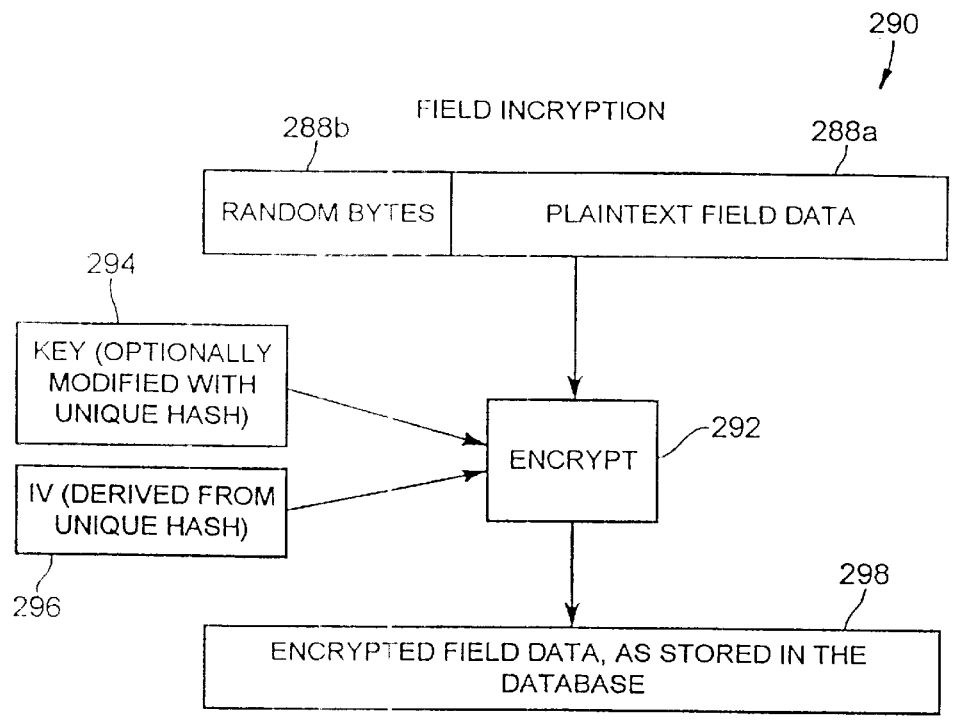
FIG. 21 shows a method for field encryption according to the present invention.

Reference is next made to FIG. 21 which shows a method 290 for encrypting a data field 288. The data field 288 comprises a plaintext field 288a and a random bytes portion 288b. The first step (not shown) comprises calculating a uniqueHash for the field 288, using the contents of the record's key fields and this field's column name. The next step (block 292) comprises encrypting the plaintext field 288a with its pre-pended random bytes 288b using a symmetric cipher operating in a mode such as CBC which requires an initialization vector (IV). Performing the encryption step in block 292 requires a key and the initialization vector (IV). The key is known to the IDDBMS in block 294, and the key 294 is preferably modified using the uniqueHash, and the initialization vector IV 296 (derived from the uniqueHash). The encryption 292 produces an encrypted data field 298 which is stored in the database.

Given the correct uniqueHash value (easily calculated from the fragment itself) and the correct encryption key (block 294), the replication engine (DRE) decrypts the field data 298 into the original plaintext data 288a ignoring the known number of random bytes 288b. An attacker cannot read encrypted information from the database without knowing the encryption key. Furthermore, if an attacker successfully compromises one site, the attacker gains no advantage (other than known plaintext) that can be used to attack other sites, because each site uses independently and randomly generated encryption keys.

As described above for Fragment Validation, it is preferable to use all the bits of the uniqueHash in the encryption operation (i.e. in the key or in the initialization vector IV) so that the system's security against replay and related attacks corresponds to the hash value length.

Key Management

The other aspect of security concerns the management of the keys, i.e. how security keys are stored and used. If an attacker is able to read the keys in a database (or intercept the keys in transit from that database), the database becomes readily accessible.

Because each site has its own randomly-generated set of symmetric keys with which the registry and each application database are separately encrypted, the key management procedures focus on the protection of the key database at a local site from local attacks. According to this aspect of the invention, trust is extended to users who have authenticated themselves and passed permission tests.

At each site one process, e.g. the replication engine DRE 24 (FIG. 4), acts as a gateway to the keys for each application database installed at that site. When started, the replication engine DRE cannot unlock any application database 34 (FIG. 4) (or, if encrypted, the registry database 38 (FIG. 4)), and relies on a site operator pass-phrase for each application. The pass-phrase may be varied for sites. Following this strategy, security is entrusted by the system administrator(s) to a site operator (i.e. human), rather than software. If the administrators do not trust any local site operator, the site can be operated by a remote operator at some other location, since the replication engine user interface DREUI 40 (FIG. 4) can be run on the same machine or any different machine as the replication engine DRE 24. The communications between the replication engine user interface DREUI 40 and the replication engine DRE 24 are secure (i.e. authenticated and encrypted) like the other network communications.

Once the site operator(s) provide pass-phrases, the replication engine DRE 24 has full access to all keys for every application database 34 (FIG. 4) and the registry database 38 (FIG. 4). When an application 28 (FIG. 4) starts, before it performs any cryptographic functions the application 28 logs onto the replication engine DRE 24 (i.e. through the security library DSEC 30) to a particular application with a user-name and password; for example, dsecLogon (application-name, user-name, password). The security library DSEC 30 submits the information via secure encrypted communications to replication engine DRE 24, which validates the user/password pair. If the user is a legitimate user for the given application, the replication engine DRE 24 determines the minimal set of cryptographic keys that user needs to work with the database and securely transmits only the necessary keys (as well as other housekeeping information) to the security library DSEC 30.

The application 28 is never given an actual key. When the application 28 needs to perform cryptographic operations with keys, it does them through the security library DSEC 30 by submitting the data to encrypt and decrypt and then specifying a key by name (dKey.KeyName), for example, dsecEncrypt (plaintext, keyName, ciphertext). This strategy means that access to keys is dispensed locally only to authenticated users; only the keys the user may legitimately need are made accessible; and even then the end program (and therefore the user) is at no time given the actual key values but references them only by name.

Encrypting the dkey Table for the Application Database

For each site in an application database 34 (FIG. 4), the organization deploying the application needs to "trust" at least one human user, e.g. the site operator or administrator. When an application is installed, the operator selects a password or pass-phrase, from which the IDDBMS derives a key (e.g., by repeatedly hashing the pass-phrase). The key is then used to encrypt the dKey table which contains all symmetric database encryption keys. Neither the password nor the key is ever stored.

According to the invention sites may install several IDDB applications 28 (FIG. 4), and the organizations deploying the applications may choose different administrators (and therefore different operator pass-phrases) for different applications. Each application database's dKey table is encrypted using that application's site operator pass-phrase.

Encrypting the dkey Table for the Registry Database

The IDDBMS implementor may choose to encrypt the dKey table for the registry 38 (FIG. 4) using a symmetric key. Preferably the registry is made available as long as any one application database has been unlocked.

To provide this functionality, an unencrypted table is added to the registry 38 and the table stores the registry's encryption key encrypted with every operator pass-phrase. Whenever an operator pass-phrase is entered, the IDDBMS can try every entry in the list, and if a match is found then the registry key is known and the registry is available.

One advantage to encrypting the registry is that, without at least one valid site operator pass-phrase, an attacker cannot determine what applications are installed through the registry.

Replication Engine Startup

When the IDDBMS, specifically the replication engine DRE, is started, the replication engine DRE cannot use any application database until the site operator supplies the correct pass-phrase to unlock the database. Preferably, the replication engine DRE prompts the operator for a pass-phrase, and then attempts to use the pass-phrase to unlock every application database. If any unlocks are unsuccessful (e.g., if a different pass-phrase was used for those databases), the replication engine DRE prompts the operator again and repeats the procedure until all databases are unlocked. It will be understood that the replication engine may begin replicating and servicing the databases that have been unlocked.

Application Logon to DSEC and DRE

Figure 22:
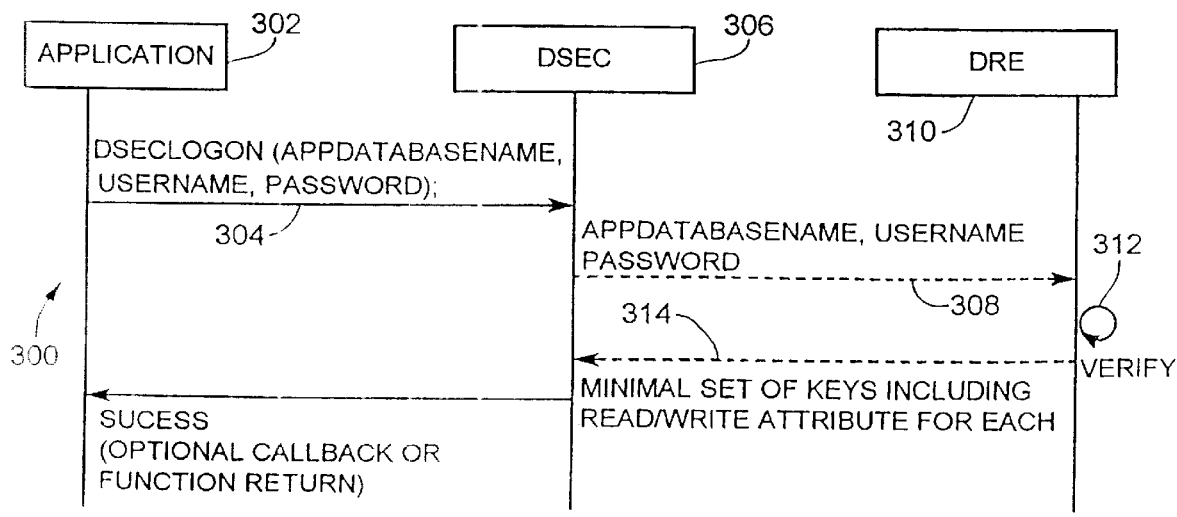
FIG. 22 shows a dsecLogon according to the present invention.

Reference is lastly made to FIG. 22 which shows the steps in a successful user logon procedure.

The first step comprises the application 302 requesting a userid and password from the end user. The application 302 passes the user-name, password and the application database name (branch 304) to the security library DSEC (306). The security library DSEC in turn securely transmits (branch 308) the parameters to the replication engine DRE (310). The parameters are validated (312) by the replication engine DRE and a minimal set of keys (branch 314) is released to the security library DSEC. If the parameters are invalid, i.e. the application database name is unknown, or if the user is not authenticated, the replication engine DRE, and then DSEC, report the logon failure to the requesting application.

The security library DSEC stores the keys, preferably in protected memory. The security library DSEC also knows whether the user may use the key for reading (decryption), writing (encryption), or both.

If multiple valid logons are made to the same database, the key set available is the union of all keys, and the read and write attributes for each key are the union of all read and write permissions for that key.

It will be understood that the logon process must not leak information to attackers and must actively resist brute-force attacks. For example, entering an invalid userid preferably produces exactly the same visible result (and return code from the security library DSEC) as entering a valid userid with an invalid password, otherwise an attacker could make random guessing attacks to determine valid userid's. After a threshold number of bad password rejections for a particular user, all logon attempts for that user should be rejected until the account is reset by an administrator. When rejecting a logon attempt because of a bad userid or password, the security library DSEC (or replication engine DRE) preferably delays several seconds, to reduce massive automated guessing attacks that might otherwise run at thousands (or more) attempts per second.

Application Encryption/Decryption Using Database Keys

According to this aspect, end applications are never given the keys, but must be able to use them. To allow this while controlling what applications may do with the keys, the security library DSEC provides an application program interface (API) call to request encryption and decryption using key names (dKey.KeyName) instead of key values. For example, this procedure is implemented as follows:

```
dsecEncrypt( plaintext,   // input
             keyName,     // input, requesting by name the key to be used
             ciphertext)  // output
dsecDecrypt( ciphertext,  // input
             keyName,     // input, requeating by name the key to be used
             plaintext)   // output
```

If the key name is invalid or not available, both functions fail. If the key may not be used for writing, dsecEncrypt fails. If the key may not be used for reading, dsecDecrypt fails.

Application Permission Queries

End applications will need to determine whether the currently-logged-on user(s) have a given variant (that is type; e.g., Read, Write, etc.) of a given basic permission for a given activity, including the global activity. To allow this, the security library DSEC provides an API call to query the permission. Depending on the IDDBMS implementations, the security library DSEC may either query the user/permissions database tables directly (if it has the necessary keys to read it) or may forward the request to replication engine DRE for processing and then return to the caller the replication engine DRE response. For example, this procedure is implemented as follows:

bool dsecIsAllowed(PermissionName, PermTypeName, ActivityTableID, ActivityID);

To query permissions in the global activity, the application passes a null ActivityTableID and ActivityID. The PermissionName must be a valid permission name for this activity table as defined in the DC file (as described above), the PermTypeName is a valid permission type (as also described above).

To sum up, the present invention provides an independent distributed database system. The Independent Distributed Database comprises an application database running as a virtual network which is defined by sites running a given IDDB application on a physical communication network. All sites in the IDDB, i.e. nodes, are peers and no site acts as a server for another. Each site stores "all and only" the data it needs. It is a feature of the present invention that users always work off-line with local data, and all application transactions are against a local database. Sites sharing the same data synchronize their changes periodically in the background and changes made at one site become visible to all the other interested sites. It is a feature of the IDDB database that there are no on-line or distributed application transactions, as all application transactions are local. There are network transactions for replication, but they operate fully in the background and are not visible to the application, i.e. the user. The network transactions propagate the changes made to the database at the individual sites to the other sites in the application network. According to another aspect of the invention, security mechanisms are provided for securing network transactions and access to the database at the sites.

According to another aspect, the present invention provides a transaction mechanism for replication. The transaction mechanism augments fragments in activity groups (as described above) for replication. The transaction mechanism is designed to follow four "ACID" requirements, namely, Atomicity, Consistency, Isolation, and Durability.

Atomicity requires that transactions for replication comprise all-or-nothing transactions.

Consistency requires that the transaction mechanism preserve database consistency, i.e. transforming a consistent state of the database into another consistent state.

Isolation requires that even when several transactions are made concurrently, the updates of one transaction T are concealed from others until transaction T commits. Usually, at the database administrator's option, other transactions already in progress when transaction T commits either may or may not be permitted to see the updates to transaction T.

According to the Durability requirement once a transaction commits, the transaction updates survive even if there is a system crash before the updates are physically written into the database. When the system is restored from backup or restarts, the subsequent replication "rolls forward" the database into the state the reflects all committed transactions.

Accordingly, the transaction is the unit of work, the unit of integrity, the unit of concurrency, and the unit of recovery.

The transaction mechanism according to this aspect of the invention comprises a number of configurations, which will now be described in more detail. The configurations of the transaction mechanism provide support for a number transaction cases as will be described below. In the following description, the term "related" is used in the context of multiple tables or multiple records means by a foreign-key relationship. "Directly related tables/records" means tables/records related directly by a single foreign key relationship. "Indirectly related tables/records" means tables/records related directly by traversing multiple foreign key relationships and the corresponding intervening tables/records.

One configuration of the transaction mechanism is for Per-Table Commits. During the synching of a table in the database, the Per-Table Commits transaction mechanism produces two types of transactions. The transaction mechanism wraps all reads of the table in one transaction and wrap all updates to the table in a second transaction. On many server databases, the reads can be performed without acquiring locks, hence without any concurrency impact on other users or applications; if so, however, an update could be received to a row that has also changed locally since the read, and an appropriate collision handling method should be used in such cases. Wrapping all updates in one transaction ensures that either all updates succeed or none succeed, and the other ACID properties. If the volume of updates in one table exceeds the underlying database's transaction size limits, then the transaction mechanism commits the updates in as large (and therefore as few) transactions as possible.

The application of the Per-Table Commits configuration of the transaction mechanism is now described in further detail in the context of two case examples, Case 1 and Case 2, and Case 3 and 4 described below.

Case 1 involves multiple related changes in the same table, for example, the insertion of a mutually-balancing pair of debit and credit records to the same Entry table in a double-entry bookkeeping system. If there is a window in which a client process is calculating totals but can see only one of the two records, then the totals will not balance.

Case 2 involves changes to related data in multiple tables. In general, any number of tables may be involved in the transaction. For example, table Invoice is related one-to-many table InvoiceLineItem, where an "invoice" is represented as one Invoice record together with one or more related (by foreign key) InvoiceLineItem records. The originating database/node creates one Invoice record with 10 related InvoiceLineItem records. If during replication of these records to another database there is a window wherein a client process accessing the other database can see the Invoice record but not all 10 InvoiceLineItem records, then the client will see incomplete data. In general, any number of tables may be involved in the transaction.

The Per-Table Commits configuration of the transaction mechanism easily handles Case 1, and largely covers Case 2. For Case 2, it would be possible to encounter a window where an Invoice record was visible without its dependent InvoiceLineItem records, but a client process always sees "all or none" of the line items. High update volumes could require using more than one transaction per table.

Another configuration of the transaction mechanism is for Multi-Table Commits, i.e. transaction groups. The Multi-Table Commits configuration encompasses the Per-Table Commits configuration described above, and in addition allows the database designer to define a "transaction group"

of one or more tables whose updates should be committed together. As such, it will be appreciated that the Per-Table Commits configuration as described above is a special case of the Multi-Table Commits configuration.

Case 3 involves changes to indirectly related data in multiple tables. In general, any number of tables may be involved in the transaction. For example in a point-of-sale system, the creation of a Sale record may trigger an update to an indirectly related (grandfather) product inventory level higher in the schema. If there is a window wherein a client process can see the Sale record but not the new inventory level, then the application's business consistency rules may not be met.

Case 4 involves changes to unrelated data in multiple tables. In general, any number of tables may be involved in the transaction. For example, changes to three completely unrelated global lookup tables may need to be committed together. If there is a window wherein a client process can see one of the updates but not another, then the application's business consistency rules may not be met.

The Multi-Table Commits configuration of the transaction mechanism is able to handle all four cases as outlined above. For example in Case 2, the database designer uses the Multi-Table Commits transaction mechanism to configure replication to commit the Invoice and InvoiceLineItem tables together. For example in Case 3, the Multi-Table Commits transaction mechanism is set to commit together the Inventory and Sale tables and possibly intervening tables. For example in Case 4, the Multi-Table Commits transaction mechanism is used to commit the affected global lookup tables together, even though they are otherwise unrelated from the point of view of foreign-key relationships. High update volumes could require using more than one transaction per table; but in the Case 2 example, the Multi-Table Commits configuration of the transaction mechanism incurs only marginally higher volumes than if the more numerous InvoiceLineItem updates were considered, and committed, alone as under the Per-Table Commits configuration for the transaction mechanism as described above.

Another configuration of the transaction mechanism is for Related-Data Commits, i.e. transaction sets. The related-Data Commits configuration of the transaction mechanism allows a database designer to configure a "transaction set" of tables such that the tables are related in a tree, whereby one table, i.e. the "base table" of the transaction set, is related directly or indirectly to all other tables, i.e. the "dependent tables", in the transaction set via one-to-one or one-to-many, but not many-to-one relationships. This implies that each record in a dependent table of the transaction set is related to exactly one record, i.e. the "base record", in the base table of the transaction set. Each base record together with its related dependent records form a "transaction slice" of data. Transaction slices do not overlap with each other, and all transaction slices taken together include all records in the tables in the transaction set.

During replication, the Related-Data configuration replicates related data together, i.e. in the same transaction slice, and commits each transaction slice individually. For example in Case 2, the database designer utilizes the transaction mechanism to group Invoice and InvoiceLineItem together, and during replication any changes to Invoice #1 and all #1's line items are moved and applied at the destination database within a single transaction, any changes to Invoice #2 and all #2's line items are moved and applied at the destination database within a single transaction, and so on.

The Related-Data Commits configuration is implemented to allow a given replication session to deliver updated information in one transaction slice comprising related data from one table but not another in the transaction. For example, a net-change replication may include updates to two InvoiceLineItem fragments, but no update to the related Invoice record because no change was made to it; or an update to the Invoice record but no changes to any of its InvoiceLineItems. The Related-Data Commits configuration correctly commits exactly the related updates in all such cases.

As applied to Cases 2 and 3 described above, the Related-Data Commits configuration for the transaction mechanism eliminates the data volume problem because it uses much smaller transactions, and any intermediate tables between the Sales and (grandfather) Inventory tables are included in the transaction set to complete the foreign-key relationship link. The Related-Data Commits configuration is also applicable to Case 1, particularly in situations where the transaction pairs are related to some common parent record, for example, the credit and debit records are under the same ledger entry type, under the same authorization code, etc., as appropriately chosen/decided by the database designer. It will be appreciated that transaction data volumes should not be an issue unless the database designer groups together a very large number of related very-high-volume tables in the same transaction set. It is understood that the Related-Data Commits configuration is not applicable to Case 4 because in Case 4 the tables are assumed to be unrelated.

As described above, all three configurations, Per-Table Commits, Multi-Table Commits (i.e. transaction groups), and Related-Data Commits (i.e. transaction sets), have particular advantages. The Multi-Table Commits configuration provides a complete solution and is superset of the Per-Table Commits configuration. The Related-Data Commits configuration provides a nearly-complete solution which also solves the main drawback with the Multi-Table Commits configuration, namely, transaction data volume limits. Therefore the transaction mechanism provides a more general design that allows all three configurations, at the database designer's choice, including any combination within the same database.

The database designer may choose the configuration where appropriate. For example, the Related-Data Commits configuration is preferred where transaction sets are utilized for improved performance if the underlying database performs poorly in the presence of anything but very small transactions. Transaction sets are also desirable for limiting transaction sizes in general in very-high-volume systems. Accordingly, for Cases 1, 2 and 3 the designer will use either the Related-Data Commits configuration (i.e. transaction sets) or the Multi-Table Commits configuration (i.e. transaction groups), and for Case 4 the designer will use the Multi-Table Commit configuration of the transaction mechanism.

In the IDDB 1, the transaction mechanism provides a mechanism for replication and as such augments the replication mechanism based on fragments and activity groups as described above. The particular implementation details of the three configurations of the transaction mechanism in the context of the IDDB 1 will be within the understanding of skilled in the art.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A distributed relational database system for a computer network, said system comprising:
   a plurality of sites;
   each of said sites including processing means for storing and manipulating data independent of said other sites, and said data including a copy of data to be shared with said other sites;
   said sites having means for connecting to said network and communicating with other sites connected to the network; and
   said processing means including means for asynchronously propagating a copy of shared data stored locally by connecting to said network and transferring said shared data to other sites connected to the network so that said manipulated shared data is updated at said other sites.

2. The distributed relational database system as claimed in claim 1, wherein said database system comprises a plurality of activities and each of said activities comprises selected sites belonging to an activity group.

3. The distributed relational database system as claimed in claim 2, wherein said activity group is defined by said sites collaborating on an activity.

4. The distributed relational database system as claimed in claim 3, wherein each of said sites includes information pertaining to said activity, said information being stored locally at said site.

5. The distributed relational database system as claimed in claim 4, wherein said information stored locally at each of said sites belonging to said activity group together forms a database for said activity.

6. The distributed relational database system as claimed in claim 3, wherein information is stored in tables, and said tables comprise a plurality of columns and rows, and said tables are grouped into record fragments, each of said record fragments including one or more columns in a row.

7. The distributed relational database system as claimed in claim 6, wherein said fragments comprise fields and each of said fragments serves as a unit of replication.

8. The distributed relational database system as claimed in claim 7, wherein said fields have a common update responsibility.

9. The distributed relational database system as claimed in claim 6, further including means for securing an application for an activity group.

10. The distributed relational database system as claimed in claim 9, wherein said means for securing includes a hierarchal trust structure comprising a trusted root, an organization certification authority and an application certification authority, said trusted root having means for generating license certificates for said organization certification authority, and said organization certification authority having means for generating license certificates for said application certification authority, and said application certification authority having means for generating license certificates for sites and users belonging to said application network or activity group.

11. The distributed relational database system as claimed in claim 10, wherein said means for generating license certificates for said organization certification authority comprises a signing key.

12. The distributed relational database system as claimed in claim 10, wherein said means for generating license certificates for sites and users belonging to said application network comprises a signing key for user certificates and a signing key for command certificates.

13. The distributed relational database system as claimed in claim 10, wherein said means for generating license certificates for sites and users includes means for generating a site certificate for a new site added to said network.

14. The distributed relational database system as claimed in claim 13, wherein said means for generating a site certificate comprises an application-site certification signing key.

15. The distributed relational database system as claimed in claim 9, wherein said means for securing includes means for validating the integrity of a fragment.

16. The distributed relational database system as claimed in claim 15, further including means for replacing an invalid fragment at one site with a valid version of said fragment replicated from another site.

17. The distributed relational database system as claimed in claim 15, wherein said means for validating a fragment comprises an encrypted field, and said site having means for generating said encrypted field, and said encrypted field being generated at the site at which the fragment was last changed.

18. The distributed relational database system as claimed in claim 17, wherein said encrypted field is derived from a fragHash value for said fragment.

19. The distributed relational database system as claimed in claim 9, wherein said means for securing includes means for encrypting a field in a record.

20. The distributed relational database system as claimed in claim 19, wherein said encrypted field is derived from a uniqueHash value for the field in said record.

21. The distributed relational database system as claimed in claim 9, wherein said means for securing includes means for securing a local database.

22. The distributed relational database system as claimed in claim 21, wherein said means for securing the local database comprises design-time security tables.

23. The distributed relational database system as claimed in claim 21, wherein said means for securing the local database comprises run-time permissions tables.

24. The distributed relational database system as claimed in claim 23, including means for applying permissions defined in said run-time permissions tables in groups to selected users or sites.

25. The distributed relational database system as claimed in claim 21, further including means for determining a minimal set of cryptographic security keys for a selected user to work with said application.

26. The distributed relational database system as claimed in claim 6, further including means for creating distributed records for said fragments and providing each of said distribution records with a unique identity.

27. The distributed relational database system as claimed in claim 26, wherein said unique identity comprises a unique record identifier and a fragment number denoting the columns of the records that the fragment represents.

28. The distributed relational database system as claimed in claim 27, wherein said means for creating distributed records includes means for allocating said unique identifiers.

29. The distributed relational database system as claimed in claim 2, wherein an activity comprises a root record and a plurality of records directly or indirectly related to said root record, and said activity defines a shareable subset of data in the database system.

30. The distributed relational database system as claimed in claim 29, wherein said activity includes an activity part comprising a selected table.

31. The distributed relational database system as claimed in claim 30, wherein said activity part comprises a subset of columns belonging to one or more of said tables.

32. The distributed relational database system as claimed in claim 2, wherein said sites comprise spine sites and non-spine sites, said spine sites exhibiting high availability to the network, and said non-spine sites exhibiting low availability to the network.

33. The distributed relational database system as claimed in claim 32, further including means for selectively mapping said spine sites.

34. The distributed relational database system as claimed in claim 33, wherein said means for selectively mapping said spine sites comprises a spanning tree having nodes corresponding to said spine sites.

35. The distributed relational database system as claimed in claim 34, further including means for reconfiguring said spanning tree, said means for reconfiguring being responsive to a node becoming unavailable to said network.

36. The distributed relational database system as claimed in claim 35, wherein said spanning tree comprises a balanced tree having a minimum height and said nodes being weighted according to bandwidth and availability.

37. The distributed relational database system as claimed in claim 34, further including means for removing a spine site from said spanning tree in response to a site leaving said activity group.

38. The distributed relational database system as claimed in claim 32, further including means for selectively mapping said non-spine sites to said spine sites.

39. The distributed relational database system as claimed in claim 2, wherein information is stored in tables, and said tables comprise columns and rows, and said tables are grouped into record fragments, each of said record fragments including one or more columns in a row.

40. The distributed relational database system as claimed in claim 39, wherein said processing means includes a local clock and means for generating time-stamps for each of said fragments stored locally at said site, and said time-stamp providing an age for the corresponding fragment.

41. The distributed relational database system as claimed in claim 40, wherein said fragments stored at said sites collectively form a database for said activity.

42. The distributed relational database system as claimed in claim 41, wherein an activity comprises a root record and a plurality of records related to said root record.

43. The distributed relational database system as claimed in claim 41, wherein said means for propagating comprises replication means for replicating selected fragments at other sites, and said selected fragments comprising most recent fragments as determined from said time-stamps.

44. The distributed relational database system as claimed in claim 43, wherein said replication operation comprises a background data synchronization operation between sites connected to said network.

45. The distributed relational database system as claimed in claim 43, wherein said time-stamp comprises a date and time field, and said date and time field is relative to said local clock at said site where said information unit is stored.

46. The distributed relational database system as claimed in claim 40, wherein said sites comprise spine sites and non-spine sites, said spine sites exhibiting high availability to the network, and said non-spine sites exhibiting low availability to the network.

47. The distributed relational database system as claimed in claim 46, further including replicator means for replicating changes to selected fragments between said spine and non-spine sites, said replicator means comprising means at each non-spine site for transmitting selected fragments to one of said spine sites, and said spine sites having means for sharing said selected fragments, and said spine sites including means for forwarding said shared fragments to other non-spine sites which link with said spine sites.

48. The distributed relational database system as claimed in claim 47, wherein said selected fragments comprise fragments having the most recent changes as determined from said time-stamps.

49. The distributed relational database system as claimed in claim 40, further including compensating means for compensating drift in the local clocks for said sites in said network.

50. The distributed relational database system as claimed in claim 49, wherein said clock drift compensating means comprises means for storing a past time difference between the clock at said site and the clocks of other sites, and means for comparing said past time difference to a current time difference and using said comparison for compensating said clock drift.

51. The distributed relational database system as claimed in claim 40, further including means for generating a reference time between sites on said network.

52. The distributed relational database system as claimed in claim 51, wherein said means for generating a reference time comprises means for sending a message from an initiator site to a sending site at a start time, and means for determining an arrival time when a reply message is received at said initiator site, and means for determining a reference time for said initiator site by calculating the midpoint for the interval from said start and arrival times.

53. The distributed relational database system as claimed in claim 40, further including means for checking clocks of said sites comprising means for comparing clock readings at said sites with clock readings taken from a designated time keeping site.

54. The distributed relational database system as claimed in claim 1, wherein said processing means includes a local clock and means for generating time-stamps for units of said information stored locally at said site, and said time-stamp providing an age for said information unit.

55. The distributed relational database system as claimed in claim 1, further including means for specifying transactions to be utilized when applying changes at the destination site during the asynchronous propagation of updates to shared data from one of said sites to a destination site.

56. The distributed relational database system as claimed in claim 55, wherein said means for specifying transactions comprises means for defining a group of one or more tables so that all the propagated updates to said group of tables are applied at said destination site in one transaction.

57. The distributed relational database system as claimed in claim 55, wherein said means for specifying transactions comprises means for defining a set of related records organized as a tree, wherein said set includes a base record and a plurality of records directly or indirectly related to said base record so that all the propagated updates to said set of records are applied at said destination site in one transaction.

* * * * *